US011178182B2

(12) United States Patent
Saxena et al.

(10) Patent No.: US 11,178,182 B2
(45) Date of Patent: Nov. 16, 2021

(54) AUTOMATED ACCESS CONTROL MANAGEMENT FOR COMPUTING SYSTEMS

(71) Applicant: SailPoint Technologies, Inc., Wilmington, DE (US)

(72) Inventors: Abhishek Saxena, San Jose, CA (US); Manish Kalia, Fremont, CA (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 283 days.

(21) Appl. No.: 16/389,755

(22) Filed: Apr. 19, 2019

(65) Prior Publication Data

US 2019/0327271 A1    Oct. 24, 2019

Related U.S. Application Data

(60) Provisional application No. 62/660,845, filed on Apr. 20, 2018.

(51) Int. Cl.
*H04L 29/06* (2006.01)
*G06N 20/00* (2019.01)
(Continued)

(52) U.S. Cl.
CPC ............... *H04L 63/20* (2013.01); *G06F 8/38* (2013.01); *G06N 20/00* (2019.01); *H04L 41/16* (2013.01);
(Continued)

(58) Field of Classification Search
CPC ...... G06F 8/38; G06F 3/04817; G06F 3/0482; G06F 40/186; G06F 21/57; G06F 21/604; H04L 63/20; H04L 63/0263
See application file for complete search history.

(56) References Cited

U.S. PATENT DOCUMENTS

2015/0269383 A1\* 9/2015 Lang ...................... H04L 63/20
726/1
2018/0069899 A1\* 3/2018 Lang ......................... G06F 8/38

OTHER PUBLICATIONS

CIS Benchmarks, CIS Amazon Web Services Foundations, v1.2.0, May 23, 2018.
(Continued)

*Primary Examiner* — Kyung H Shin
(74) *Attorney, Agent, or Firm* — Sprinkle IP Law Group

(57) ABSTRACT

Normalized access control policies associated with entities in an information technology (IT) infrastructure comprising a plurality of subsystems may be obtained based on a stored access control policy representation governing access to resources in the IT infrastructure. Based on the normalized access control policies, entity clusters associated with the entities may be determined. Further, derived access control policies corresponding to the at least one entity cluster may be determined. A set of non-compliant access control policies may be determined where the set of non-compliant access control policies may comprise: a subset of the normalized access control policies that are non-compliant with stated access control policies applicable to the entity clusters, and/or a subset of the derived access control policies that are non-compliant with the stated access control policies. Machine learning and/or Artificial Intelligence techniques may be used to determine, maintain, and audit policies for the IT infrastructure.

27 Claims, 29 Drawing Sheets

(51) Int. Cl.
    *H04L 12/24*          (2006.01)
    *G06F 8/38*           (2018.01)
    *G06F 3/0481*        (2013.01)
    *G06F 3/0482*        (2013.01)

(52) U.S. Cl.
    CPC .......... *H04L 63/102* (2013.01); *H04L 63/104* (2013.01); *G06F 3/0482* (2013.01); *G06F 3/04817* (2013.01); *H04L 63/0263* (2013.01)

(56) References Cited

OTHER PUBLICATIONS

PCT International Search Report and Written Opinion dated Jul. 18, 2019 in PCT Application No. PCT/US19/28390, filed Apr. 19, 2019.
International Preliminary Report on Patentability (Ch. I) dated Oct. 20, 2020, and Written Opinion for International Patent Application No. PCT/US19/28390, dated Jul. 18, 2019, 7 pgs.

* cited by examiner

| 381 Entity ID | 382 Has Access To | 383 Access Path(s)* | 384 Role(s) Associated with Access Path(s)* | 385 Permissions Associated with Access Path-Role | 386 Time First Granted | 387 Time First Exercised | 388 Time Last Exercised | 389 Use Count | |
|---|---|---|---|---|---|---|---|---|---|
| --- | --- | --- | --- | --- | --- | --- | --- | --- | --- |
| --- | --- | --- | --- | --- | --- | --- | --- | --- | --- |
| --- | --- | --- | --- | --- | --- | --- | --- | --- | --- |

| 391 Entity ID | 392 Can be Accessed By | 393 Access Path(s)* | 394 Role(s) Associated with Access Path(s)* | 395 Permissions Associated with Access Path-Role | 396 Time First Granted | 397 Time First Exercised | 399 Time Last Exercised | 399 Use Count |
|---|---|---|---|---|---|---|---|---|
| --- | --- | --- | --- | --- | --- | --- | --- | --- |
| --- | --- | --- | --- | --- | --- | --- | --- | --- |
| --- | --- | --- | --- | --- | --- | --- | --- | --- |

AUTOMATED ACCESS CONTROL MANAGEMENT FOR COMPUTING SYSTEMS

CROSS REFERENCE TO RELATED APPLICATIONS

This application claims priority to U.S. Provisional Patent Application No. 62/660,845, entitled "AUTOMATED ACCESS CONTROL MANAGEMENT FOR COMPUTING SYSTEMS," filed Apr. 20, 2018, and assigned to the assignee hereof. The above-identified provisional patent application is incorporated by reference herein in its entirety.

FIELD

The subject matter disclosed herein relates to computer security and specifically, to the automation, verification and management of access control mechanisms for computer infrastructure including distributed computing infrastructure.

BACKGROUND

Security of computer system or information technology (IT) infrastructure, which is also termed cyber security, can be a significant concern for modern computer system administrators. One aspect of cyber security is access control, which is concerned with ensuring that resources (e.g. computers, data repositories, network resources, services, etc.) are accessed by authorized entities (e.g. users, services, objects, other resources) in an authorized manner. When implemented and managed appropriately access control can prevent theft, unauthorized access, and/or damage to IT resources, help maintain and deliver IT services and functionality, and prevent system disruption. With the increasing complexity, scale, and rate of change of organizational IT infrastructure, especially as cloud infrastructure, services, and applications are adopted—managing and verifying cyber security and access control in modern IT systems can be a challenge. Typically, many organizations continue to rely on unwieldy and error prone manual methods to verify access control. Access control policies may be verified through periodic manual reviews focused on spot-checking specific components or parts of the IT infrastructure. For example, computer security professionals may manually analyze access control policies is some portion of the IT infrastructure to verify that the access control policies are appropriately configured to reflect organizational procedures. However, in part because of its manual nature, IT security policy analysis and/or verification is typically sporadic and focused only on a portion of the overall IT infrastructure. Because the underlying IT infrastructure can change rapidly and have a very large scale—security reliant on sporadic manual checks on parts of the infrastructure can leave significant gaps in the security framework and leave sensitive data and workloads open to unauthorized access from hackers or malicious insiders. In addition, the dynamic nature of IT infrastructure (with resources being continually added, deleted, and/or replaced) coupled with the absence of comprehensive and continuous access control checks across the infrastructure, may lead to inconsistent application and enforcement of access control policies.

Therefore, apparatus, systems, and methods to facilitate improvements to computer security systems through continuous and automated management and verification of access control are desirable.

SUMMARY

Disclosed embodiments facilitate the deployment, visualization and navigation, analysis, and searching, of access controls associated with entities and access control relationships between the entities an IT infrastructure, which may comprise a plurality of disparate subsystems. In some embodiments, an access control graph may be used to represent the access controls and the access control relationships across the IT infrastructure. In some embodiments, a single access control graph may be used to represent the access controls (associated with entities) and the access control relationships (between the entities) across the IT infrastructure. In some embodiments, the access control graph(s) may be obtained using machine learning and other artificial intelligence (AI) techniques.

In some embodiments, a processor-implemented method may comprise: obtaining one or more normalized access control policies associated with one or more first entities based on a stored access control policy representation governing access to a set of resources in an information technology (IT) infrastructure comprising a plurality of subsystems; determining, based on the one or more normalized access control policies, at least one entity cluster associated with the one or more first entities; determining one or more derived access control policies corresponding to the at least one entity cluster; and determining a set of non-compliant access control policies, wherein the set of non-compliant access control policies comprises: a first subset of the one or more normalized access control policies that are non-compliant with one or more stated access control policies applicable to the at least one entity cluster, or a subset of the one or more derived access control policies that are non-compliant with the one or more stated access control policies, or a combination thereof.

In another aspect, a computing system may comprise: a memory, and a processor coupled to the memory, wherein the processor is configured to: obtain one or more normalized access control policies associated with one or more first entities based on a stored access control policy representation governing access to a set of resources in an information technology (IT) infrastructure comprising a plurality of subsystems; determine, based on the one or more normalized access control policies, at least one entity cluster associated with the one or more first entities; determine one or more derived access control policies corresponding to the at least one entity cluster; and determine a set of non-compliant access control policies, wherein the set of non-compliant access control policies comprises: a first subset of the one or more normalized access control policies that are non-compliant with one or more stated access control policies applicable to the at least one entity cluster, or a subset of the one or more derived access control policies that are non-compliant with the one or more stated access control policies, or a combination thereof.

In some embodiments, a non-transitory computer readable medium may comprise instructions to configure a processor to: obtain one or more normalized access control policies associated with one or more first entities based on a stored access control policy representation governing access to a set of resources in an information technology (IT) infrastructure comprising a plurality of subsystems; determine, based on the one or more normalized access control policies, at least one entity cluster associated with the one or more first entities; determine one or more derived access control policies corresponding to the at least one entity cluster; and determine a set of non-compliant access control policies, wherein the set of non-compliant access control policies comprises: a first subset of the one or more normalized access control policies that are non-compliant with one or more stated access control policies applicable to the at least one entity cluster, or a subset of the one or more derived access control policies that are non-compliant with the one or more stated access control policies, or a combination thereof.

In a further aspect, a method may comprise: determining, for an information technology (IT) infrastructure comprising a plurality of subsystems, one or more access control policies corresponding to one or more first entities; normalizing the one or more access control policies corresponding to the one or more first entities; and storing, as part of a policy representation, the one or more normalized access control policies. In some embodiments, the method may further comprise displaying, based on the stored policy representation, an interactive graphical representation of the access control policies for at least one of: the IT infrastructure, or one or more of the subsystems comprised in the IT infrastructure, wherein the subsystems include distinct access domains, or the one or more first entities, or a combination thereof. In some embodiments, the method may further comprise monitoring and/or enforcing access to resources in the IT infrastructure based on the stored normalized access control policies.

In another aspect, a computing system may comprise: a memory, and a processor coupled to the memory, wherein the processor is configured to: determine, for an information technology (IT) infrastructure comprising a plurality of subsystems, one or more access control policies corresponding to one or more first entities; normalize the one or more access control policies corresponding to the one or more first entities; and store, as part of a policy representation, the one or more normalized access control policies. In some embodiments, the processor may be further configured to: display, based on the stored policy representation, an interactive graphical representation of the access control policies for at least one of: the IT infrastructure, or one or more of the subsystems comprised in the IT infrastructure, wherein the subsystems include distinct access domains, or the one or more first entities, or a combination thereof. In some embodiments, the processor may be further configured to: monitor and/or enforce access to resources in the IT infrastructure based on the stored normalized access control policies.

In some embodiments, a non-transitory computer-readable medium may comprise instructions to configure a processor to: determine, for an information technology (IT) infrastructure comprising a plurality of subsystems, one or more access control policies corresponding to one or more first entities; normalize the one or more access control policies corresponding to the one or more first entities; and store, as part of a policy representation, the one or more normalized access control policies. In some embodiments, the instructions may further configure the processor to: display, based on the stored policy representation, an interactive graphical representation of the access control policies for at least one of: the IT infrastructure, or one or more of the subsystems comprised in the IT infrastructure, wherein the subsystems include distinct access domains, or the one or more first entities, or a combination thereof. In some embodiments, the instructions may further configure the processor to: monitor and/or enforce access to resources in the IT infrastructure based on the stored normalized access control policies.

In some embodiments, a method may comprise: receiving access related information pertaining to one or more entities in an information technology (IT) infrastructure comprising a plurality of subsystems, wherein the access related event information comprises timestamps associated with access event occurrence; and updating a stored normalized policy representation for the IT infrastructure with the access related information.

In some embodiments, a method may comprise: determining, in response to a query and based on a stored normalized access control policy representation for an information technology (IT) infrastructure comprising a plurality of subsystems, at least one of: (i) one or more access control policies corresponding to one or more first entities at one or more of: a current time; or a past time, or (ii) a history of changes to the one or more one or more access control policies for a specified time period, or (iii) a combination thereof and displaying, based on the determination, an interactive graphical representation of the access control policies responsive to the query.

In another aspect, a computing system may comprise a memory, and a processor coupled to the memory, wherein the processor is configured to: determine, in response to a query and based on a stored normalized access control policy representation for an information technology (IT) infrastructure comprising a plurality of subsystems, at least one of: (i) one or more access control policies corresponding to one or more first entities at one or more of: a current time; or a past time, or (ii) a history of changes to the one or more one or more access control policies for a specified time period, or (iii) a combination thereof; and display, based on the determination, an interactive graphical representation of the access control policies responsive to the query.

In a further aspect, a non-transitory computer readable medium may comprise instructions to configure a processor to: determine, in response to a query and based on a stored normalized access control policy representation for an information technology (IT) infrastructure comprising a plurality of subsystems, at least one of: (i) one or more access control policies corresponding to one or more first entities at one or more of: a current time; or a past time, or (ii) a history of changes to the one or more one or more access control policies for a specified time period, or (iii) a combination thereof; and display, based on the determination, an interactive graphical representation of the access control policies responsive to the query.

In some embodiments, a method may comprise: determining one or more output access control policies corresponding to one or more first entities based on an input representing proposed changes to a stored normalized access control policy representation for an information technology (IT) infrastructure comprising a plurality of subsystems; and displaying, based on the determination, an interactive graphical representation of the access control policies and/or entities affected by the proposed changes.

In another aspect, a computing system may comprise a memory, and a processor coupled to the memory, wherein the processor is configured to: determine one or more output access control policies corresponding to one or more first entities based on an input representing proposed changes to a stored normalized access control policy representation for an information technology (IT) infrastructure comprising a plurality of subsystems; and display, based on the determination, an interactive graphical representation of the access control policies and/or entities affected by the proposed changes.

In a further aspect, a non-transitory computer readable medium may comprise instructions to configure a processor to: determine one or more output access control policies corresponding to one or more first entities based on an input representing proposed changes to a stored normalized access control policy representation for an information technology (IT) infrastructure comprising a plurality of subsystems; and display, based on the determination, an interactive graphical representation of the access control policies and/or entities affected by the proposed changes.

Some disclosed embodiments, may cluster nodes in a policy representation (such as access control graph) by: (a) creating an adjacency vector for each node where the vector lists the other nodes that are adjacent to this node in the graph; (b) adding attributes of the node and optionally attributes of nodes adjacent to this vector; (c) clustering the vectors using K-means or by training an autoencoder on the vectors and getting the latent mappings for each vector in the auto-encoder (dimensionality reduction) and then clustering the latent mappings. Optionally, in some embodiments, for each node in some subset of nodes in the access control graph, the method may further create a representation of a first node being considered in the latent space, wherein, in the latent space representation other second nodes in the graph that are very similar in terms of connectivity to the first node are mapped close to the first node. For each first node in the subset being considered, depth first traversal, breadth first traversal (or some combination of depth first and breadth first traversal) starting from the first node may be used to map the second nodes that are similar in terms of connectivity to the first node. The latent space representations above may then be used to obtain clusters (e.g. using step (c) above).

Some disclosed embodiments, facilitate node or edge prediction in an access control graph. In some embodiments, the method may comprise: (1) clustering edges and nodes in the access control graph (e.g. as described above); (2) labeling edges and nodes in the graph with respective cluster labels; (3) performing supervised learning for each node and cluster. Machine learning, as used herein can refer to either supervised learning or unsupervised learning or both.

In some embodiments, supervised learning for each node and cluster in step (3) may be performed by the following method: (a) inputting a vector for each node or edge where the vector contains some or all of the attributes of the node or edge along with all cluster tags and other tags to a deep learning neural network; (b) training the deep learning neural network on test data created from the set of all nodes and edges in the graph; (c) testing the trained model using a dataset created from the set of all nodes an edges such that the test set has minimal or no overlap with training set; (d) predicting clusters and other attributes of any new node or edge being added to the graph based on the model resulting from step (c). In some embodiments, the prediction may be used to identify anomalies, exceptions, and risk.

In some embodiments, supervised learning for each node and cluster in step (3) may be performed by the following method: (d) inputting a vector for each node or edge where the vector contains some or all of the attributes of the node or edge along with all cluster tags and other tags to a decision tree; (e) predicting clusters and other attributes of any new node or edge being added to the graph based on the decision tree. In some embodiments, the prediction may be used to identify anomalies, exceptions, and risk. In some embodiments, the decision tree may also be presented to the user to illustrate the rationale for the prediction of attributes for the node or edge being added to the graph.

Disclosed embodiments may also comprise an apparatus comprising one or more processors (including neural network processors) and/or other distributed processors configured to perform one or more of the above methods. Disclosed embodiments also pertain to a computer-readable medium comprising instructions, which configure a processor to perform one or more of the above methods.

The methods disclosed may be performed by one or more of computers and/or processors, including distributed computing systems. Embodiments disclosed also relate to software, firmware, and program instructions created, stored, accessed, read, or modified by processors using computer readable media or computer readable memory.

BRIEF DESCRIPTION OF THE DRAWINGS

FIG. 3D shows an example table depicting information in an outbound access policy graph associated with an entity.

FIG. 3E shows an example table depicting information in an inbound access policy graph associated with an entity.

DETAILED DESCRIPTION

Figure 1:
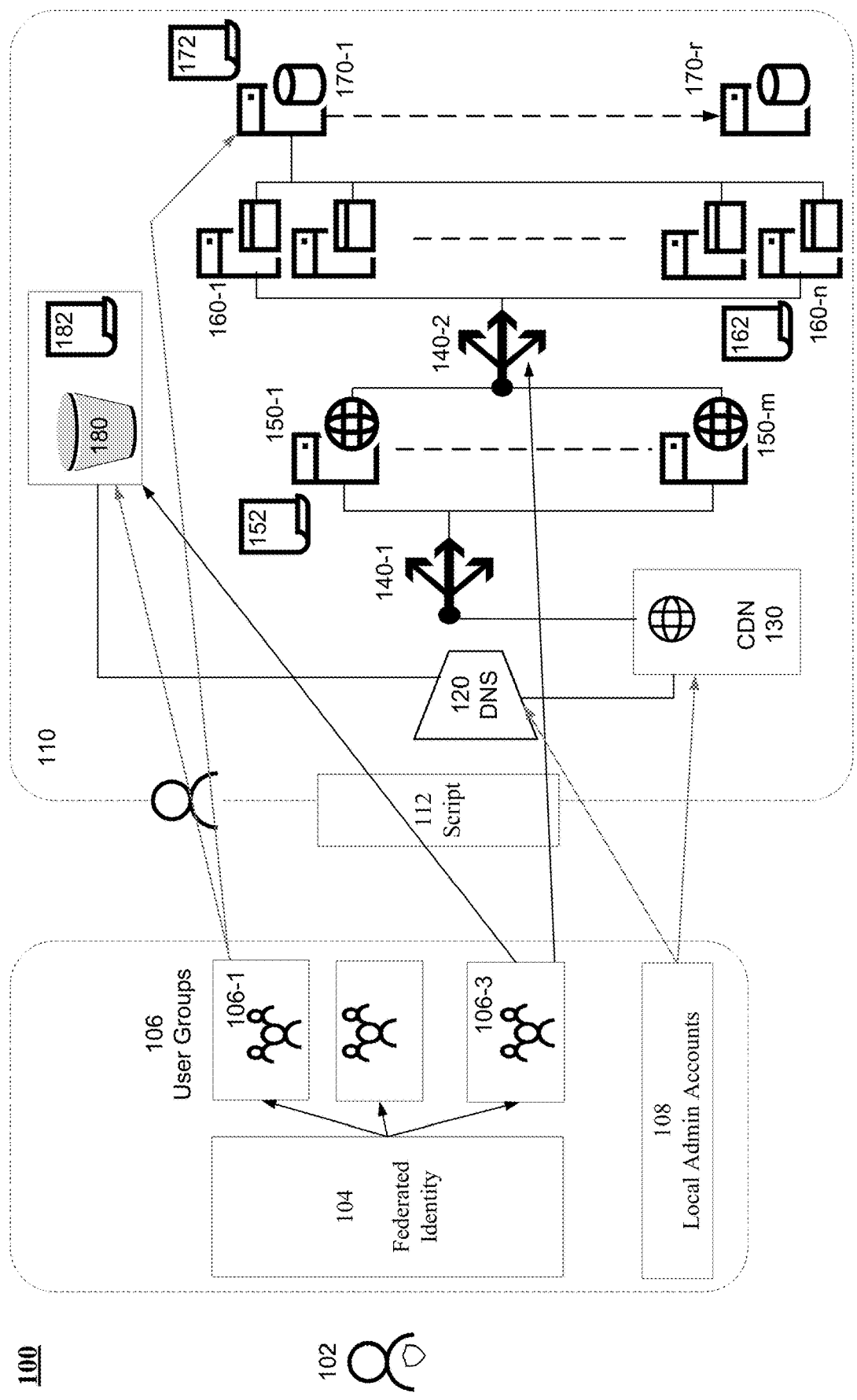
FIG. 1 shows a portion of an exemplary IT infrastructure or computer system.

The terms "object," or "target," or "target object," or "system object" are used synonymously and may refer to system resources including users, services (e.g. cloud based services, applications, etc.), data (e.g. files, unstructured data, databases, etc.), computing platforms (e.g. application containers, virtual machines, hosts, etc.), and/or any other system entity that may accessed by another system entity, service or user termed an "actor". The term "access" in reference to an object may refer to one or more of the actions of: reading from, writing to, executing, and/or otherwise editing or modifying an object's state and/or the ability to perform any operation specific to the object. The term "actor," as used herein, may refer to system entities that access objects. Actors may include users, applications, services, computers and/or other physical entities that may access or request access to objects.

Rules may specify: (a) conditions under which an actor may access an object; and (b) the type of access permitted to the object for each actor/actor type. The rules may be based on attributes associated with the actor (e.g. actor location/geography, actor IP address, actor type, actor groups, historical behavior, profiles including actor risk profiles, type of access requested, etc.), environmental considerations (time, current threat level, predicted risk, etc.), object attributes (e.g. object location, object type, geography, etc.), and/or metrics determined from some combination of the above (e.g. a predicted risk etc.) and/or tags assigned to and/or metadata associated with objects and/or actors. In some embodiments, the rules may be specified using one or more logical (e.g. Boolean) operators and two or more rules may be combined to obtain to more complex rules. As one example, access may be allowed to a database (object) for an application (actor) only when connecting from a corporate office (actor location) in Europe (actor geography) and the user group associated with the actor (actor group) is developer and the access type is "read only." Actor geography may be determined, for example, from IP addresses or location of the user attributed in the HR database or other metadata associated with the object access request.

An access control policy may include a set of one or more rules that apply to a system or subsystem. The access control policy may be viewed as reflecting an intent of the organization with regard to access to a system, a subsystem, or a portion thereof. The system wide collection of policies that apply to objects and actors is the system wide access control policy. Thus, access control policies may be organizational (system wide), and/or apply to some sub-system (e.g. a private cloud), and/or apply to an actor and/or object. Access control policies may be based on rules (or sets of rules) that apply to individual objects and actors. In some embodiments, the access control policies may be hierarchical so that higher level policies (e.g. for a system) may use, incorporate, and/or leverage lower level policies (e.g. for one or more subsystems and/or portions thereof) and/or rules (e.g. for one or more objects and/or actors). For example, access control rules may be programmed into an access control architecture. The set of access control rules for a subsystem may reflect an access control policy for the subsystem as implemented. When policies are hierarchical, the policies may be applied down the hierarchy so that a top level policy (e.g. system wide) may be applied to lower level nodes (e.g. each subsystem). Higher level policies can be merged or fused into policies specified for lower nodes. However, in many systems, because of implementation errors, unforeseen consequences, or changes over time, access control policies, as implemented, at a given point in time, may not reflect stated access control polices (as desired).

Access control policies can be viewed as comprising access control rules, which may govern access to objects in a system. Access control policies may use access control policy parameters to reflect the security or compliance conditions that are to be enforced in an IT infrastructure. Access control rules, which may be specified using access control policy parameters, may determine an actor's ability to access an object, the type of access granted, and/or conditions under which the access is available. Access control rules may be written in various languages and schemas (which are often specific to the system to which the rules may apply).

As outlined above, a system wide access control policy may refer to a set of policies that may govern an access control system. In some embodiments, the access control policies may be implemented hierarchically with overarching policies (e.g. for a system) that include lower level policies (e.g. for one or more subsystems). In some embodiments, lower level policies (e.g. "child policies") may inherit rules associated with a higher level policies ("parent policies"). In some embodiments, the system wide access control policies may be comprised of separate access control policies that govern distinct subsystems. For example, a higher level access control policy relating to user data access in workloads may comprise a lower level access control policy (e.g. a stated policy) indicating that users in a "developers" group may not access data tagged as "sensitive" in some specific workloads. The system wide access control policy may be reflected in the sets of rules that apply across various subsystems.

IT infrastructure, especially cloud infrastructure, may have a large number objects with corresponding security and/or access control policies, which may apply to the instances of objects (including services). Conventionally, manual methods of verifying access control policies are used, which are based on periodic reviews that spot check specific components or some sub-section of an organization wide IT infrastructure. Because IT infrastructure in large organizations is dynamic, continually evolving and changing, periodic manual testing of the security architecture is less than desirable and may leave unauthorized access that may be exploited. In addition, by testing only a part of the overall system, manual testing leaves large parts of the IT infrastructure untested at any given time.

Furthermore, access control policies are non-transparent and often undocumented resulting in poor visibility into the rationale for the policies (e.g. where else in the system they may be applied based on the rationale) or their application (e.g. where they have been applied incorrectly or erroneously). For example, as outlined above, an implemented access control policy (e.g. as implemented) may not reflect a stated access control policy (e.g. as desired). Consequently, as an example, access control holes may be exploited by an unscrupulous employee (e.g. internally) to gain unauthorized access and misappropriate sensitive organizational information, or a hacker (e.g. external) may use unauthorized access to steal sensitive data.

Access control management and verification present many challenges. One issue relates to the difficulty in understanding and implementing access control policies without domain specific knowledge. Each type of actor/object may have its own format, semantics, and/or language for creating access control policies, which may be dependent on a subsystem associated with the actor/object. Thus, security professionals may be able to understand and/or evaluate access control policies for a specific subsystem but may be less than proficient in relation to another subsystem. For example, in a system that includes a network, databases, and cloud based services (e.g. AWS EC2), a network administrator may be used to administer network access control policies, while a database administrator may be used to administer database access control policies, while an AWS EC2 administrator may be used to administer access control policies for the AWS EC2 service. Consequently, in traditional systems, the management and verification of access control policies may be inefficient, may depend on coordination between various professionals (which can lead to inconsistent implementation), and may be expensive in terms of manual labor. Thus, automating management and verification of traditional access control systems may be difficult, irregular, resource inefficient, and may not be cost effective manner.

In addition, management and verification of traditional access control systems can be error prone because access control policies often interact with, and may be dependent on, access control policies associated with other subsystems thereby greatly increasing policy administration complexity and/or verification. For example, a database may be contained in a restricted network zone, and store data that may be encrypted by a key based encryption system. Thus, determination of the resultant effective access to the database, which may be based on a combination of the network access control policies, database access control policies, and data encryption access control policies (which, as outlined above, may be in disparate policy specification languages and/or formats), may be complex, error prone, and unreliable.

Moreover, access control policies are often distributed across the IT infrastructure and are managed in local tools or configurations specific to the object or service. For example, network access control policies may be present in network services and components, and may be managed using tools provided by such services and components. Similarly, database access control policies may be present on a specific database instance and may be managed using tools provided by that database instance. As a result, conventional access control systems suffer from poor access control policy visibility and lack a method of aggregating and analyzing access control policies across different types of objects and services in the system/subsystem. No easy and/or automated cost-effective mechanisms exist for aggregation and analysis of access control policies across a system.

Furthermore, the scale of objects in IT infrastructure, especially in clouds, can be so large that comprehensive manual verification may not even be possible or practical in the available time-frame available. Thus, security administrators typically focus on manual verification and management of a subset of access control policies related to a subset of objects and services (e.g. those prioritized as or deemed to be "critical"), which may leave access control policies related to a large number of objects and services unverified. Such manual review of access control policies for a small subset of objects and services may lead to security holes susceptible to unauthorized access and exploitation by hackers and/or malicious insiders.

IT infrastructure in the cloud may be scaled up and down at a rapid pace. New objects (including services) with associated access control policies can be provisioned within seconds. Changes to access control policies can occur for existing objects and services in real time using programmatic APIs and scripts. Manual verification of access control policies in such dynamic environments is neither realistic nor practical. Thus, sensitive data and/or workloads may be placed at substantial risk of unauthorized access through mistakes or through malicious operations. Conventional methods of access control do not support continuous and automated verification of access control changes.

Typically, the intent or rationale (e.g. a stated intent) for the institution of one or more access control policies may not be explicitly declared. On one hand, in many instances, no stated intent or rationale may be available in relation to one or more access control policies. For example, system administrators may tag one or more objects as "sensitive," and may disable developer access to objects (including services) with "sensitive" tags. In the example above, multiple disparate access control policies applied at different objects and services may be used to implement the access control policy. For example, to implement the above policy: (a) a network policy may be set up that restricts a developer network zone from connection to data objects that have the sensitive tags; (b) Linux or host policies may be setup to prevent developers from accessing hosts or virtual machines (e.g. via a secure shell (SSH)) that may have access to sensitive data; and (c) data policies and encryption policies may be setup across hundreds of objects across different workloads to prevent developer access. Typically, no documentation may explicitly record the rationale associated with the policies in (a), (b), and (c) above. Without such an explicit documented correlation between a rationale or stated intent and corresponding implemented access control policies, verification of access control policies for compliance and/or for consistency can be difficult thereby creating potential weaknesses in the overall security architecture. On the other hand, conventional access control systems lack automated techniques for: (a) tying a policy framework to access control policies as implemented; and/or (b) inferring or deriving a policy framework from expressed or implemented access control policies and/or (c) verifying that access control policies, as implemented, correspond to a policy framework (stated or derived). For example, access to a new network may be provided to developers and an access control policy may be added for a user who is a developer. In the example above, the changes to the access control rule (to add the developer) may be in conflict with a stated access control policy for the organization, but such conflicts may be is very difficult to determine in conventional systems thereby potentially compromising security.

Conventional systems also lack automated searching and querying of access control policies to visualize, determine, and/or model scenarios. For example, no automated mechanisms exist to determine whether a set of actors has (or does not have) access to some set of objects. Audit and compliance teams in enterprises often periodically certify the access granted or available to various actors (or classes of actors) relative to one or more objects (or classes of objects). In addition, audit and compliance teams may diagnose and investigate issues related to unauthorized access. Consequently, the ability to query an access control system to automatically determine the access available to actors relative to one or more objects can enhance the efficacy of and confidence in access control system audits. In addition, conventional systems also lack the ability to query and visualize access control at a past point in time or model the impact of any potential (future) changes prior to the implementation of the changes.

The principle of least privilege pertains to limiting access (and the type of access) to the minimal set of objects for an actor (or conversely, for an object, limiting the number of actors able to access the object) without degrading functionality. In many systems, as access controls are changed, entities may gain and retain privileges that are not revoked when no longer used and access controls become inconsistent with the principle of least privilege. No automated techniques to determine unused privileges exist in conventional access control systems thereby creating vulnerabilities susceptible to exploitation. Manual techniques to review privileges, besides being expensive and cumbersome, can be ad hoc, error prone, and lack uniformity, thereby limiting the utility of the privilege audit.

Disclosed embodiments facilitate automation, expression, modeling, implementation, and maintenance of access control policies for an access control system. In some embodiments, an access control policy may be: (a) automatically determined based on implemented access control policies across an IT infrastructure; and/or (b) centralized to facilitate easier visualization, management and administration; and/or (c) automatically tied to an access control mechanism that enforces policies associated with any expressed (stated or derived) access control policy framework. Disclosed embodiments also facilitate automated verification of implemented access control policies against expressed access control policies.

Some disclosed embodiments may also facilitate: (a) automatic discovery and/or learning of access control policies based, in part, on implemented access control rules (e.g. derived policies); (b) visualization and analysis of the discovered and/or learned access control policies for each entity; (c) definition of new policies for a system and/or an entire IT infrastructure, and/or for some subsystem and/or subset of the IT infrastructure, and/or for a specific entity in the system/IT infrastructure; (d) use of a centralized facility (e.g. comprising Graphical User Interfaces (GUI) with tools, apps, routines, agents, etc.) to visualize, administer, manage, analyze, and/or search all access control policies and/or access control rules (which may be spread across the system and/or IT infrastructure and include the various objects and domains being managed); (e) provisioning and/or enforcement of one or more access control policies (e.g. by facilitating specification of the corresponding access control rules) on entities in the IT infrastructure; (f) verification that any access control rules (implemented or to be implemented) are consistent with the set of access control policies (derived and/or stated); (g) notifications (e.g. real time) when one or more access control rules are inconsistent with an access control policy; (h) revocation of access control rules that are inconsistent with access control policies.

Disclosed embodiments further facilitate a system (or subsystem) wide visualization of implemented access control policies. Some disclosed embodiments facilitate the automated querying of an access control system to determine, evaluate, and/or model specific scenarios (e.g. whether some set of objects is accessible/not accessible to some specific set of actors).

For example, a system may be queried to automatically determine entities that have access to a specific object or a group of objects, which may result in a review of attributes associated with entities (e.g. objects, services, users, roles, groups etc.) across various subsystems (e.g. network, data, host, cloud, encryption etc.) to determine a result. As another example, an access control system consistent with disclosed embodiments may support queries such as: (a) whether a set of objects O may be accessed by an entity E, where E is in not some set X, and where E is in some set Y; (b) whether the access in (a) is possible for network locations in set N at a set of dates D and at times T; (c) whether the access to objects O in (a) is possible for an entity E that has user attribute A and/or a role R, when the objects have a data classification C; etc. As outlined above, the conditions associated with queries may involve the attributes associated with any entity E and/or objects O, the access type (e.g. read, write, execute etc.), or any other metadata associated with the entity E and/or objects O.

Some disclosed embodiments may facilitate automated audits including: (i) for actor(s), determining objects (or classes of objects) that the actor(s) (or classes of actors) may access (including types of access); (ii) for object(s), determining actors (or classes of actors) able to access (including types of access) the object(s) (or classes of objects); (iii) determining actors and/or object that have associated privileges that are inconsistent with one or more access control policies.

In addition, some disclosed embodiments facilitate the automatic determination of an access control policy framework based on existing implemented access control policies in a system. In some embodiments, implemented access control policies may be analyzed to determine higher level policies. For example, the access control system may determine that a set of users U1 have been granted access to a specific workload (W) and to a set of data objects O1 tagged as "sensitive." The access control system may also determine that a set of users U2 may not have access to O1. In some embodiments, the access control system may look at "roles" for users in U1 and U2 (e.g. in a Human Resource Management (HRM) system) and determine that users in U1 have role "Operations," while users in U2 have role "Developer." Accordingly, the access control system may infer that users with an "Operations" role may access data tagged as "sensitive," while users with a "Developer" role may not access data tagged as "sensitive." Thus, rules or access control policies associated with a system/subsystem may be automatically learned by embodiments disclosed herein. In some embodiments, the rules (e.g. learned rules) may be expressed in terms of access control policy parameters, which may specify conditions and/or entity attributes for granting access, for the type of access granted, or for denying access. In the example above, a rule may specify that if the data attribute="Sensitive" and the users has role attribute="Developer", then access is to be denied to the user.

In some embodiments, the automatic determination of a higher level access control policy (e.g. based on implemented rules and other attributes associated with actors and objects) may be performed using clustering, machine learning, and artificial intelligence (AI). Automatic policy determination based on an implemented access control rule base and/or attributes associated with actors and/or objects may facilitate inference of stated policies for a system/subsystem. For example, on analyzing the access relationships between a set of objects O and a set of users U, AI techniques may be used to learn and/or infer (e.g. from access logs, activity logs, and/or other system logs) that access from a specific user u_i to a specific object o_j may only be allowed when the location attribute of object o_j in O matches the location attribute of user u_i in U. In some embodiments, automatic policy determination may be used as part of an access control verification process to verify that an implemented rule base reflects stated policies for a system/subsystem or to determine any inconsistencies. For example, derived polices, which may include learned/inferred rules may be compared with a stated access control policy (or rule) to determine potential inconsistencies. In some embodiments, access control verification may be run periodically, and/or whenever access control policies are changed, and/or whenever new actors/objects or subsystems are added to existing computing infrastructure.

Access logs, activity logs, and/or system logs (collectively referred to herein as "AL" or "ALs") may include information pertaining to one or access requests to entities, entities that requested access (e.g. to another entity), entities accessed (e.g. by another entity), the type of access, time of access, actions performed, action time, action outcomes (e.g. whether successful), paths exercised for the access, etc.

Conventional systems lack automated mechanisms to identify access control policy drift. In the example above, for instance, because of changes one or more "developers" may gain access to data tagged "sensitive" over time. Such access control changes that cause deviations from intended access control policies at a point in time are referred as access control policy drift or policy drift. In some embodiments, automatic policy determination may be used to automatically identify policy drift.

Accordingly, some disclosed embodiments, pertain to a method of automated determination and deployment of access control policies in computer systems including distributed computer systems. Disclosed embodiments also pertain to automated methods for continuous verification of access control policies across in computer systems including distributed computer systems. Computer systems may include some combination of conventional networked computers, servers, data centers, and cloud-based systems. Cloud based systems include Infrastructure as a Service (IaaS), Platform as a Service (PaaS), Software as a Service (SaaS), and/or Container as a Service (CaaS). Cloud based systems may include public cloud services (e.g. Amazon AWS, Microsoft Azure, Google Cloud, etc.), private clouds hosted at the enterprise (e.g. VMware based, etc.), and hybrid private-public clouds. Cloud based systems may also include VMs, containers, data stores and objects such as databases, files, data analysis tools, and repositories (including Hadoop and Hive), and services running on internal (e.g. on-premise) infrastructure and external SaaS services. Other examples of cloud based systems include directories (e.g. LDAP), key management systems for controlling encryption keys, passwords, or secret vaults for controlling accessing to secrets, and privileged account management systems. Each cloud based system may also include access control policies (which may be specified in a manner compatible with the corresponding cloud) related to entities associated with the cloud-based system. Disclosed embodiments also facilitate orchestration, analysis, and verification of access control polices for one or more of the above computer systems including the cloud-based systems.

The performance of computing applications may often be increased by distributing the computational workload across a networked cluster of computers. A physical networked cluster of computers with attendant software facilitating virtualization or containerization is often referred to as a "cloud" or "cloud infrastructure" or simply an infrastructure. Cloud computing facilitates on-demand access to resources, which may be rapidly scaled up or down in proportion to user requirements. A virtual machine (VM) or container may be viewed as some constrained fraction of the hardware (e.g. CPU, storage, etc.) and software (e.g. Operating System (OS) etc.) provided by a cloud. Thus, each VM (which typically includes some fraction of the underlying cloud hardware and an OS) can be used to deploy and run on or more cloud based applications. VMs can be software implementations of a computer. VMs often provide a complete system platform, which may also support the execution of a complete operating system by the VM in addition to one or more applications. Therefore, from a logical perspective, clouds may be viewed as a collection of managed infrastructure components (like servers, storage, and networks) that support managed services. Clouds may comprise one or more VMs, each configured with some fraction of the underlying hardware resources. Typically, a cloud may provide a variety of VM types with different computing (CPU), memory, storage, networking, and Operating System (OS) options.

Clouds may be public and/or private. For example, publicly available clouds or "public clouds," may be accessed programmatically (e.g. using Application Programming Interfaces (APIs)) over the Internet and may be made available as VMs on a pay-per-use basis by third parties to customers. On the other hand, organizations may have private clouds for use by employees or customers within an enterprise's data center and/or may use a hybrid cloud, which may be a combination of public-private clouds to deploy and run applications. Clouds, thus, provide access to computing infrastructure, platforms, and services remotely, including compute, storage, and network resources, so that the resources can be reserved, provisioned, accessed, and released programmatically. For example, programmatic interfaces such as Application Programming Interfaces (APIs), System Development Kits (SDKs), Web Services, etc. may be used to access resources made available by clouds remotely over a wide-area network (WAN).

Cloud computing may thus be viewed broadly in terms of the following models. In the Infrastructure-as-a-Service (IaaS) model (e.g. AWS EC2, Amazon S3), cloud providers supply the compute, network and storage mechanisms but cloud customers may run, manage, and configure their (e.g. operating system and applications) own VMs. In systems based on an IaaS model, the provider may manage the underlying physical cloud infrastructure. In the Platform-as-a-Service (PaaS) model (e.g. Google App Engine), cloud providers supply a platform, which includes a preconfigured software stack, upon which customers may run applications. In systems based on a PaaS model, the PaaS provider may manage the platform (infrastructure and software stack), while the run-time execution environment may be managed by users. In the Software-as-a-Service (SaaS) model (e.g. Microsoft Office 365), the cloud provider may additionally provide ready to use software applications such as financial or business applications for customer use. In systems based on an SaaS model, the SaaS provider may manage the cloud infrastructure, any software stacks, and the ready to use applications.

Applications can sometimes be deployed on a host infrastructure in the form of "containers" or "application containers." The term "container" or "application container" as used herein, refers to an isolation unit or environment within a single operating system and specific to a running program. When executed in their respective containers, one or more programs or scripts may run sandboxed on a single VM using operating system virtualization, which facilitates rebooting, provision of IP addresses, separate memory, processes etc. to the respective containers. Containers may take the form of a package (e.g. an image), which may include the application, application dependencies (e.g. services used by the application), the application's runtime environment (e.g. environment variables, privileges etc.), application libraries, other executables, and configuration files. One distinction between an application container and a VM is that multiple application containers (e.g. each corresponding to a different application) may be deployed over a single OS, whereas, each VM typically runs a separate OS. Thus, containers are often less resource intensive and may facilitate better utilization of underlying host hardware resources. For example, an application may include a server-side scripting container (e.g. a PHP container), a database process container (e.g. a MySQL container), a container for the web server (e.g. an Nginx ("engine-X") container), etc., which may run over a single host OS. Containers facilitate the building of an application using components running in sandboxed or compartmentalized environments. Thus, containerized applications are less likely to interfere with or disrupt the operation of another container. Application containers can be independent of the configuration of the underlying OS, networking interfaces, and storage thereby facilitating portability. For example, a container platform may facilitate application container portability by allowing the same application container to be deployed on hardware with various host OS types, OS versions etc.

However, application containers that run on a single host are susceptible to host failure, which may result in failure of the entire software system that the application containers constitute. In addition, application containers that run on a single host may also be limited by host resource constraints. Thus, many systems run on a collection of container hosts termed "container clusters." To simplify container/container cluster deployment, containers or container clusters are often delivered as a service. Container as a Service (CaaS) refers to container-based infrastructure services involving the delivery of container cluster management, container orchestration, and the underlying computational resources to end-users as a service (e.g. from a cloud infrastructure provider). CaaS solutions are typically utilized by application developers to deploy new container-based applications.

FIG. 1 shows a portion of an exemplary IT infrastructure or computer system 100 (hereinafter referred to as "system 100"). As shown in FIG. 1, an actor such as user 104 may use Federated Identity 104, which may be associated with one or more user groups 106 (comprising user groups 106-1 through 106-3 in FIG. 1) to access resources in subsystem 110. Subsystem 110 may form part of system 100. Subsystem 100 may comprise DNS resolution server 120 (e.g., which may be coupled to a Content Delivery Network (CDN) 130. CDN 130 may access resources and static content from data server 180. Access to data server 180 may be governed by data server access control policy (DSACP) 182. CDN 130 may be coupled to elastic load balancer 140-1, which may dynamically instantiate and distribute workload across auto-scaling web servers 150-1 through 150-m (collectively referred to as "web servers 150"). Access to web servers 150 may be governed by web server access control policy (WSACP) 152. Web servers 150 may be coupled to elastic load balancer 140-2, which may dynamically instantiate and distribute workload across auto-scaling application servers 160-1 through 160-n (collectively referred to as "application servers 160"). Access to application servers 160 may be governed by application server access control policy (ASACP) 162. Application servers 160 may be coupled to database servers 170-1 through 170-r (collectively referred to as "application servers 170"). Access to database servers may be governed by database server access control policy (DBACP) 172.

Further, administrators may use local admin accounts 108 to request access to DNS 120 and/or CDN 130, which may be governed by respective access control policies (not shown in FIG. 1). As outlined above, access control policies may determine access control based on some combination of actor, object, and other considerations. As shown in FIG. 1, user 102 may request access to data server 180 directly functioning within user group 106-1. In addition, user 102 may request access (e.g. indirectly) to data server 180 and elastic load balancer 140-2 through script 112. Some of all of the resources shown in infrastructure may be cloud based. As one example, DNS 120 may be realized using, Amazon Route 53 cloud domain name system, while CDN 130 may be realized using Amazon Cloudfront content delivery network, and database servers may be realized using Amazon RDS.

In a computer system with thousands of actors and objects access control management, deployment, and enforcement can become unwieldy, suck up valuable resources, while leaving portions of the infrastructure vulnerable. In addition, administrators may not be able to easily determine which objects comply with a specified set of policies because, in conventional systems, access control policies may reside with the objects, and be managed using local object resident tools or scripts. Thus, no uniform approach exists to map objects with access control policies. As another example, a system administrator may not be able to determine which objects an actor (or a set of actors) may access, and indeed, whether, the actor is able to access objects that should be off-limits (e.g. a restricted database or portion thereof), or whether the actor is unable to access objects that are intended to be accessible (e.g. a computer or VM on the network). In conventional systems, therefore, system administrators may have poor visibility into system (or subsystem) compliance with security policies.

Accordingly, some disclosed embodiments pertain to a method of automated determination and deployment of access control policies in computer systems including distributed computer systems. Disclosed embodiments also pertain to automated methods for continuous verification of access control policies across in computer systems including distributed computer systems. Computer systems may include some combination of conventional networked computers, servers, data centers, and cloud based systems and services supported by a cloud-based infrastructure (which may be public, private, or hybrid). Cloud based systems include Infrastructure as a Service (IaaS), Platform as a Service (PaaS), Software as a Service (SaaS), and/or Container as a Service (CaaS). Cloud based systems may include public cloud services (e.g. Amazon AWS, Microsoft Azure etc.), private clouds hosted at the enterprise (e.g. VMware, etc.), hybrid private-public clouds, Software as a Service (SaaS) based services used by enterprises.

Figure 2:
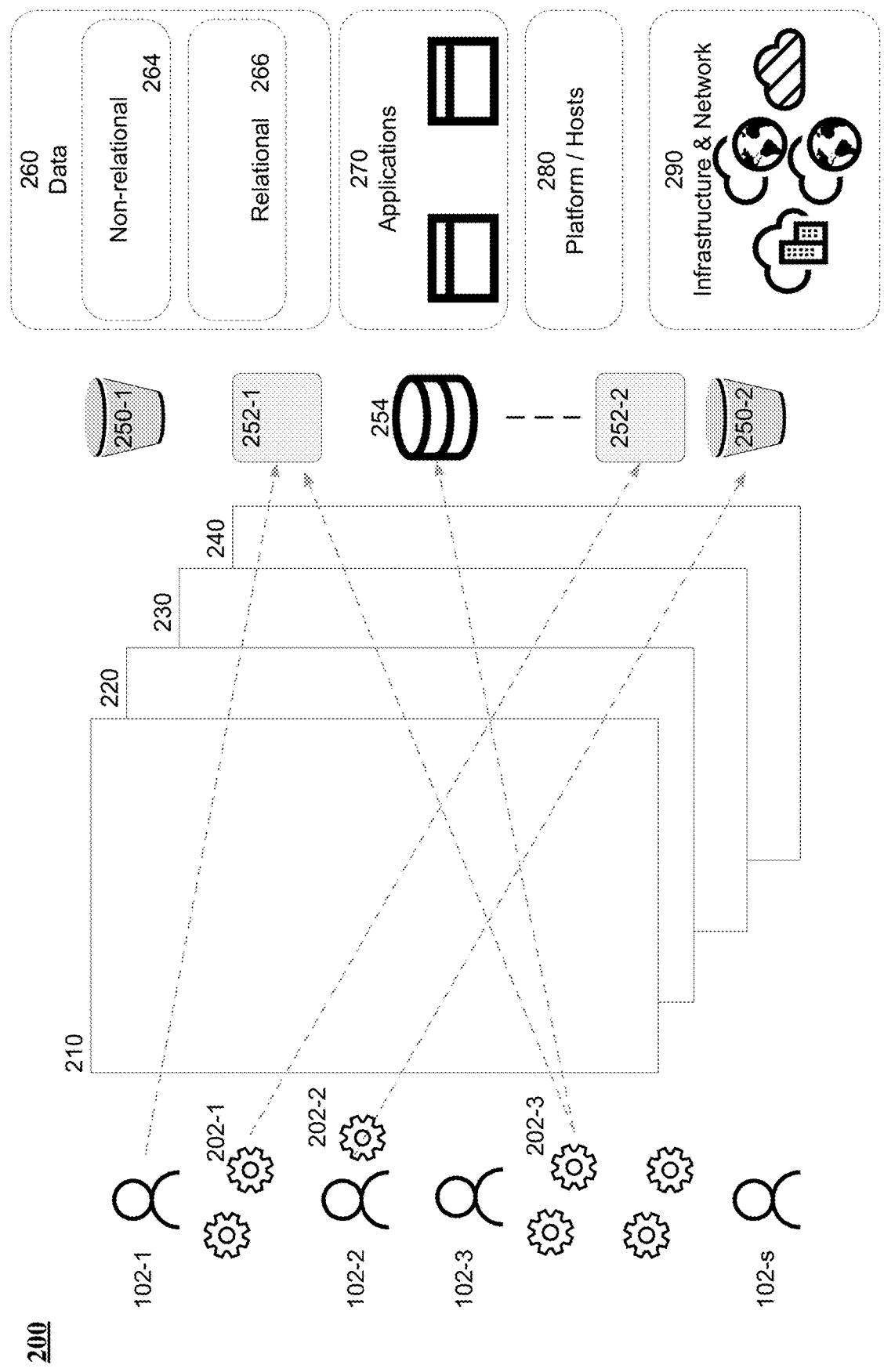
FIG. 2 illustrates some challenges with traditional approaches to security and access control.

FIG. 2 illustrates some challenges with traditional approaches to security and access control. As shown in FIG. 2, a computer system such as example system 200 may comprise several subsystems such as infrastructure and network subsystem 290, which may be partially cloud based (e.g. Amazon Web Services (AWS), Microsoft Azure, VMware, and/or hybrid clouds) which may use platforms/hosts 280 (e.g. Red Hat Openshift, Docker, AWS Lambda, etc. for cloud-based platforms/hosts), applications 270 (which may comprise cloud based applications), and data subsystem 260, which may comprise relational databases 266 (e.g. MySQL, Postgres SQL, etc.), non-relational databases 264 (Apache HBase, Apache Hive, etc.), and storage (e.g. Amazon S3, etc.). System 200 may further comprise one or more computers, servers, data centers etc. (not shown in FIG. 2).

Logically, each subsystem or portion thereof, such as cloud computing subsystem 210 (e.g. Amazon EC2), cloud storage subsystem 230 (e.g. Amazon S3), database subsystem 240, network subsystem 220, may be governed by a respective set of access control policies. Further, users 102-1, 102-2, 102-3 . . . 102-s (collectively referred to as users 102) may also be associated with respective groups each with associated access permissions, and services 202-1, 202-2, 202-3 etc. (collectively referred to as services 202) may also be associated with respective access permissions. The terms "access permissions" and "access privileges" are used interchangeably herein and relate to the conditions under which an actor may access an object and the type of access available to the actor. The conditions, which may be specified using access policy parameters, may include physical conditions (e.g. times when access in permitted) and/or attributes associated with the actor (requesting access) and/or the object (being accessed).

Various interactions between actors and objects are possible in system 200. For example, as shown in FIG. 2, an actor such as user 102-1 may attempt to access to object 252-1; or actors such as services 202-1 and 202-2 may attempt to access objects 252-2 and 2502, respectively. As another example, an actor such as service 202-3 may attempt to access objects 252-1 and 254. In general, as a system grows in complexity, with thousands of actors and objects each governed by respective access permissions/access control policies, manual management of security and access control policies can become impracticable. Accordingly, some disclosed embodiments facilitate automation and scaling of access control policies to accommodate system growth and complexity.

Figure 3A:
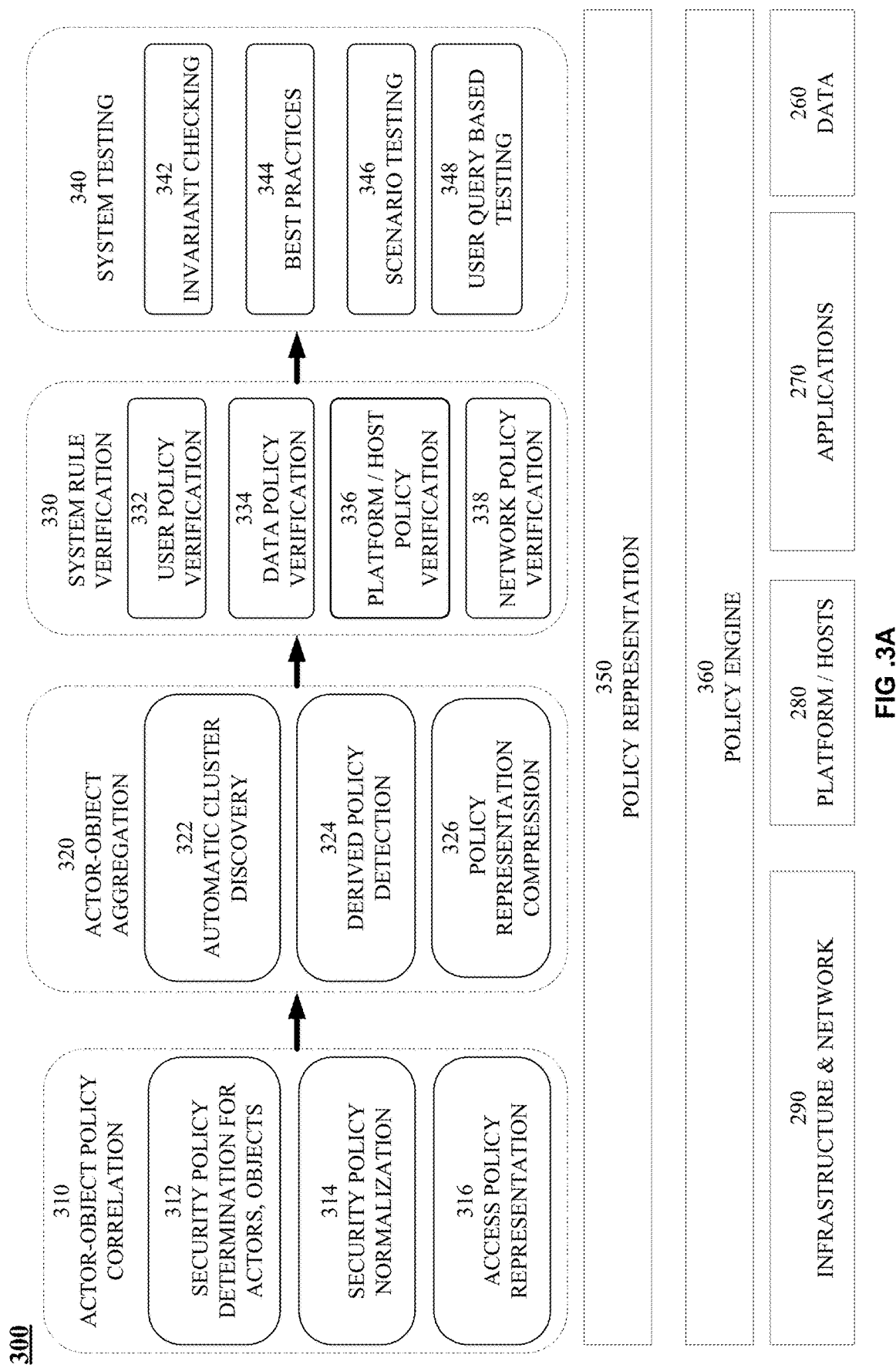
FIG. 3A shows an example access control system for computer system security according to some disclosed embodiments.

FIG. 3A shows an example access control system 300 for computer system security according to some disclosed embodiments. In some embodiments, access control system 300 may facilitate centralized, automated, and continuous management and verification of access control for a computer system (e.g. including cloud-based infrastructures, network, applications, data and services and conventional computing resources such as servers, clients, datacenters, applications, etc.).

As shown in FIG. 3A, in some embodiments, an access control system may comprise actor-object policy correlation engine (AOPC) 310 and actor-object aggregation engine (AOA) 320, which may read, cluster, and/or analyze access control policies related to a plurality of entities (subsystems, services, users, etc.) of an IT infrastructure to determine relationships between entities, and augment and update policy representation (PR) 350. In some embodiments, IT infrastructure may include infrastructure and network subsystem 290, platforms/hosts subsystem 280, application subsystem 270, and data subsystem 260. System 200 may further include one or more computers, servers, data centers etc. (not shown in FIG. 3A).

System rule verification engine (SRV) 330 and system testing engine (ST) 340 may use PR 350 to verify policy consistency and/or determine whether policies comply with one or more criteria. In some embodiments, SRV 330 and/or ST 340 may flag policy inconsistencies and/or update access control policies based on the determination. PR 350 may include a representation of implemented rules, stated policies, derived policies (e.g. learned from implemented rules), rules reflecting modeled scenarios, etc.

In some embodiments, policy engine (PE) 360 may read, update, verify, and/or test policies associated with actors and objects that form part of infrastructure and network subsystem 290, platforms/hosts subsystem 280, application subsystem 270, and data subsystem 260. In some embodiments, policy engine (PE) 360 my provide functionality to specify, determine, and/or update access control policies for actors and/or objects in various subsystems (e.g. infrastructure and network subsystem 290, platforms/hosts subsystem 280, application subsystem 270, and/or data subsystem 260). For example, PE 360 may read or write files, invoke APIs, program code, scripts, etc. associated with the various subsystems to process requests received from AOPC 310, AOA 320, SRV 330, and/or ST 340. Because various subsystems may have disparate mechanisms to specify, update, and/or determine access control policies, PE 360 may facilitate interaction of AOPC 310, AOA 320, SRV 330, and/or ST 340 with the various subsystems. In some embodiments, PE 360 may determine access control polices for one or more subsystems and provide the policies to AOPC 310, which may store the policies in a standardized format such as PR 350. In some embodiments, AOPC 310, AOA 320, SRV 330, and/or ST 340 may generate commands, queries, and/or other requests based, in part, on PR 350. The commands and/or requests may be converted by PE 360 (e.g. using APIs and/or program code) into corresponding commands and/or requests to the various subsystems. When a response is obtained, PE 360 may include functionality to: translate and provide the results to the requestor (e.g. one or more of AOPC 310, AOA 320, SRV 330, and/or ST 340) in a form compatible with PR 350, and/or update PR 350.

The term "entity" as used herein refers to any portion of a computer system or IT infrastructure that may have an associated access control policy or that could have an access control policy expressed to the entity. Entities may be actors and/or objects. An entity may be one or more of the following: users, roles, VMs, storage, servers, containers, data (including files, folders, records, binary large objects (or blobs), repositories, collections etc.), APIs, network, network IP addresses and/or network subnets; services (e.g. including IaaS, SaaS, PaaS, CaaS, microservices, etc.), infrastructure elements (including operating systems, databases, etc.). The term "entity" may be used when the description applies to both actors and objects. The term "entity" is also used to refer to functional units (e.g. routers, servers, etc.) or logical units (e.g. users, roles, etc.) of an IT infrastructure, which may be actors or objects to which access control policies may be applied. The term "role"

refers to the function or position of a user (e.g. developer, administrator, etc.) or an object, or a service, which may be used or assumed by an entity, in part, to get access to one or more objects. The term "role" is also used to refer to a function of a user in an organization, which may be determined from an organizational database (e.g. an HRM system) or directory, or specified as part of a user profile.

AOPC 310 may include security policy determination block (SPD) 312, which may determine an existing security policy for actors and/or objects. In some embodiments, AOPC 310/SPD 312 may read access control policies from some or all of the entities associated with an IT infrastructure. For example, AOPC 310/SPD 312 may read organizational access control policies for one or more of: (a) cloud services including those offered by IaaS providers such as AWS (including services such as EC2, S3, etc.) Azure, Google cloud, etc.; (b) private cloud infrastructure hosted by the organization such as VMware, Openstack, etc.; and/or traditional IT infrastructure running at organizational data centers/offices; (c) services, applications and/or components supported by and/or run on the IT infrastructures in (a) and/or (b) above (e.g. Linux instances, databases, distributed applications for big data storage and processing such as Hadoop, any other applications with associated access control policies including HRM applications, Customer Relationship Management (CRM) applications, various domain specific applications, etc.); (d) network security and/or access control policies specified in networking components, firewalls and routers; (e) enterprise systems such as data encryption and/or Lightweight Directory Access Protocol (LDAP) systems, which facilitate access to and maintenance of distributed directory information services over networks; (f) third party services and systems including SaaS services (such as Microsoft Office 365, Salesforce, independent software vendor (ISV) software components such as Oracle, etc.); (g) any other specified entity in the IT infrastructure that has an associated access control policy.

In some embodiments, AOPC 310/SPD 312 may use functionality provided by PE 360 to access and read security policies and/or access control policies related to actors and objects across an IT infrastructure (such as system 100 and/or a system comprising infrastructure and network subsystem 290, platforms/hosts subsystem 280, application subsystem 270 and data subsystem 260). In some embodiments, PE 360 may include functionality (which may be subsystem specific) to access and determine actors and objects associated with each subsystem that forms part of an IT infrastructure. In some embodiments, PE 360 may further include functionality to obtain attributes associated with the respective actors and objects. For example, PE 360 may access various cloud accounts and services (including private clouds, public clouds, and/or hybrid public-private clouds) associated with an IT infrastructure using appropriate (e.g. subsystem/cloud specific) APIs/scripts/program code to determine actors and objects, their respective attributes, and access control policies related to the actors and objects. PE 360 may also use some combination of APIs, scripts, and/or program code to access servers, computers, file systems, services, applications, etc. associated with a traditional (e.g. on premise) IT infrastructure to determine attributes and/or access control policies associated with entities. The information obtained by PE 360 may be communicated to SPD 312, which may provide some or all of the information to security policy normalization block (SPN) 314.

Figure 3B:
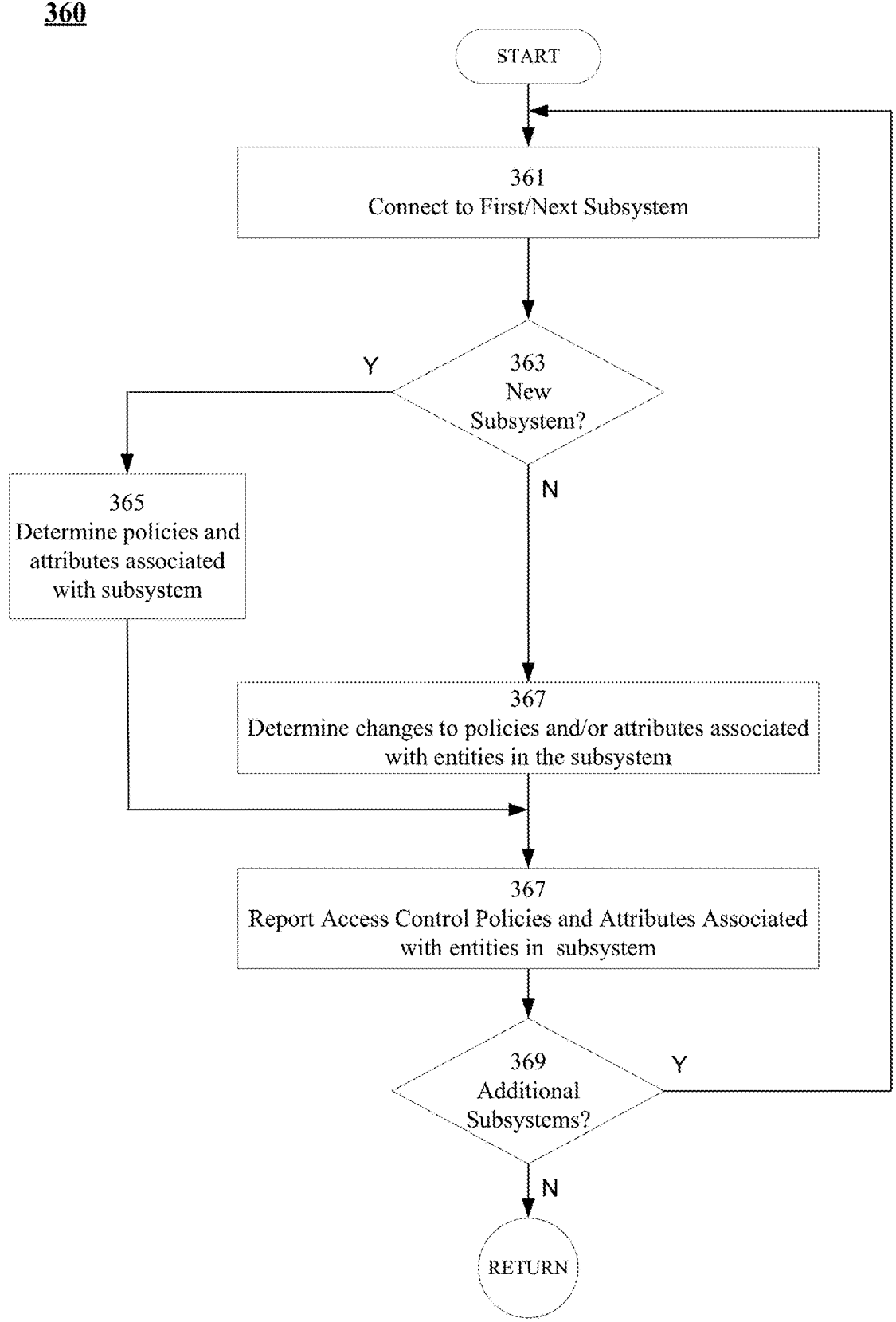
FIG. 3B shows an example flowchart illustrating some steps in a method for policy and attribute determination, which may be performed by a Policy Engine according to some disclosed embodiments.

FIG. 3B shows a flowchart 360 illustrating some steps in an example method associated with policy and attribute determination according to some disclosed embodiments. In some embodiments, method 360 may be performed by SPN 314. In some embodiments, method 360 may be performed for one or more subsystems associated with an IT infrastructure (e.g. one or more subsystems in IT infrastructure 100 or 200). In some embodiments, method 360 may be performed for each subsystem associated with an IT infrastructure (e.g. each subsystem in IT infrastructure 100 or 200).

In block 361, a connection to the first or next subsystem in the IT infrastructure may be established (e.g. by PE 360). For example, PE 360 may use one or more of: agents, APIs, scripts, programs, and/or data export/import functions to connect and/or interact with the current subsystem. In some embodiments, access permissions, attributes, etc. may be obtained by reading access logs, system databases, permission files, user profiles, etc. maintained by the subsystem.

In block 363, it may be determined (e.g. by PE 360) if the subsystem is new (e.g. newly added to the IT infrastructure or not previously processed). If the subsystem is new ("Y" in block 363) then, in block 365, access control policies and attributes (e.g. location, system type, domain, IP addresses, groups, etc.) associated with entities (e.g. actors and/or objects) in the subsystem may be determined. If the subsystem is not new ("N" in block 363) then, in block 367, any changes to access control policies and attributes (e.g. location, roles, system type, domain, IP addresses, groups, etc.) associated with entities (e.g. actors and/or objects) in the subsystem may be determined.

In some embodiments, in block 367, access control policies and/or attributes associated with entities (e.g. for a new subsystem) or any policy/attribute changes associated with entities (e.g. for a previously processed subsystem) may be reported. If there are additional subsystems ("Y" in block 369) then the next subsystem is processed in block 361, otherwise ("N" in block 369), control may be returned to the calling routine.

In some embodiments, method 360 may be invoked periodically (e.g. at some specified or predetermined interval), on demand (e.g. by an administrator or another program), or whenever a new subsystem is added or policies and/or attributes are changed. For example, changes in policies or attributes associated with entities and/or the addition of a new subsystem may trigger method 360 for policy and attribute determination. In some embodiments, method 360 may be run when a security or access control system is initially set up. In some embodiments, method 360 may be invoked by a subsystem when access policy changes or attribute changes for entities occur.

Accordingly, in some embodiments, AOPC 310/SPD 312 may obtain attributes about actors and objects including from the other information systems with the enterprise. In some embodiments, attributes associated with actors and objects (e.g. associated with an IT infrastructure) may be specified using tags. In some embodiments, attributes associated with every discovered and/or discoverable actor and object may be imported. For example, for users, a HRM system may have detailed information including about the attributes of employees and contractors. The attributes may include information pertaining to their location, division within an organization, type of role in the organization, hierarchy etc. Similarly, a data classification system may associate a corresponding data classification tag with data objects in the IT infrastructure. As one example, data classification tag associated with a specific S3 bucket object may indicate that the object includes sensitive personally identifiable information (PII). The term PII is used to describe any data that could potentially identify a specific individual. PII data may be subject to additional privacy or regulatory requirements.

In some embodiments, access policy related to an actor or object may be determined (e.g. by SPD 312) by interpreting all access control policies related to the subject and other entities, in part, by using functionality provided by PE 360. In some embodiments, the access control policies associated with an actor or object may be determined automatically. For example, an IT infrastructure (e.g. system 100/200) may be monitored (e.g. by SPD 312) to determine if there are changes to the system (additions, deletions and/or changes related to the security policies/access control policies) so that access policy graphs and/or clusters affected by the changes to the IT infrastructure may be reflected in PR 350. In some embodiments, monitoring of an IT infrastructure for changes (e.g. by SPD 312) may occur continuously, on some predetermined schedule (e.g. set by a system administrator), or periodically.

In some embodiments, agents coupled to PE 360 may monitor actors and/or objects in the IT infrastructure to detect changes affecting security policies and/or access control policies and may trigger functionality associated with AOC 310 and/or AOA 320 (described below) to update access policy graphs and/or clusters affected by the changes and update and/or augment PR 350.

In some embodiments, agents may also determine and/or select actors, objects, and connections during program run time based on the evaluation of the conditions. For example, agents may monitor actor and/or object instantiations, access requests to objects by actors, network traffic etc., and provide the information to PE 360 and/or SPD 312, which may process the information to determine access policies and provide the information to SPN 314 and/or access policy representation block (APR) 316 to normalize and/or update access policy graphs. In some embodiments, various access policy graphs (e.g. associated with individual actors/objects) may be combined to create a master access policy graph where each actor and/or object in the IT infrastructure is uniquely represented as a single node. The master access policy graph represents a collective logical representation of all policy objects expressed across all objects, services, and users in the IT infrastructure.

In some embodiments, AOPC 310 may further include security policy normalization block (SPN) 314, which may receive access control policy information for entities (e.g. actors and/or objects) associated with one or more subsystems from SPD 312, interpret each policy associated with the respective entities, and represent the policies in a normal or standardized form. In some embodiments, the normal or standardized from may be a generalized representation independent of any particular entity (e.g. the normalized representation may be entity/system/sub-system agnostic). For example, SPN 314 may represent security and/or access control policies in a form that is not specific to any particular subsystem or entity and in a manner that facilitates access control description across the various subsystems of an IT infrastructure in a consistent standardized format.

In some embodiments, SPN 314 may use a graph-based representation of access control policies, which is also referred to as an access policy graph. For example, each node in the graph may represent an actor or an object. A connection or edge between a pair of nodes in the graph may represent permissions or privileges provided to an actor node relative to the connected object node, and/or permissions or privileges denied to an actor node relative to the connected object node, and/or permitted (or disallowed) actions by the actor node on the connected object node. Tags associated with each node may represent attributes associated with that node. Edges in the graph may also include metadata (or labels) such as a number of times that the specific access associated with the edge has been used over a period of time. Information pertaining to the access policy graph (nodes, edges, and associated metadata) may be stored in a graph database or using any other database or representation.

Figure 3C:
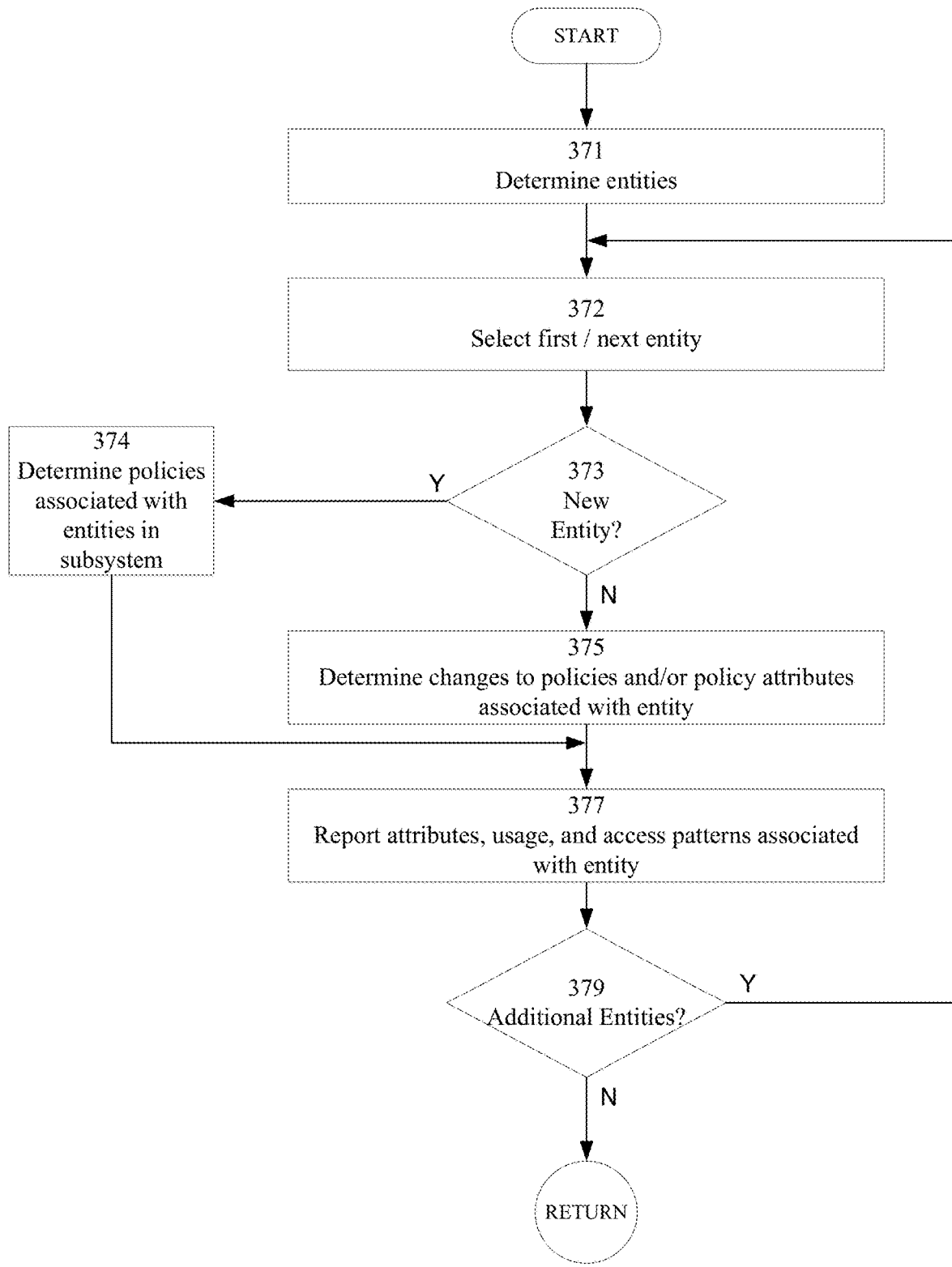
FIG. 3C shows an example flowchart illustrating some steps in a method for security policy normalization, which may be performed by a Security Policy Normalization engine according to some disclosed embodiments.

FIG. 3C shows an example flowchart illustrating some steps in a method 370 for security policy normalization. In some embodiments, method 370 may be performed by SPN 314 according to some disclosed embodiments.

In block 371, entities (actors and objects) associated with an IT infrastructure (e.g. IT infrastructure 100 or 200 or a portion thereof) may be determined. In some embodiments, for a graph based representation, each entity may be represented as a node.

In block 372, the first or next entity to be processed may be selected. In block 373, if the entity is new ("Y" in block 373) then, in block 374, for each access policy associated with the entity being processed, an edge may be created between the node and one or more other node(s). The edge may be annotated with information to the access policy. In some embodiments, edges outward from the first entity being processed (representing policies for accessing another second entity) may be associated with an outbound access policy graph for the first entity. In some embodiments, edges inward to the first entity being processed (representing policies to accessing the first entity by a second entity) may be associated with an inbound access policy graph for the first entity.

FIG. 3D shows an example table 380 depicting information in an outbound access policy graph associated with an entity. As shown in FIG. 3D, table 380 may include one or more of: (a) information pertaining to the current/first entity such as Entity ID 381; (b) one or more second entities accessible by the current/first entity such as shown in "Has Access To" field 382; (c) access paths 383 available to the first entity to access a second entity; (d) roles 384 associated with each access path to the second entity; (e) permissions associated with an access path to the second entity and/or role 385; (f) a time when the access policy to the second entity was first created 386; (g) a time that the access path or edge to the second entity was first exercised 387; (i) a time when the access path/edge to the second entity was last exercised 388; (h) a use count 389 indicating the number of times the access path/edge to the second entity was exercised; etc. Table 380 is merely exemplary and various other fields and/or metadata may be associated with entities and/or each edge/access path.

FIG. 3E shows an example table 390 depicting information in an inbound access policy graph associated with an entity. As shown in FIG. 3E, table 390 may include one or more of: (a) information pertaining to the current/first entity such as Entity ID 391; (b) one or more second entities that may access the current/first entity such as shown in "Can Be Accessed By" field 392; (c) access paths 393 available to access the first entity (e.g. by the second entities); (d) roles 394 associated with each access path to the first entity; (e) permissions associated with an access path to the first entity and/or role 395; (f) a time when the access policy to access the first entity was first created 386; (g) a time that the access path or edge to the first entity was first exercised 387; (h) a time when the access path/edge to the first entity was last exercised 388; (i) a use count 389 indicating the number of times the access path/edge to the first entity was exercised;

etc. Table 390 is merely exemplary and various other fields and/or metadata may be associated with entities and/or each edge/access path. In some embodiments, the information in tables 380 and 390 may be combined.

Referring to FIG. 3C, in block 373, if the entity is not new ("N" in block 373) then, in block 375, changes to access policies associated with the entity being processed may be determined and edges may be created (to reflect new inbound/outbound policies), deleted (to reflect access revocations), or modified (e.g. to reflect access policy changes). In some embodiments, access logs and/or other system information may be used to determine attributes and metadata for each access policy and edge, which may be used to populate tables 380 and/or 390 (e.g. in block 374 and/or 375).

In block 377, the attributes, policies, usage and/or access patterns associated with entities may be reported and/or updated. If there are additional entities to be processed ("Y" in block 379), then the next entity is selected in block 372, otherwise ("N" in block 379), control may be returned to the calling routine.

In some embodiments, SPN 314 may additionally, or alternatively, specify access control rules in PR 350 (e.g. associated with entities in the IT infrastructure) using logical expressions. The logical expressions above may reflect access control policies associated with one or more physical entities (actors and/or objects) in an IT infrastructure (e.g. system 100/100). A stated policy, which may include rules for one or more entities, may also be specified in PR 350 using logical expressions. In some embodiments, expressions based on first order logic may be used to represent access control policies in PR 350 for implemented policies, stated policies and derived policies.

In some embodiments, SPN 314 may communicate access control policy information for actors and/or objects to access policy representation (APR) block 316, which may store the access control policy as part of PR 350. In some embodiments, PR 350 may comprise one or more access policy graphs. In some embodiments, APR 316 may build a new PR 350, augment an existing PR 350, and/or update an existing PR 350 to reflect changes to access control policies and/or to reflect any changes (additions to, deletions of, and/or changes to system entities, including objects and/or actors) to IT infrastructure based on information provided by SPN 314.

In some embodiments, access policy graphs for an object may be determined (e.g. by SPN 314 and/or APR 316) by interpreting all access control policies related to the object and other entities, in part, by using functionality provided by PE 360 and information provided by SPD 312. Access policy graphs may track entitlement thereby indicating privileges available to actors (e.g. objects accessible or denied to actors, privileges available or denied to actors), the type of access (read, write, execute, etc.), and/or conditions under which the access is available. In some embodiments, a node may be created for objects and actors in the graph. An edge in the policy graph between two nodes may indicate whether a specified policy allows access and the type of access. For example, edges may be annotated with labels that reflect the kind of access that is allowed (e.g. read, write, execute etc.), privileges available or denied, and/or conditions under which the access is available.

In some embodiments, APR 316 may facilitate storing of a standardized policy representation in the form of PR 350. In some embodiments, APR 316 may use information received from SPN 314 to modify, update, and/or refine PR 350. For example, APR 316 may tag each node in a graph associated with PR 350 with the collective set of attributes learnt about an object. In some embodiments, each entity in an IT infrastructure (e.g. system 100/200) may be associated with two access policy graphs. In some embodiments, SPR 316 may create, modify, and/or update two access policy graphs for each entity (e.g. actors and/or objects) associated with the IT infrastructure.

In some embodiments, access policy graphs (nodes, attributes, connections, etc.) may be represented using a database. For example, a graph database or another type of database may be used to store the access policy graphs. The access policy graph database may be created by evaluating policy statements (e.g. obtained by SPD 312 and/or normalized by SPN 314) associated with entities in the IT infrastructure for a plurality of input parameters, and then using the result of that evaluation to determine if an edge can be placed between the entities/nodes (e.g. between an actor and object) and to determine any attributes associated with the edge. In some embodiments, policy statements for each entity associated with the IT infrastructure may be evaluated for all input parameters to determine if an edge can be placed between the entities/nodes.

In some embodiments, PR 350 may comprise a graph database/database management system (DBMS). A graph database may use graph or graph like structures for semantic queries with nodes, edges, and properties to represent and store data. In graph databases, "edges" or "connections" may be represented. Each edge may directly relate data items (e.g. nodes) in the database and allow data (e.g. nodes) in the store to be linked. Graph databases may be coupled with database management systems (DBMS), which may facilitate the efficient processing and running of queries on the graph, without changing the logical structure of the graph. In some embodiments, access policy graphs may be saved and/or cached in a database for analysis and query processing. In some embodiments, analysis and querying of the access policy graph may be facilitated using saved queries and/or by running a real time query of the logical statements. The database may support incremental updates to the access policy graph. In some embodiments, the database may support queries that identify changes to one or more access control policies. In some embodiments, the database may support queries pertaining to entities affected by a change in access control policy.

In an access policy graph based representation for PR 350, edges may relate actors and objects. Properties associated with edges may determine whether access is allowed, access type, privileges allowed or denied, and/or the conditions under which the access is allowed. For example, in some cases, an evaluation may yield a conditional result (e.g. access is allowed, but only between 8-10 am). In such cases, an edge (e.g. a database record associated with the actor and/or object) may be annotated with the conditions related to the access. In some cases, nodes may be created for a meta-object (such as a group) that may serve as an indirection between actors and objects. Meta-objects may facilitate representations of equivalence classes, which are actors or objects that may share one or more properties. For example, an actor (e.g. user 106-1 in FIG. 1) may have access to a group (e.g. User Group 106), which may have access to objects (e.g. data server 180), implying the actor (e.g. actor 106-1) also has access to those objects (e.g. data server 180).

In some embodiments, access policy graphs may be determined automatically. For example, an IT infrastructure (e.g. system 100) may be monitored (e.g. by SPD 312) when deployed and/or to determine if there are changes to the system (additions, deletions and/or changes related to the security policies/access control policies) so that access policy graphs and/or clusters affected by the changes to the IT infrastructure may be reflected in PR 350. In some embodiments, monitoring of an IT infrastructure for changes (e.g. by SPD 312) may occur continuously, on some predetermined schedule (e.g. set by a system administrator), or periodically. In some embodiments, agents coupled to PE 360 and/or SPD 312 may monitor actors and/or objects in the IT infrastructure to detect changes affecting security policies and/or access control policies and may trigger functionality associated with AOC 310 (e.g. SPN 314 and/or SPR 316) and/or AOA 320 (described below) to update access policy graphs and/or clusters affected by the changes and create, update and/or augment PR 350.

In some embodiments, agents may also determine and/or select actors, objects, and connections during program run time based on the evaluation of the conditions. For example, agents may monitor access requests to objects by actors, network traffic etc., and provide the information to PE 360 and/or SPD 312, which, in turn, may provide information to SPN 314 and/or SPR 316 to determine and/or update access policy graphs and information pertaining to usage of edges/paths for access.

In some embodiments, a semantic analysis of the access control policies may be performed across the IT infrastructure. For example, one or more of: actors, objects, roles, the privileges available to actors relative to some object, and conditions under which those privileges are available, may be determined. Because similar or equivalent policies may be expressed by various subsystems differently, SPD 312 and/or SPN 314 may facilitate consistent interpretation of the policies across the IT infrastructure.

In some embodiments, a first access policy graph for a first entity (e.g. a subject entity), which may be viewed as an inbound graph for the first entity (e.g. the subject entity), may indicate one or more second entities that may access or have access the subject entity. The access to the subject entity by the one or more second entities may be direct (e.g. from the second entity) or indirect (e.g. based on access control policies that facilitate access, by one or more of the second entities, to the subject entity through other entities in the infrastructure). In some embodiments, the second access graph, which may be viewed as an outbound graph for the first entity (e.g. the subject entity), may represent one or more third entities in the infrastructure that may be accessed by or are accessible to the (first) subject entity both directly (e.g. by the subject entity) or indirectly (e.g. based on access control policies that facilitate access, by the subject entity, to the third entities through other entities in the infrastructure). Indirect access may, in some instances, be viewed as a transitive property so that an if an entity A has appropriate access to B (e.g. an ability to invoke functionality associated with B) and B (e.g. the functionality associated with B available to A) has access to an entity C, then, A may be viewed as having access to C (as limited by any access control policy applicable to the functionality associated with B). In some embodiments, PR 350 may comprise, for each object, the inbound and outbound access policy graphs outlined above (e.g. as shown in tables 390 and 380, respectively). In some embodiments, each access graph may reflect multiple paths that may be available for one entity to access another entity. As outlined above, access policy graphs for a first entity may be constructed by looking at each policy that applies to the first entity, either (a) for accessing other second entities, or (b) for second entities to access the first entity. The access policies may be represented by edges in the access policy graph between the first entity (which may be represented by a node in the access policy graph) and the one or more second entities (other node(s) in the access policy graph). The edges may be associated and/or annotated with access control policy parameters reflecting the access policy and/or access usage information.

In some embodiments, various access policy graphs (e.g. associated with individual actors/objects) may be connected to create a master access policy graph where each actor and/or object in the IT infrastructure is uniquely represented as a single node. The master access policy graph represents a collective logical representation of all policy objects expressed across all objects and services in the IT infrastructure, and may be used to determine access between entities (including the type of access and conditions of access). In some embodiments, timestamped master access policy graphs and/or PR 350 may be saved periodically. Saving timestamped master access policy graphs and/or PR 350 may facilitate system audits of past security policies.

In some embodiments, actor-object aggregation engine (AOA) 320 may update PR 350 by reading a stored PR 350 (e.g. generated by AOC 310) and then update and augment PR 350 by clustering actors and objects. The term "clustering" refers to identification of one or more attributes or properties that relate actors or objects. For example, machine learning and/or other artificial intelligence techniques may be used to determine clusters of actors and/or objects. In some embodiments, AOA 320 may comprise automatic cluster discovery block 322 (ACD), which may use a variety of techniques (e.g. machine learning) to determine actor and/or object clusters in PR 350.

The properties used to determine actor and/or object clusters may include similarity in one or more of: tags associated with the actors/objects, attributes associated with the respective actors/objects and/or conditions under which they may access objects or be accessed by actors. In some embodiments, ACD 322 may determine an actor cluster based on the availability of access, to actors in the cluster, to all objects in a group. In some embodiments, a plurality of actor/object clusters may be determined automatically.

In some embodiments, ACD 322 may use tags associated with each node and its associated (inbound and outbound) access policy graphs to automatically determine clusters of objects or actors relative to that node. ACD 322 may aggregate the actors and objects that are part of PR 350 to identify groups of actors (or objects) that are interconnected in the same way or that have similar access (or may be accessed similarly). Clustering may be viewed as an expression of a policy reflecting an organizational intent. For example, based on tags associated with one or more objects (e.g. Office Location="San Jose" and Department="HR," which may be obtained based on some combination of LDAP and/or a HRM system), ACD 322 may determine that a set of actors (e.g. users with the attributes Office Location="San Jose" and Department="HR", above) have access to certain data objects. As another example, developers (e.g. actor: users associated with "Group: developer") may be determined to have access to objects and services in DEV (object: workloads associated with "Category: DEV"). Accordingly, ACD 322 may cluster the developers (actors) in relation to the DEV workloads (objects) and, conversely, cluster the DEV workloads (objects) in relation to developers (actors). In some embodiments, the set of actors may be clustered in relation to the set of objects and vice versa. Accordingly, an actor may belong to multiple clusters (relative to one or more objects). Conversely, an object may belong to multiple clusters (relative to one or more actors).

In some embodiments, ACD 322 may determine (e.g. even in the absence of an explicit tag or shared attribute), if actors with certain characteristics (e.g. actor: users with "Group: developer") can access one or more subject objects under similar conditions (e.g. cloud services from specified locations). Upon determination of actors satisfying the above characteristics, ACD 322 may cluster such actors relative to those subject objects/object clusters and, conversely, the objects may be clustered relative to the actors/actor clusters).

As a further example, specific production workloads (objects) may be accessible from the specified network address ranges (which may correspond to some location). Accordingly, ACD 322 may determine: (a) an object cluster corresponding to the production workloads accessible from the specified network address ranges; and/or (b) an actor cluster based on grouping actors who may be associated with the network ranges (or the locations associated with the network ranges). As another example, access to a set of AWS S3 buckets may be restricted to users associated with an "Operations" group connecting from the European Union (EU) (actors). Thus, ACD 322 may cluster the set of AWS S3 buckets (based on access to the AWS S3 buckets being restricted to the EU Operations group), and cluster the EU Operations group (based on their common ability to access the set of AWS S3 buckets). In some embodiments, ACD 322 may use indirect correlations like location information in HR records and/or other organizational databases to determine and/or further refine discovered clusters.

In some embodiments, derived policy detection block (DPD) 324 may determine policies associating actors and/or objects (or actor clusters and/or object clusters), in part, by analyzing relationships (nodes, edges, and/or attributes) between entities and/or entity clusters in access policy graphs. For example, DPD 324 may derive implicit higher level policies based on PR 350, by analyzing connections between entities in PR 350. For example, actor and/or object clusters determined by ACD 322 and the relationships governing the clusters may be used (e.g. by DPD 324) to derive a higher level access control policies (which may be implicit in the implemented policies). The higher level access control policies may reflect a desired (but implicit) organizational intent relative to access control for one or more entities associated with the IT infrastructure. Thus, in some embodiments, DPD 324 may derive one or more policies based on an analysis of PR 350 and clusters in PR 350 (e.g. as determined by ACD 322).

In some embodiments, the policies derived by DPD 324 may be based further on information provided by ACD 322 (e.g. actor/object clusters). The derived policies may be determined (e.g. by DPD 324) based on an analysis of various entities in PR 350 and any associated groups. For example, for a specific workload, access to a set of data objects {A} tagged as sensitive may be granted to a set of users {X}, while users of set {Y} may not have access to {A}. In some embodiments, DPD 324 may use a corporate directory or HR system to determine roles associated with for users {X} with access to {A} and roles associated with users {Y} without access to {A}. DPD 324 may determine (e.g. from the HR system) that users {A} are in an organizational "Ops" operations group, while users {Y} are in an organizational "Dev" developer group, then, DPD 324 may derive a policy that sensitive data (e.g. data tagged "sensitive") may not be made accessible to developers (in the "Dev" group) and that sensitive data may be accessible to users in operations (in the "Ops" group). In some embodiments, DPD 324 may use clustering techniques, machine learning, and/or artificial intelligence to determine derived (implicit) policies.

In some embodiments, policy representation compression block (PRC) 326 may augment PR 350, by obtaining a compressed version an existing PR 350 based on one or more of: discovered clusters and/or derived policies, and storing the compressed version as part of PR 350. In some embodiments, a representation of the clustered actors and/or objects along with their respective rules/policies may form part of PR 350. Thus, PRC 326 may compress an existing PR 350 based on actor/object clusters (e.g. determined by ACD 322) and/or derived policies (e.g. determined by DPD 324). In some embodiments, determination of access policy graph clusters for actors and/or objects (e.g. by ACD 322) and/or determining derived policies (e.g. by DPD 324) may facilitate a representation (e.g. by PRC 326) that provides a hierarchy of policies governing access relationships between entities associated with the IT infrastructure. In some embodiments, PRC 326 may facilitate a representation that provides different granularities or levels of detail of the relationships between entities in an IT infrastructure. For example, an access policy graph associated with a first node (actor or object) may provide detailed access relationships between the first node and one or more other nodes, while clusters associated with the first node may facilitate a view or analysis of access relationships at a high level.

In some embodiments, a system may include stated access control policies (e.g. which may be normalized and stored in PR 350). For example, a stated access control policy may indicate that users with attributes {Y} (e.g. "Dev") may be denied access to entities with attribute {A} (e.g. data tagged "sensitive"). System Rule Verification block (SRV) 330 may compare derived access control policies with one or more stated access control policies to determine anomalies or deviations of the implemented policy for one or more entities from the stated access control policy. In some embodiments, System Rule Verification block (SRV) 330 may facilitate verification of derived policies (e.g. obtained by DPD 324) and/or implemented policies as represented by PR 350 against the stated policies, (e.g. provided by a system administrator). In some embodiments, SRV 330 may also facilitate determination of deviations or inconsistencies of an implemented policy relative to a derived policy. For example, a derived policy (e.g. based on machine learning) may indicate that developers may not access data tagged as "sensitive." However, an implemented policy may allow access to data tagged "sensitive" for a specific developer "D1," which is not consistent or anomalous with the derived policy. In some embodiments, the set of anomalous and/or non-compliant access control policies may be disabled (e.g. by SRV 330); or a message identifying the set of non-compliant access control policies may be transmitted (e.g. by SRV 330 to an administrator), or the set of non-compliant access control policies may be flagged (e.g. by SRV 330) for further evaluation (e.g. by an administrator); or a risk score associated with each non-compliant access control policy may be increased. In some embodiments, because derived policies may be determined based on clustering (e.g. using one or more attributes common to entities) and machine learning, anomalies, outliers, and other inconsistent patterns may be detected and flagged by machine learning models.

In some embodiments, SRV 330 may compare one or more stated access control policies with one or more derived access control policies to determine differences. In some embodiments, SRV 330 may determine exceptions to one or more stated access control policies and/or derived access control policies. For example, based on all users in an "Ops" group and 1 user in a "Dev" group with access to an S3 bucket, a derived access control policy may infer that all "Ops" users are allowed access to the S3 bucket. SRV 330 may determine that the one "Dev" user with access to the S3 bucket is an exception. In some embodiments, any exceptions to derived access control policies and/or stated access control policies may be presented to an administrator for approval. In some embodiments, SRV 330 may evaluate changes to one or more access control policies to determine if the changes are inconsistent with a stated access control policy or a derived access control policy.

For example, SRV 330 may include User Policy Verification block (UPV) 332, which may verify implemented policies for users (e.g. users 102 based on PR 350) against specified policies for those users; Data Policy Verification block (DPV) 334, which may verify implemented policies (e.g. based on PR 350) for data objects (e.g. stored in various subsystems of the IT infrastructure) against specified policies for the data entities; Host/Platform Policy Verification block (HPV) 336, which may verify implemented policies (e.g. based on PR 350) for Hosts/Platforms (e.g. across various subsystems of the IT infrastructure) against specified policies for the entities; and Network Policy Verification block 338, which may verify implemented policies (e.g. based on PR 350) for network entities (e.g. forming part of the IT infrastructure) against specified policies for the entities.

In some embodiments, System Testing block (ST) 340 may test policies against various specified or exemplary policies. In some embodiments, invariant checking (IC) block 342 may check actual implemented policies (e.g. based on a current PR 350) against a list of stated policies (e.g. provided by a system administrator and/or expressed in PR 350) and/or derived policies (e.g. obtained by DPD 324) that are considered invariant (e.g. organization, IT infrastructure, or subsystem wide policies).

In some embodiments, best practices (BP) testing block 344 may check implemented policies (e.g. based on PR 350) against policies that are considered to be best practices. For example, the results obtained by BP 344 may provide an indication or measure of how closely implemented policies track an adopted "best practices" security/access control policy such as separation of duties. For example, separation of duty guidelines may specify that a single user may either: (a) access some data object, or (b) modify access control permissions to that data object. However, per separation of duty guidelines, the user may not perform both (a) and (b) above. Accordingly, BP 344 may determine and flag violations of any adopted separation of duties policy and/or any other adopted best practices policy.

Other examples of best practices policies are compliance policy checklists such as those outlined in "CIS Amazon Web Services Foundations," v 1.20, updated May 23, 2018, which is hereby incorporated by reference in its entirety. Similar benchmarks exist for other cloud platforms such as Microsoft Azure and Google Cloud Platforms. Cybersecurity best practices are also specified by the Center for Internet Security, which publishes CIS benchmarks for various operating system, servers, cloud providers, devices, etc.

CIS benchmarks are prescriptive policies for system administrators to enforce. In some embodiments, BP 344 may evaluate the actual implemented policies (e.g. based on PR 350) against a set of best practice policies (such as CIS benchmarks). The evaluation may be done periodically and/or at specified time intervals. In some embodiments, BP 344 may flag a specific policy as a violation of a best practices policy (e.g. as specified by a benchmark). In some embodiments, BP 344 may automatically remedy the best practices violation (e.g. remove public access to a system log) when authorized. In some embodiments, BP 344 may include best practices modules to validate implemented access control policies against one or more standards such as CIS, General Data Protection Regulations (GDPR), Payment Card Industry (PCI), Health Insurance Portability and Accountability Act (HIPAA), National Institute of Standards and Technology (NIST), etc. In some embodiments, BP 344 may also accept custom best practice policies, which may be specified by a user.

In some embodiments, scenario testing (SCT) block 346 may check implemented policies (e.g. based on PR 350) against policies that model one or more scenarios. For example, SCT 346 may be used to determine the impact of a hacker hijacking or otherwise gaining access to one or more entities in the IT infrastructure. Accordingly, in some embodiments, SCT 346 may facilitate gradation of actors and/or objects based on the risk they pose to the rest of the IT infrastructure, in the event that the actors and/or objects are compromised. In some embodiments, SCT 346 may facilitate identification and monitoring of critical actors and/or objects in the IT infrastructure.

In some embodiments, ST 340/SCT 346 may facilitate modeling of access control policy changes prior to deployment across exemplary security infrastructure 300. Modeling may help alleviate any adverse impact of the policy changes. For example, a proposed access control policy change may be made in a simulation mode in SCT block 346 to determine if any of the invariant checks or best practices checks are violated. The impact of any access control policy changes may also be assessed in terms of whether there is a net increase or decrease in access to one or more entities. One or more of the above factors (consistency with invariant policies and/or best practices or change in access) may be used allow or disallow the proposed changes.

In some embodiments, user query (UQ) block 348 may process user queries related to system entities by querying and searching PR 350. In some embodiments, a master access graph (or a representation thereof) may be used for the queries. For example, a system security professional may use a web interface or an API to form a query and submit the query for processing. Queries may be used to determine one or more of: (a) which entities have access to another entity and the locations and/or conditions under which such access is permitted; (b) which entities are accessible from a specified entity; (c) whether a specified entity is accessible from one or more other specified entities at one or more specified locations; (d) whether access to one or more entities was permitted at one or more times in the past (e.g. based on historical records such as a prior stored and timestamped PR) such as and/or the duration of such past access. For example, an access policy may grant user A1 access to data B2, which may have been used by user A1 to access data B2 twenty times over a period two weeks. In some embodiments, UQ 348 may facilitate queries and/or searches to determine access patterns to data B2 by user A1, including information pertaining to the times of access, the type of access, access paths exercised, and/or roles, locations, devices, etc. used by A1 to access B2.

In some embodiments, SV 330 and/or ST 340 may include functionality to export the results from verification and searches into reports, save searches, and/or share the results with others. In some embodiments, ST 340 may facilitate the saving of search queries, and/or the running of queries automatically according to some schedule, periodically, or continuously. In some embodiments, SV 330 and/or ST 340 may alert (e.g. via e-mail, text message, pop-up window, or in some other specified manner) users (e.g. security professionals and/or system administrators, and/or other designated personnel) with the verification results and/or results of a query. In some embodiments, the alerts may be delivered in real-time time. In some embodiments, alerts with query results and/or determined security/access control policy violations may be sent using a web interface, and/or through integration with systems such as a Security Information and Event Management (SIEM) system. SIEM systems leverage functionality associated with security information management (SIM) systems and security event management (SEM) systems to provide real-time analysis of security alerts generated by applications and network hardware.

In some embodiments, SV 330 and/or ST 340 may facilitate verification, testing, searching, and/or modeling of access control policies related to various entities based on access control policies for respective groups and departments within an organization. For example, an internal audit team in a specific country may have a specific set of search queries related to finding inappropriate access patterns in the local infrastructure.

In some embodiments, SV 330 may verify and/or ST 340 may facilitate querying in relation to some specified set of policies at a specific point in time by performing a modeling analysis of PR 350 (e.g. via an access control policy graph). For example, to determine (e.g. in response to a user query or request for policy verification) whether a specific object may be accessed by an actor under some specified set of policies, a model access control graph may be created where the attributes and/or connections associated with one or more nodes in the model access control graph may reflect the specified set of policies. In some embodiments, the model access graph may then be traversed starting at the node associated with the actor specified in the user query to determine if at least one path (a sequence of edges starting from the node associated with the actor) exists to the node associated with the object. In some embodiments, SV 330 may verify and/or ST 340 may facilitate querying in relation to the quantum of access (e.g. number of times an object was accessed) over some specified time period.

For example, if it is to be determined whether a specific user will have access to an AWS S3 bucket, then a model graph may be created based on the specified set of policies and the model graph may be traversed starting at the user (specified actor) to determine if at least one path exists to the S3 node and then to the specific S3 bucket (specified object). As a further example, if it is to be determined that only developers in Group A (actor cluster) may access an AWS S3 bucket (object), then the inbound model access graph associated with the node for the AWS S3 bucket and/or the master model access graph may be traversed to determine if paths from other actors (i.e. other than "developers in Group A") exist to the AWS S3 bucket. If no paths from other actors (i.e. other than "developers in Group A") exist (e.g. the result of the query is empty), then the rule or policy may be validated. Conversely, the rule or policy may be invalidated if paths from other actors exist (e.g. the result of the query is non-empty). In some embodiments, some functionality associated with SV 330 and/or ST 340 may be run continuously (e.g. in the background) and users may be alerted when anomalies are detected with respect to a stated policy or a derived policy. In some embodiments, SV 330 and/or ST 340 may facilitate querying, or verification, and/or analysis of access history and/or access pattern history at an earlier point in time based on access control policies that were in force at that point of time.

In some embodiments, ST 340 may include functionality to validate access control policy changes in Continuous Integration & Delivery (CI/CD) software development pipelines. For example, prior to deployment of a new CI/CD software development pipeline, ST 340 may obtain access control policies (e.g. using functionality provided by PE 360 and/or AOPC 310) from source code in a source code repository or in scripts and templates (e.g. AWS cloudformation templates, which specify the AWS resources used to run a cloud based application). In some embodiments, the access control policies obtained by ST 340 may be automatically validated against stated policies and/or derived polices (including invariant policies) and/or best practices. If no policy violations are determined to exist, then the CI/CD software development pipeline may be validated for deployment. Otherwise, (if policy violations exist), then the CI/CD software development pipeline may be flagged, and, in some instances, deployment may be prevented.

In some embodiments, access control rules in PR 350 that are associated with entities in the IT infrastructure may be specified using logical expressions. The logical expressions above may reflect access control policies associated with one or more physical entities (actors and/or objects) in an IT infrastructure (e.g. system 100). A desired set of one or more rules for one or more entities may also be specified using logical expressions. In some embodiments, expressions based on first order logic, second order logic or higher-order logic may be used for both the implemented rules and the desired rules. In some embodiments, the set of logical expressions (which embody the desired rules and implemented rules) may be viewed as a satisfiability problem.

In some embodiments, SV 330, ST 340, and/or PE 360 may include functionality to determine whether a solution exists for the satisfiability problem. Solutions to the satisfiability problem (when present) reflect consistency (e.g. a lack of conflict) in the set of logical expressions (i.e. that the desired rule would not conflict with a set of existing rules so that the policies would be consistent). In some embodiments, when a solution exists, the set of logical expressions may be resolved to determine a solution.

For example, a logical expression specifying that users A and B are part of an LDAP group X may be written as:

$$\text{Group }(X,A,B)=(\text{and }(\text{or }(=\text{user }A)(=\text{user }B))(=\text{group }X)) \qquad (1).$$

Further, a logical expression to indicate access to role Y by group X may be written as $$\text{Role}(Y,X)=(\text{and }(=\text{group }X)(=\text{role }Y)) \qquad (2).$$

A logical expression to indicate that role Y has access to object Z may be written as $$\text{Object}(Z,Y)=(\text{and }(=\text{role }Y)(=\text{object }z)) \qquad (3).$$

Accordingly, based on the above expressions and a specific value for object z=p, ST 340 may be able to determine values of "user" u1, u2 . . . so that equations (1)-(3) above are satisfied. The solutions may provide paths from the "user" values u1, u2 . . . to object p in the access policy graph. Additional logical expressions may be used to reflect constraints such as various types of access, conditions of access, dependencies, and/or permission attributes. In some embodiments, SV 330 and/or ST 340 and/or PE 360 may include functionality to validate existing access control policies against the set of stated and derived intents and best practices as expressed by corresponding logical expressions.

In some embodiments, SV 330 and/or ST 340 and/or PE 360 may include functionality to check proposed policies for consistency with existing stated policies and/or derived policies prior to deployment.

In some embodiments, SV 330 and/or ST 340 and/or PE 360 may include functionality to determine solutions for various queries or "what if" scenarios such as "can X can access Y" and (if X can access Y), to determine at least one access path from X to Y. In some embodiments, a solution may yield all values for which the policy constraints are satisfied. Therefore, for a specified policy constraint set, a solution may yield a list of actors that have access to a given object and the corresponding paths of access through the access graph. Solutions may also yield values of free parameters. For example, a solution may indicate that access to an object is allowed with the constraint that location values lie within some enumerated set.

As another example, the absence of a solution to a negated rule may be used to infer that a rule achieves the desired result. For example, SV 330 and/or ST 340 and/or PE 360 may provide functionality to determine whether entities with a first set of attributes (e.g. an actor cluster) may always be able to access other entities with a second set of attributes (e.g. an object cluster) with a specific set of permissions (e.g. read only). In some embodiments, the desired rule above may be expressed using a logical expression (e.g. first order logic). The logical expression above (reflecting the desired rule) may then be negated (e.g. using a NOT logical operation) to obtain a negated desired rule. The negated desired rule and the existing or implemented rule set may be evaluated for consistency as described above. If no solution can be found, then then an inference may be drawn that entities with the first set of attributes (e.g. an actor cluster) may always be able to access other entities with the second set of attributes (e.g. an object cluster) with the specific set of permissions (e.g. read only).

In some embodiments, functionality associated with ST 340 and/or AOPC 310 and/or PE 360 may be used to build new access policy graphs based on an existing PR 350 (e.g. an existing access policy graph). In some embodiments, a sequence of queries (e.g. using ST 340) may be used to determine attributes of entities and relationships, which may be used to construct new access policy graphs (e.g. using SR 316). For example, ST 340 may run one or more queries to determine: (a) whether an entity X has access to an entity A with a first set of permissions under a first set of specified conditions; and (b) whether an entity Y may be accessed by A with a second set of permissions under a second set of specified conditions. If the result to one or both questions is "true," then, ST 340 may export the entities and paths related to each "true" result, which may then be sent to AOPC 310/SPR 316 to construct an access policy graph based on the results. Accordingly, users may be able to obtain snapshots of access control policies associated with portions of an IT infrastructure. In the example above, if the result to both questions is false, the process may stop.

In some embodiments, functionality associated with ST 340 and/or AOPC 310/SR 316 and/or PE 360 may be used to incrementally update an access policy graphs based on an existing PR 350 (e.g. an existing access policy graph). In some embodiments, a sequence of queries (e.g. using ST 340) may be used to determine attributes of entities and relationships, which may be used to construct new access policy graphs (e.g. using SR 316). For example, ST 340 may run one or more queries to determine: (a) whether an entity X has access to an entity A with a first set of permissions under a first set of specified conditions; and (b) whether an entity Y may be accessed by A with a second set of permissions under a second set of specified conditions. If the result to one or both questions is "true," then, ST 340 may export the entities and paths related to each "true" result, which may then be sent to SPR 316 to construct an access policy graph based on the results. The access policy graph obtained above may be cached or saved. In some embodiments, ST 340 and/or AOPC 310/SR 316 and/or PE 360 may iterate through steps (a) and (b) above, where, prior to an iteration, results from any prior iterations may be excluded. Thus, at each iteration, the results from any prior iterations are excluded so that the stored/cached access policy graph may be updated based on the results from the current iteration. The iterations may continue until no further results are obtained.

In some embodiments, for a sequence of queries, any access policy graph resulting from each query, may be cached and/or stored in a database (e.g. graph database), which may facilitate subsequent analysis, querying, and/or incremental updating of the access policy graph. In some embodiments, the database may be queried to identify changes to a one or more access control policies, and to determine entities impacted by the access control policy changes. In some embodiments, SV 330 and/or ST 340 and/or PE 360 may facilitate determination of a change audit trail that captures all access changes that may have occurred across all entities over a specified time period. Accordingly, entities affected by access policy changes may be determined and unintended effects may be remedied. For example, access to an object O1 may be granted to an entity E4, if an access policy change (inadvertently) affected entity E4's access to object O1 or the access policy change may be modified to remove unintended consequences.

In some embodiments, upon a determination that a desired policy is being violated, one or more specific rules that contribute to the violation may be identified and the information may be provided to a user. For example, as a result of an access policy graph traversal, SV 330 and/or ST 340 and/or PE 360 may determine an access path exists that is non-compliant with some specified policy. A rule or rules and/or object attributes that contribute to the violation may be flagged and reported to the user. In some embodiments, the user may be provided with information pertaining to rule changes that may stop the non-compliant behavior. In some embodiments, the impact of any proposed rule changes (e.g. on system entities) may also be presented to the user. In some embodiments, SV 330 and/or ST 340 and/or PE 360 may include functionality to automatically remediate the policy violation by modifying the access control policy such that it is consistent with specified rules. In some embodiments, a user may specify some risk threshold (e.g. based on policy violations related to some sensitive entities or specific types of violations) above which automatic remediation may be enabled.

In some embodiments, the system may determine, for a plurality of entities, the types of access used over some time period (e.g. specified by an administrator). Access types for the entities over the time period may provide an access usage profile for the entities. In some embodiments, the access usage profile for an entity, as determined above, may be viewed as describing a typical usage behavior for that entity. In some embodiments, profiles associated with any existing entity clusters may be used to normalize the usage profile.

In some embodiments, SV 330 and/or ST 340 and/or PE 360 may compare a current usage of access for an entity or a group of entities against the respective access usage profiles to identify anomalous access behavior. In some embodiments, an existing normalized usage profile for an entity or group of entities may be used to reduce false positives and negatives when determining anomalous access behavior.

In some embodiments, SV 330 and/or ST 340 and/or PE 360 may perform a least privilege analysis for every entity where, for each entity being analyzed: (a) the types of access and usage pattern over some time period may be determined, and (b) access types that have not been used over the time period may also be determined. In some embodiments, for members of an entity cluster, differences in least privilege relative to other members of the cluster may be determined. Differences in least privilege between members of a cluster may indicate potential anomalies in access privilege allocation and/or usage. In some embodiments, excess privileges or unused privileges for an entity may be used to calculate a risk score for the entity. For example, a higher risk score may be assigned to an entity with a larger number of unused sensitive privileges. In some embodiments, access paths or privileges not used by an entity may be quarantined (e.g. restricted from use), automatically or manually deprovisioned (removed), or monitored so that usage attempts trigger an alert.

In some embodiments, SV 330 and/or ST 340 and/or PE 360 may identify access policy drift for an entity relative to other entities that belong to the same cluster. For example, at a time t, an access control policy for an object cluster (e.g. a set of objects $\{p\}$) may specify that only an actor cluster (e.g. "Ops" users and services) in a set $\{x\}$) may access the objects $\{p\}$. However, due to the effect of various access policy changes over time, access to one or more objects in set $\{p\}$ may differ from other objects in $\{p\}$. For example, due to the effect of the access policy changes, one or more objects in $\{p\}$ may be accessed by actors in a set $\{y\}$, where $\{y\} \neq \{x\}$. In some embodiments, SV 330 and/or ST 340 and/or PE 360 may identify and report any access policy drifts relative to any stated or derived access policies.

In some embodiments, SV 330 and/or ST 340 and/or PE 360 may determine access policy drift by comparing access policy graphs for objects. If the access policy graphs for the objects are determined to be similar (e.g. based on one or more measures of similarity being above some threshold) then deviations between the graphs may be attributed to access policy drift. Various methods may be used to determine access policy graph similarity between pairs of access policy graphs. For example, one or more of the following methods may be used: determination of node correspondences between the access policy graphs, determination of neighbor correspondences, determination of neighborhood similarity, a graph edit distance—which is the number of transformation operations (e.g. additions, deletions, and/or substitutions) to transform one graph into the other, subgraph matching, etc. In one embodiment, a similarity score between 0 and 1 may be used, where a similarity score of 1 indicates that the access policy graphs are isomorphic. Lower similarity scores may indicate increasing dissimilarity. Graphs with a similarity score above some threshold may be evaluated and deviations between the graphs may be attributed to access policy drift. In some embodiments, access policy drift may be determined by: (a) determining an access policy graph for each of a plurality of objects and groups; (b) determining a similarity score between access policy graph pairs in (a); (c) clustering object pairs (or groups) with similar access graphs (e.g. a similarity score above some threshold); and (d) determining differences (e.g. entities accessible by one object (group) but not the other, and/or entities with access to one object (group) but not the other). In some embodiments, the distinctions between access policy graph pairs may be analyzed and presented visually, which may facilitate access policy drift correction. In some embodiments, the method above may also be used to determine access policy drifts for users and other entities.

For example, entities may be clustered based on their access graph such that entities with similar access graph are in the same cluster. Differences in access privileges between entities in the same cluster may be indicative of access policy drift. For example, users may be clustered based on similar access privileges to a set of resources. Access privileges to a resource that are unique to an entity in the cluster may signal access policy drift.

In some embodiments, similarity scores for entities (e.g. users) may be based on access ("access based similarity") to one or more objects. Users U-1 . . . U-N may be considered similar in relation to an object O1, because of similar access privileges to object O1. For example, user U1 with Read and Write access to a database DB1 may be considered similar to user U2 who also has Read and Write access to DB1.

In some embodiments, similarity scores for entities (e.g. users) may be based on actions performed ("action based similarity") on one or more objects. Users U-1 . . . U-N may be considered similar in relation to an object O1, because of similar actions that may perform on object O1. Actions may be distinguished from access privileges in that not all entities that have the same access privileges may perform the same actions. For example, although users U-1 and U-2 may have similar access privileges (e.g. Read and Write) to database DB1, user U-2 may not perform writes to DB-1. Thus, in the example above, access based similarity may exist between users U-1 and U-2 but not action-based similarity. As another example, users U-1 and U-3 may be considered similar in relation to DB-1 if they both perform read, write, and administration of DB1. In some embodiments, additional attributes such as the number of actions performed over some time period may also be used to determine similarity.

In some embodiments, similarity scores may be computed for two or more first entities based on: (i) one or more attributes associated with the first entities (e.g. both located in geography "EU"), or (ii) access privileges associated with the first entities in relation to one or more second entities (e.g. read/write access to an object O1 accessible to the first entities), or (iii) actions performed by the first entities in relation to one or more second entities (e.g. administration on database DB1 accessed by the first entities), or a combination thereof.

Similarity scores may alternatively or additionally be computed for two or more first entities based on: (i) access privileges available to one or more second entities (e.g. the first entities that can be read by a second entity U3), or (ii) acted upon by one or more second entities (e.g. the first entities that have been administered by entities U1 and U2), or in relation to attributes associated with one or more second entities (first entities that can be accessed by second entities in geography "US").

In some embodiments, similarity scores may be computed based on access policy graph based similarity and/or logged events. In some embodiments, similarity scores may be based on term frequency—inverse document frequency (TF-IDF) (or variations thereof), and/or cosine similarity. For example, cosine similarity may be determined by comparing vectors (e.g. based on cosine similarity) for each node or edge where the vector contains an ordered list of some or all of the attributes of the node or edge along with all cluster tags and other tags.

Similarity and/or similarity scores may be determined from access logs and/or activity logs. For example, an activity log may indicate that U1 and U2 may perform the same actions and that their action volumes over some time period differ by more than some specified threshold. Based on the determination that the activity volumes between U1 and U2 over the time period differ by more than a threshold, U1 and U2 may be identified dissimilar or given a lower similarity score.

As another example, an activity log may indicate that U1 and U2 may perform the same actions with a similar activity volume fingerprint for that action (e.g. activity volumes for the action differing by less than a threshold), but on different resources. Based on the determination that the actions performed by U1 and U2 are the same and that the activity volumes for the action over some time period differ by less than the specified threshold, the entities U1 and U2 may be marked as similar or given higher similarity scores. For example, U1 and U2 may be system administrators managing different resources.

As a further example, U1 and U2 may perform different actions but with same activity volume for that action over some time period(s). Based on a determination that the activity volumes over the time period(s) differ by less than a specified threshold, the entities U1 and U2 may be marked as similar or given higher similarity scores. For example, U1 and U2 may be bots, which may have a similar volume of regular activity (as opposed to humans, where activity volumes may vary significantly between users over time periods).

As another example related to similarity, U1 and U2 may perform similar actions from physically close locations, which may be determined based on their IP addresses (e.g. they are part of the same sub-net) or other meta-data. Based on a determination that the entities U1 and U2 are physically close, U1 and U2 may be marked as similar and/or assigned a higher similarity score. Because U1 and U2 are physically close, they are likely to access and/or be supported by similar resources on the IT infrastructure and therefore likely to perform the same actions.

As one example, a similarity score (e.g. using TF-IDF/ cosine similarity) between two or more entities (e.g. users) may be determined using the approach outlined below: (i) compute a similarity score between two or more users based on: (i) an activity name, (ii) a resource name, (iii) an activity volume (e.g. associated with the activity name), and (iv) a location associated with each user (e.g. as outlined above). The similarity scores obtained in (i)-(iv) above may be combined using a weighted average to obtain a combined similarity score or similarity index.

In some embodiments, similarity scores may be used to determine similar entities (e.g. similar users) for clustering. Clustering may use techniques such as non-negative matrix factorization and Latent Dirichlet Allocation (LDA). For example, attributes associated with users may be used to determine user clusters (determination of similar users). Clustering may facilitate determination of anomalous or inconsistent user behavior or events associated with a first user, relative to the behavior or events associated with other similar users (e.g. in the same cluster as the first user). In general, machine learning and other AI and/or clustering techniques as described herein may be used to identify and cluster similar entities. As outlined above, entities may belong to multiple clusters. Each cluster may be determined based on some combination of attributes, actions, and/or metadata.

Figure 4A:
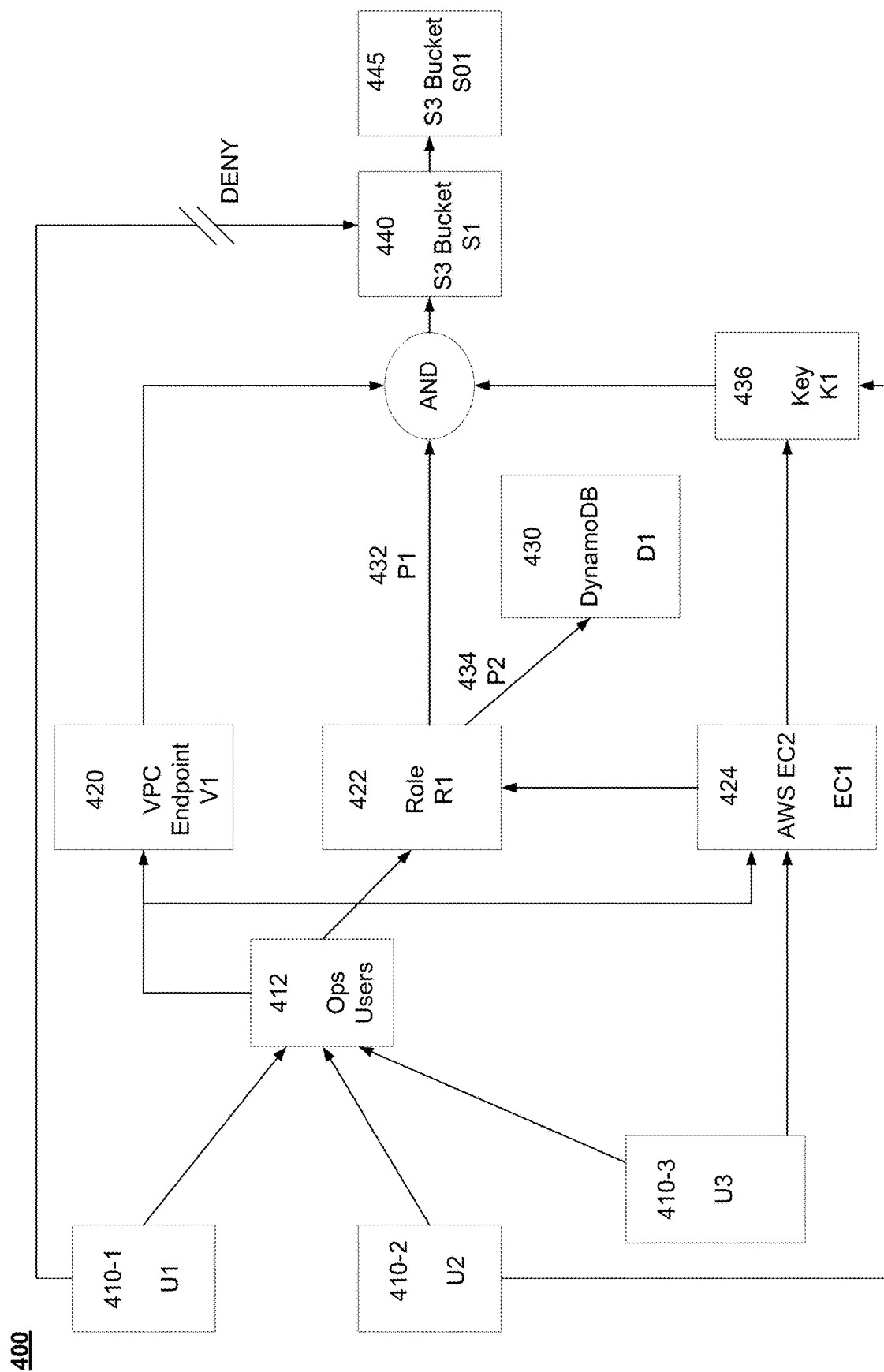
FIG. 4A shows an example access policy graph depicting access relationships between entities in an IT infrastructure subsystem.

FIG. 4A shows an example access policy graph 400 depicting access relationships between entities in an IT infrastructure subsystem. FIG. 4A is merely exemplary and, for ease of explanation, depicts entities related to a cloud infrastructure based on AWS. However, the techniques discussed may be applied to a general IT infrastructure, which may comprise servers, computers, networks, datacenters, and one of more private, public or hybrid public-private clouds, which may offer a variety of IaaS, PaaS, SaaS, and/or CaaS based computing solutions. While FIG. 4A depicts the access policy graph for a workload of a cloud based system (AWS), the disclosed techniques may also apply to an organization with multiple cloud accounts or workloads. The multiple cloud accounts or workloads for the organization may be deployed on a single cloud platform (e.g. VMWare) or across a plurality of distinct cloud platforms (e.g. one or more of AWS, Azure, Google Cloud, VMWare, and/or Openstack) and the disclosed techniques may be applied across the plurality of workloads, clouds etc.

Further, the organization may have set up policies to: (a) specify entities (including objects, services such as compute (e.g. Amazon EC2), storage (e.g. Amazon S3), databases (e.g. AWS DynamoDB) that may be provisioned on the cloud; and (b) the access control policy to be applied to each provisioned entity. Specifically, in relation to the example shown in FIG. 4A, for some specified AWS workload in the organization, Users U1 410-1, 410-2, and 410-2 may be part of Ops (Operations) Users group (OU) 412. OU 412 may assume role R1 422 in an AWS account AWS1 (not shown in FIG. 4A). The AWS1 account may include an Identity and Access Management (IAM) policy P1 432 specifying that role R1 422 may access S3 bucket S1 440 with privilege P1 432 and Dynamo DB D1 430 with privilege P2 434.

In AWS, for example, policies may be attached to identities (e.g. user U3 410-3 or OU 412 or role R1 422) or resources (e.g. S3 bucket S1 440). Policies may be managed by the customer (e.g. an administrator at the organization) or by the cloud provider (e.g. AWS for some typical use cases). Policies may be stored (e.g. in AWS) in a JavaScript Object Notation (JSON) file. A policy document may specify one or more of: whether the policy allows or denies access to an associated entity, and/or list actions that are allowed or denied by the policy, and/or list resources on which the actions can occur, and/or circumstances under which the policy grants permission. For example, referring to FIG. 3A, AOPC 310 and/or SPD 312 may read JSON files to determine policies associated with AWS cloud based entities. The policies may be normalized by AOPC 310 and/or SPN 314 and stored as part of PR 350 by AOPC 310 and/or SPR 316 using functionality provided by PE 360. For example, access policy graph 400 may form part of PR 350.

In AWS, identity based policies may specify access control privileges or permissions available to the user (or group or role) and may be evaluated when the user (or group or role) makes a request. The request may be allowed or denied based on the policies associated with the user (or group or role). In AWS, policies associated with roles may specify: (a) who can assume the role (also called a trust policy); and (b) what can the role do, which may specify the privileges or permissions available to the role (also called a permission policy). In AWS, resource-based policies may be associated with a resource (e.g. S3 bucket S1 440 in FIG. 4A) and determine the actions that an actor may perform on the resource (e.g. S3 bucket S1 440) and the conditions under which those actions may be performed.

Referring to FIG. 4A, S3 bucket S1 440 may be associated with an access control policy denying user U1 410-1 access to S1 440 (as indicated by broken arrow) and specifying that access may only be allowed from some network subnet N1, which may include AWS EC2 instance EC-1 424 and Virtual Private Cloud (VPC) Endpoint V1 420.

Further, as shown in FIG. 4A, data stored on an object S01 445 in S1 440 may be encrypted with a key K1 436 (which may be present in a Key Management System (KMS) not shown in FIG. 4A). K1 436 may be accessible to user U2 410-2 and EC2 instance EC-1 424.

EC2 instance EC-1 424 may assume role R1 422 and is present in network N1. A Secure Shell (SSH) policy, which may be defined in a LDAP, may allow user U3 410-3 to connect to EC-1 424 as an administrator.

VPC Endpoint V1 420 is present in Network N1 and OU 412 can connect to V1. The VPC provides a virtual networking environment that facilitates provisioning of AWS resources in a logically isolated section of the AWS cloud. The virtual networking environment for the VPC may use its own IP address range, subnets, routing tables, and network gateways.

FIGS. 4B-4F show traversals of access policy graph 400 illustrating how responses to various queries and scenarios may be obtained. In FIGS. 4B-4F, paths relevant to the query or scenario being illustrated are depicted using lines with heavy weight. Lines depicting access paths have heavier weight. Various graph traversal techniques such as depth first traversal or breadth first traversal may be used to traverse the graph.

Figure 4B:
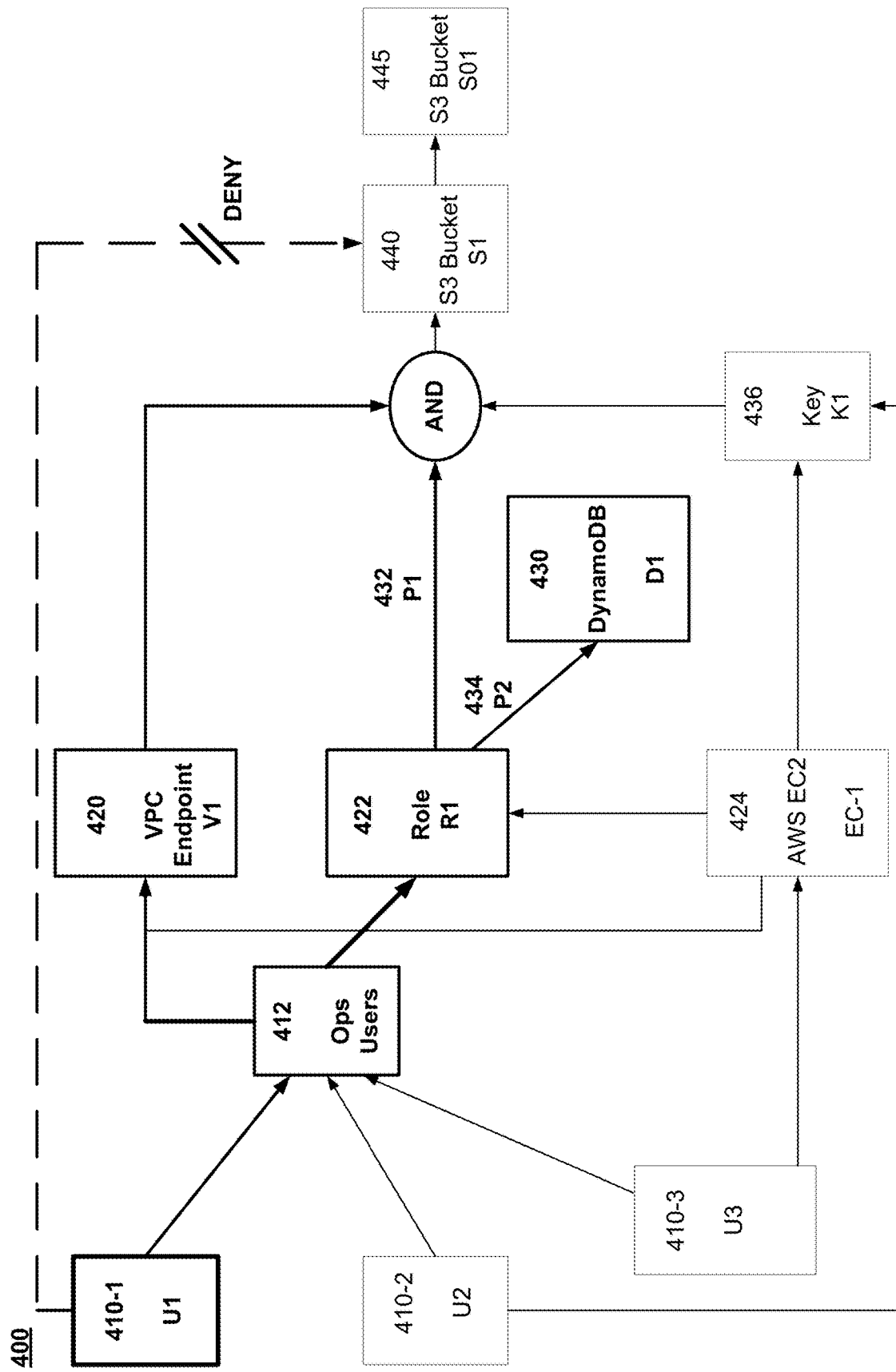
FIGS. 4B-4F show traversals of the access policy graph in FIG. 4A illustrating how responses to various queries and scenarios may be obtained.

FIG. 4B shows a traversal of access policy graph 400 illustrating determination of whether actor user U1 410-1 has access to object S3 bucket S1 440. The lines of heavy weight show paths that can be traversed starting at U1 410-1. As shown in FIG. 4B, U1 410-1 is part of OU 412. OU 412 may access VPC Endpoint V1 420 and can assume role R1 422. However, despite assumption of role R1 422, U1 410-1 may not access S1 440 because of the access control policy (indicated by the dashed broken line) associated with S1 440, which explicitly denies access to U1 410-2.

Figure 4C:
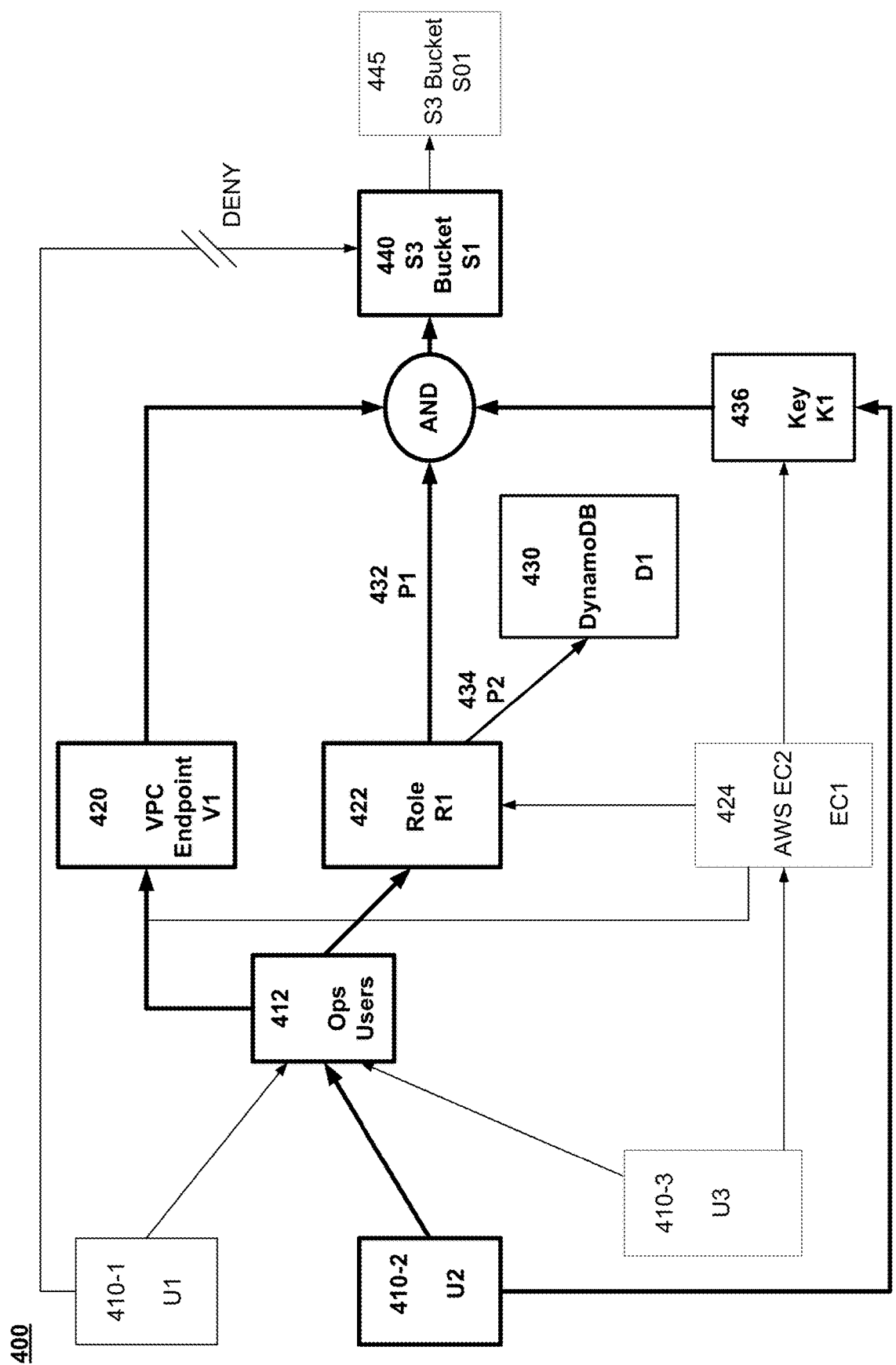

FIG. 4C shows a traversal of access policy graph 400 illustrating determination of whether actor user U2 410-2 has access to object S3 bucket S1 440. The lines of heavy weight show paths that can be traversed starting at U2 410-2. Heavier weight lines show paths from U2 410-2 relevant to access S1 440. As shown in FIG. 4C, U2 410-2 is part of OU 412. OU 412 may access VPC Endpoint V1 420 and can assume role R1 422. Thus, U2 410-2 may access S1 440 because it has access to V1 420, K1 436, and may assume role R1 422, which has access to S1 440 with privilege P1 432.

Figure 4D:
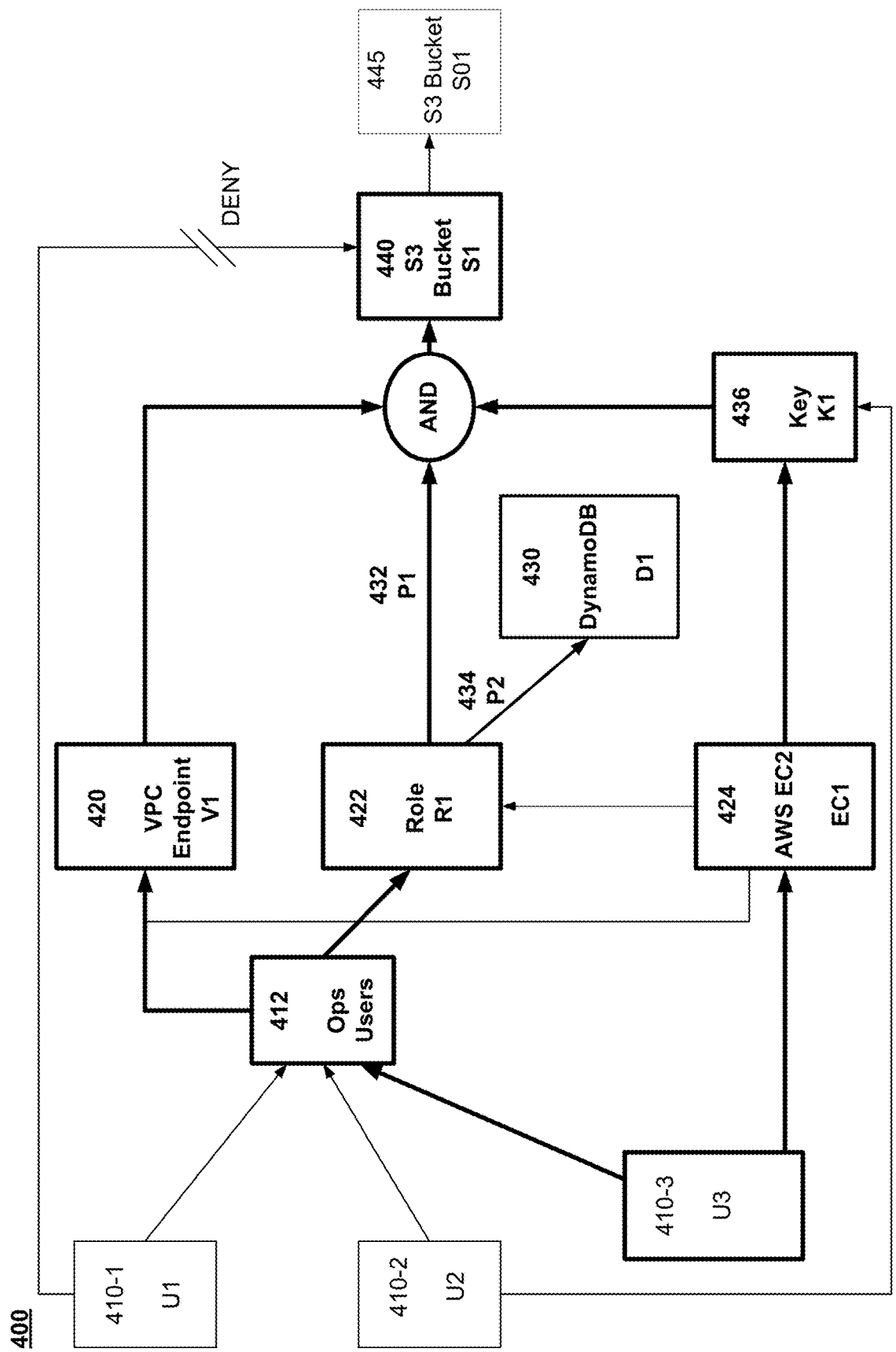

FIG. 4D shows a traversal of access policy graph 400 illustrating determination of whether actor user U3 410-3 has access to object S3 bucket S1 440. The lines of heavy weight show paths that can be traversed starting at U4 410-3. Heavier weight lines show paths from U3 410-3 relevant to access S1 440. As shown in FIG. 4D, U3 410-3 is part of OU 412. OU 412 may access VPC Endpoint V1 420 and can assume role R1 422. U3 410-3 may access EC-1 424, which has access to key K1 436. Thus, U3 410-3 may access S1 440 because it has access to V1 420, K1 436, and may assume role R1 422, which has access to S1 440 with privilege P1 432.

Figure 4E:
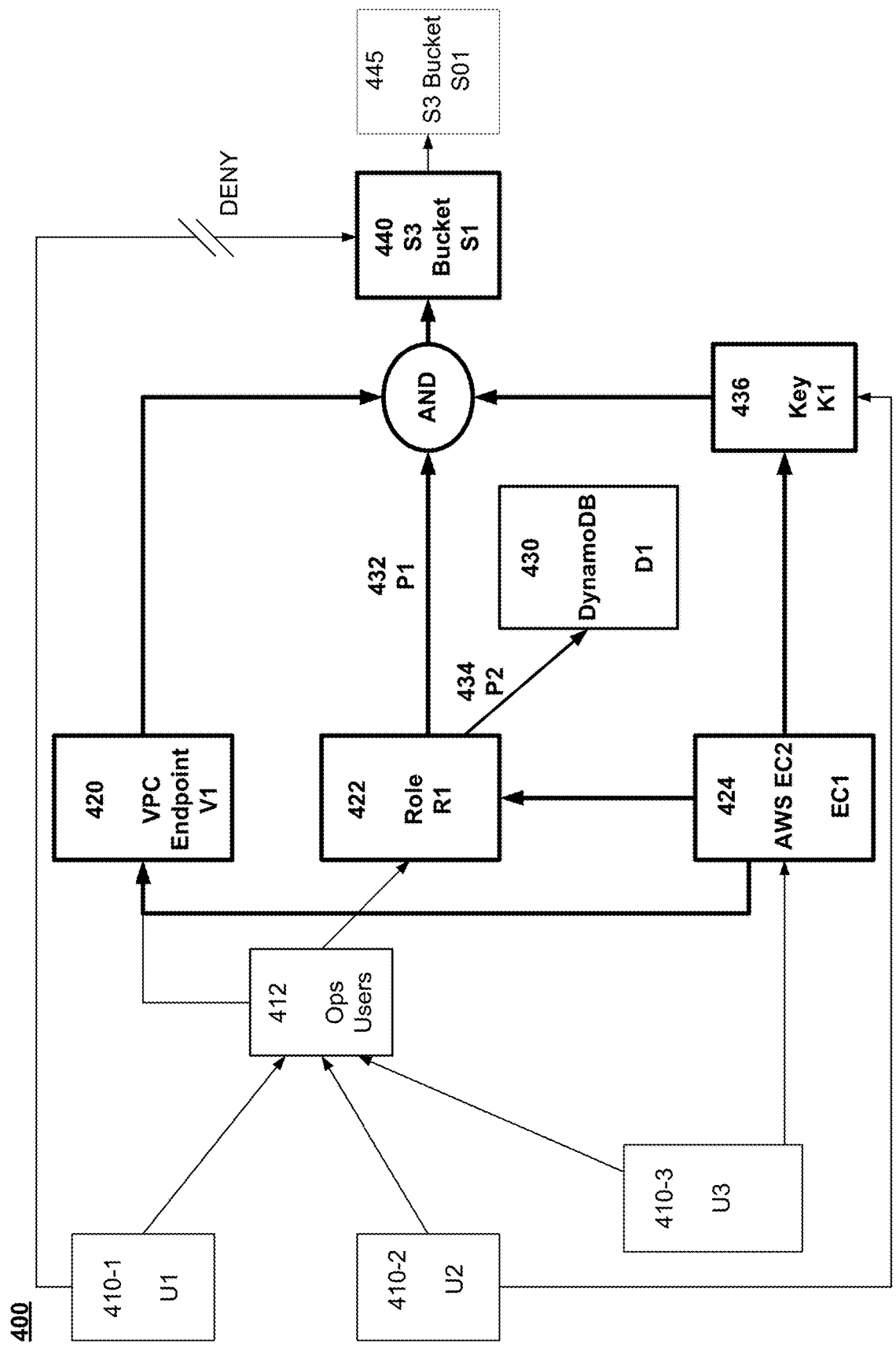

FIG. 4E shows a traversal of access policy graph 400 illustrating determination of whether actor EC-1 424 has access to object S3 bucket S1 440. The lines of heavy weight show paths that can be traversed starting at EC-1 424. Heavier weight lines show paths from EC-1 424 relevant to access S1 440. As shown in FIG. 4E, EC-1 424 may access VPC Endpoint V1 420, assume role R1 422, and has access to key K1 436. Thus, EC-1 424 may access S1 440 because it has access to V1 420, K1 436, and may assume role R1 422, which has access to S1 440 with privilege P1 432. Although shown separately for illustrative purposes, the path in FIG. 4E may also be obtained during access determination to S1 440 by U3 410-3 (FIG. 4D).

Figure 4F:
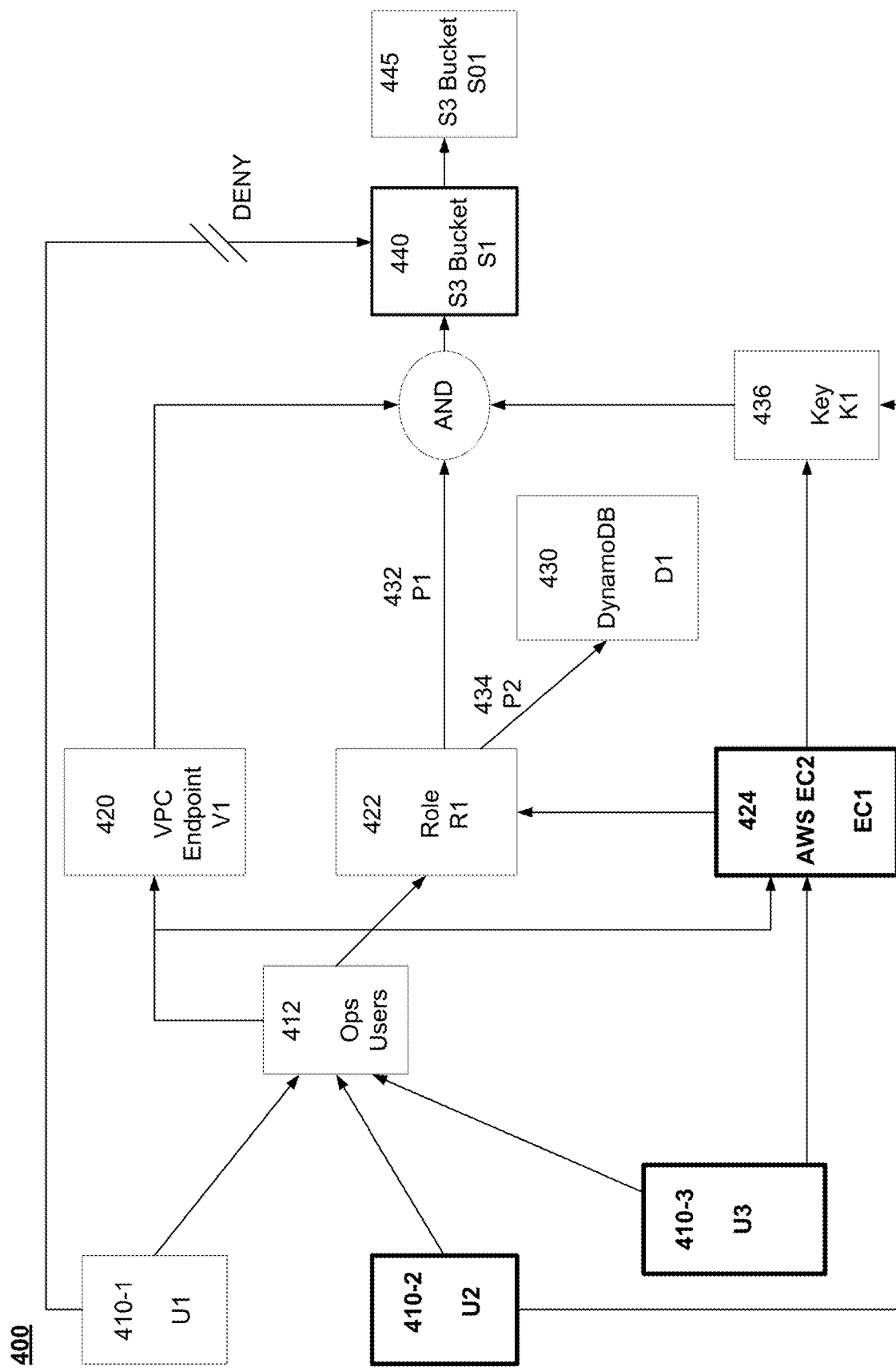

FIG. 4F shows access policy graph 400 illustrating entities that have access to S1 440. In some instances, the results of queries, such as those illustrated in FIGS. 4B-4E may be combined to determine the entities with access to S1 440. The lines of heavier weight show entities with access to S1 440. As shown in FIG. 4F, actors U2 410-2, U3 410-3, and EC-1 424 may access S1 440.

Figure 4G:
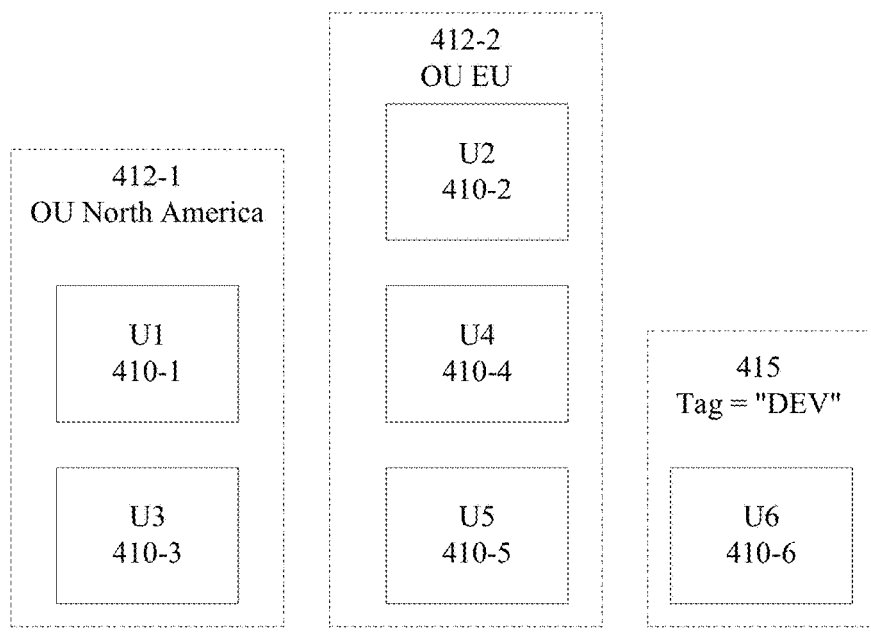
FIG. 4G shows example clusters that may be obtained based on an access policy graph associated an object.
Figure 4G:
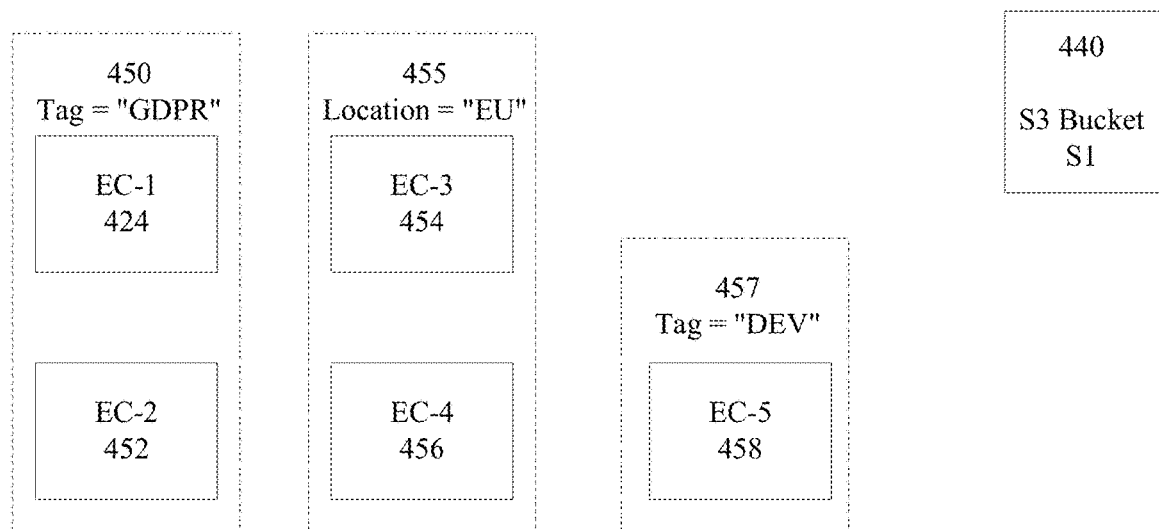
Figure 4G:
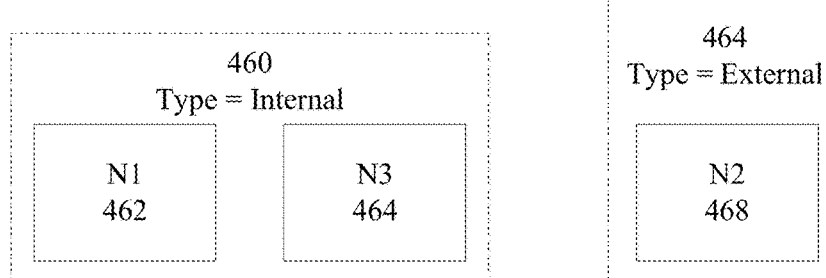

FIG. 4G shows example clusters (in dashed boxes) that may be obtained based on an access policy graph associated with AWS S3 bucket object S1 440. In FIG. 4G, some additional entities (not shown in FIG. 4A) have been introduced to illustrate clustering. As shown in FIG. 4G, Users U1 410-1 and U3 410-3 may be located in North America and form OU cluster OU North America 412-1. Users U2 410-2, U4 410-4, and U5 401-5 may be located in the European Union (EU) and form OU cluster OU EU 412-2. FIG. 4G shows that User U6 410-6 also has access to S3 bucket S1 440 but is tagged as "DEV" (developer) and may be viewed as an anomaly or exception as User U6 410-6 is not part of OU clusters 412-1 or 412-2. Such exceptions (e.g. User U5 410-6) may indicate potential unauthorized access (and/or access inconsistent with a stated access control policy and/or derived access control policy). In some embodiments, an administrator may be alerted upon detection of exceptions, the access may be quarantined, and/or the anomalous access disabled (pending review).

FIG. 4G also shows EC2 instances EC-6 456 and EC-2 452 in EC GDPR cluster 450 with tag="GDPR" (General Data Protection Regulations). GDPR is a set of privacy and data protection regulations promulgated in the EU that govern data that is related to EU data subjects, without regard to whether such data is located in the EU. Further, EC2 instances EC-3 453 and EC-4 454 are in EC EU cluster 455 with location="EU," while EC-5 458 may viewed as forming separate EC DEV cluster 457 and may be viewed as an anomaly or exception because EC-5 458 does not form part of EC GDPR cluster 450 or EC EU cluster 455. Such exceptions (e.g. EC-5 458) may indicate potential unauthorized access (and/or access inconsistent with a stated access control policy and/or derived access control policy). In some embodiments, an administrator may be alerted upon detection of exceptions. In some embodiments, upon detection of exceptions or anomalies, access to objects or resources (e.g. S3 bucket S1 440) may be automatically disabled (either temporarily or permanently) to the entities identified as anomalous (e.g. User U6 410-6 and/or EC2 instance EC-5 458). In some embodiments, an administrator may be alerted when access is disabled and provided an opportunity to confirm or override the new policy.

Further, FIG. 4G shows Networks N1 462 and N3 464 form part of internal network cluster 460 (e.g. internal to the organization), while network N2 468 may be viewed as forming part of separate external network cluster 464 (e.g. external to the organization) and may be viewed as an anomaly or exception because network N2 468 does not form part of internal network cluster 460. Such exceptions (e.g. network N2 468) may indicate potential unauthorized access (and/or access inconsistent with a stated access control policy and/or derived access control policy). In some embodiments, an administrator may be alerted upon detection of exceptions.

Referring to FIG. 3A, in some embodiments, OU cluster OU North America 412-1, OU cluster OU EU 412-2, user DEV cluster 415, EC GDPR cluster 450, EC EU cluster 455, EC DEV cluster 457, internal network cluster 460, and external network cluster 464 with respect to S1 440 may be obtained by AOA 320 and/or ACD 322. For example, AOA 320 and/or ACD 322 may determine entities with access to S1 440 and then cluster the entities based on common tags and/or other common attributes. The clustering may be used to determine one or more entities (e.g. U6 410-6, EC-5 458, and N2 468), which may have access to S1 440 but do not share attributes with other entities with access to S1.

Clustering may also be done by combining attributes of users, services, objects and multiple entities in general. For example after analyzing a set of users {u}, a set of bucket {b} and set of EC2 instances {e} we may find that users with an attribute X, buckets with attribute Y and EC2 instances with attribute Z form a cluster. This may reflect an intent that Users with the specific attribute X and EC2 instances with specific attribute Y have access to buckets with specific attribute Z.

The clustering may also be used to derive a policy (e.g. using machine learning and/or AI based techniques) applicable to access object S1 440. The derived policy may use other databases, organizational systems, tags, attributes, etc. to determine commonalities between entities with access to S1 to derive an access control policy for S1. In some embodiments, the derived policies may be automatically verified or tested (e.g. by SV 330 and/or ST 340) to ensure consistency. In some embodiments, the derived policy may be presented to an administrator for approval prior to application. In some embodiments, the derived policy may be automatically applied when consistent. For example, referring to FIG. 4G, upon a determination that access to S1 440 by U6 410-6, EC-5 458 and N2 468 is anomalous then, a derived policy may indicate that access to S1 is to be limited to OU users from North America and the EU and to EC instances with a GDPR tag or an EU location, and from internal networks N1 and N3. Accordingly, based on the derived policy, access to S1 440 by U6 410-6, EC-5 458 and N2 468 may be disabled (e.g. by changing policies associated with S1 440).

Figure 4H:
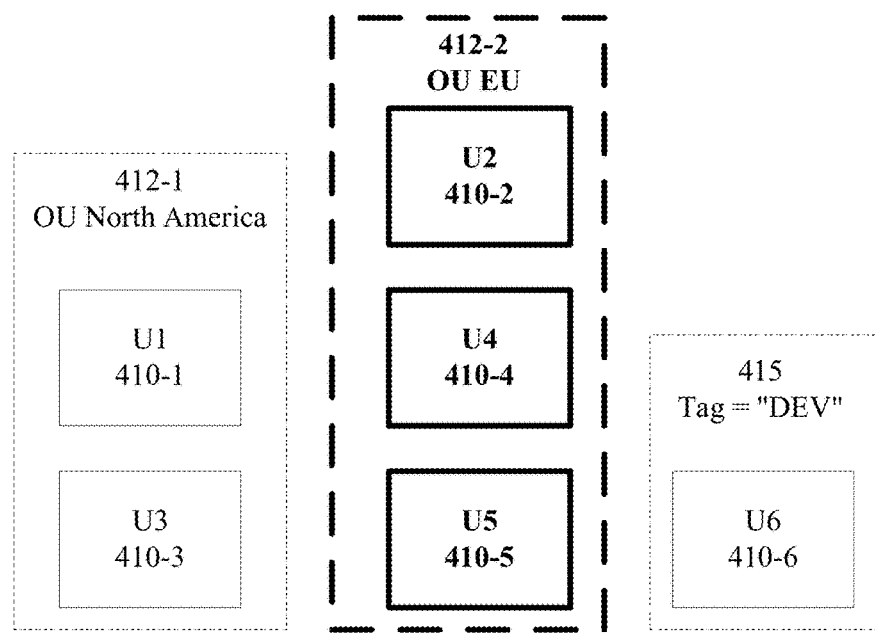
FIG. 4H shows entities that correspond to a stated policy for an object.
Figure 4H:
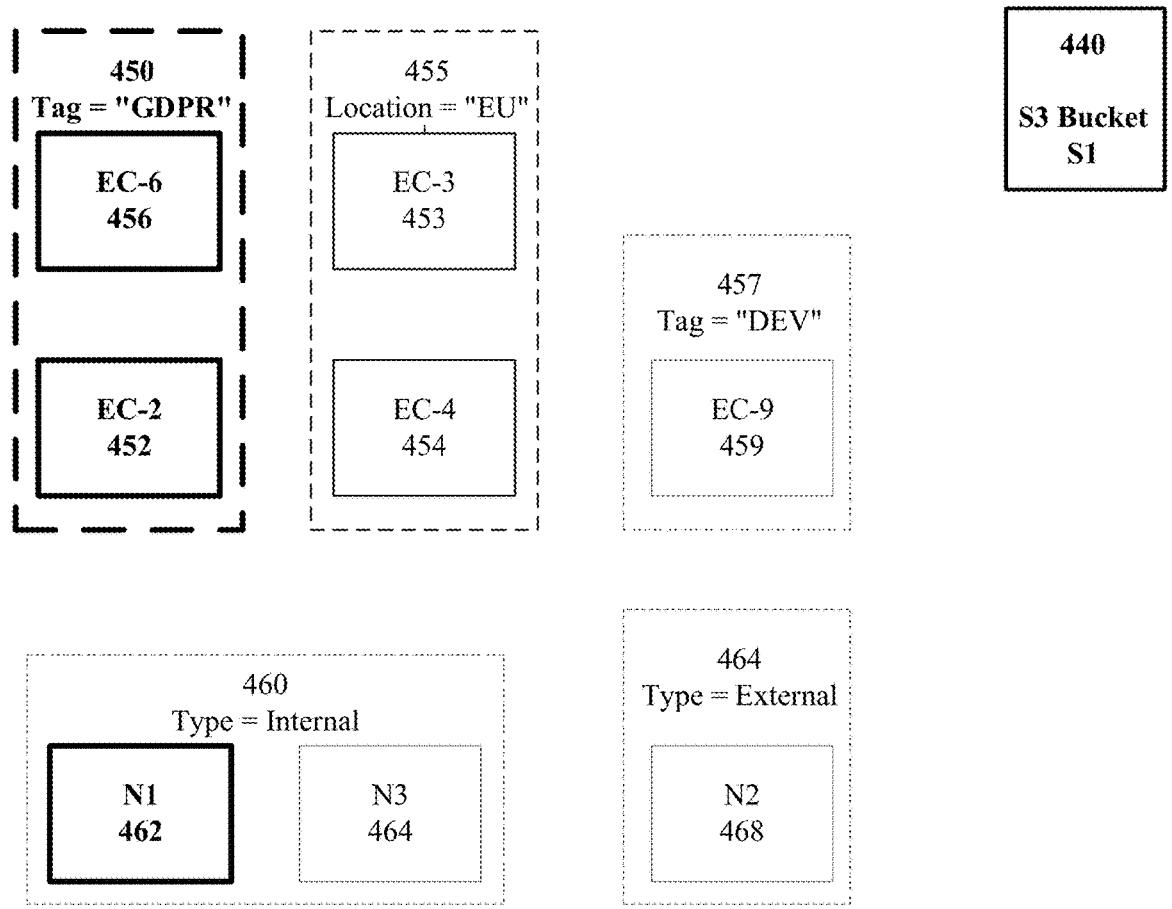

FIG. 4H shows entities that correspond to a stated policy for S1 440. The stated policy may indicate that access to S1 440 may be limited to users in the EU that are part of OU 412 and to EC instances with GDPR tags and further limited to network N1. As shown in FIG. 4H, per the stated policy, entities U2 410-2, U4-410-4, U5 410-5 (which form part of OU EU cluster 412-2), EC-6 456 and EC2 452 (which form part of EC GDPR cluster 450), and network N1 462 can have access to S1 440. Accordingly, referring to FIG. 3A, SV 330 and/or ST 340 may determine that other entities (e.g. U1 410-1, U3 410-3, U6 410-6, EC-3 453, EC-4 454, EC-9 459, N3 464, and N2 468) are in violation of the stated policy and may alert an administrator or, when authorized, appropriately change permissions associated with S1 440 to disable access to the unauthorized entities. In some embodiments, any previously derived policy that is inconsistent with a current stated policy may be deleted (e.g. from PR 350).

Figure 4I:
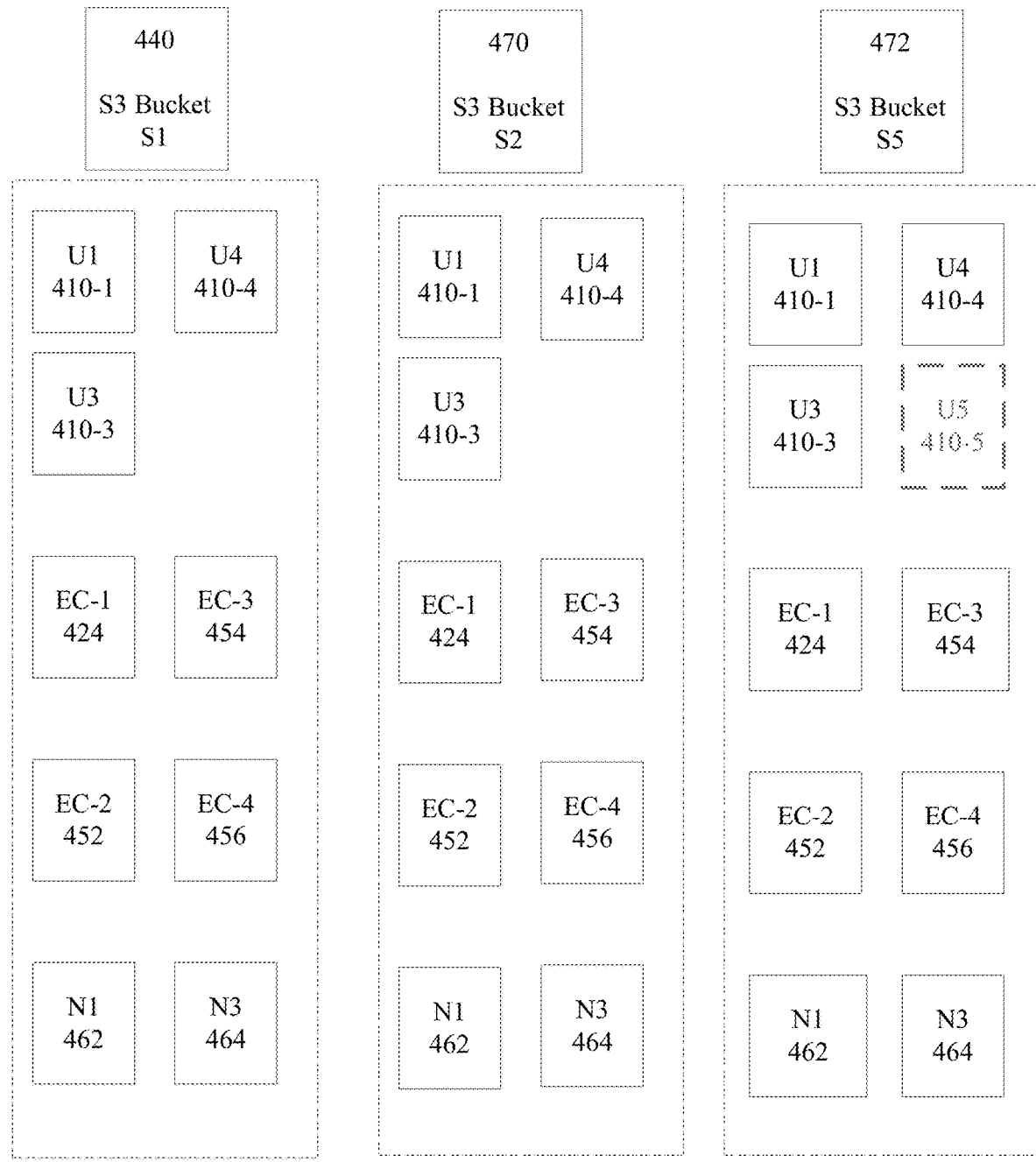
FIG. 4I illustrates an example policy drift detection based on a comparison of entities with access to a set of similar objects.

FIG. 4I illustrates an example policy drift detection based on a comparison of entities with access to a set of similar objects (shown as S3 buckets). As shown in FIG. 4I, users U1 410-1, U3 410-3, and U4 410-4; EC2 instances EC-1 424 and EC-3 456; and networks N1 462 and N3 464 have access to object S1 440 and AWS S3 bucket S2 470. Thus, the set of entities with access to objects S1 440 and S2 470 are identical. However, in relation AWS S3 bucket S5 472, users U1 410-1, U3 410-3, U4 410-4, and U5 410-5; EC2 instances EC-1 424 and EC-3 456; and networks N1 462 and N3 464 have access. A difference of the set of entities with access to object S1 440 (or S2 470) and the set of entities with access to object S5 472 indicates that user U5 410-5 does not form part of the set of entities with access to objects S1 440 and S2 470. Accordingly, it may be inferred (e.g. by SV 330 and/or ST 340 and/or PE 360) that access to S5 472 by U5 410-5 may have occurred as a result of access policy drift (as indicated by the dashed greyed block). In some instances, due to the effect of cumulative policy changes over time, policies (stated or derived) may drift relative to their intent. In some embodiments, by determining the difference between the sets of entities with access to similar objects (e.g. objects within an object cluster), policy drift for stated and/or derived policies may be identified and flagged. Referring to FIG. 3A, in some embodiments, SV 330 and/or ST 340 and/or PE 360 may identify access policy drift for an entity relative to other entities that belong to the same cluster. Any identified drift may automatically remediated, and/or may be flagged and reported to an administrator.

Figure 5A:
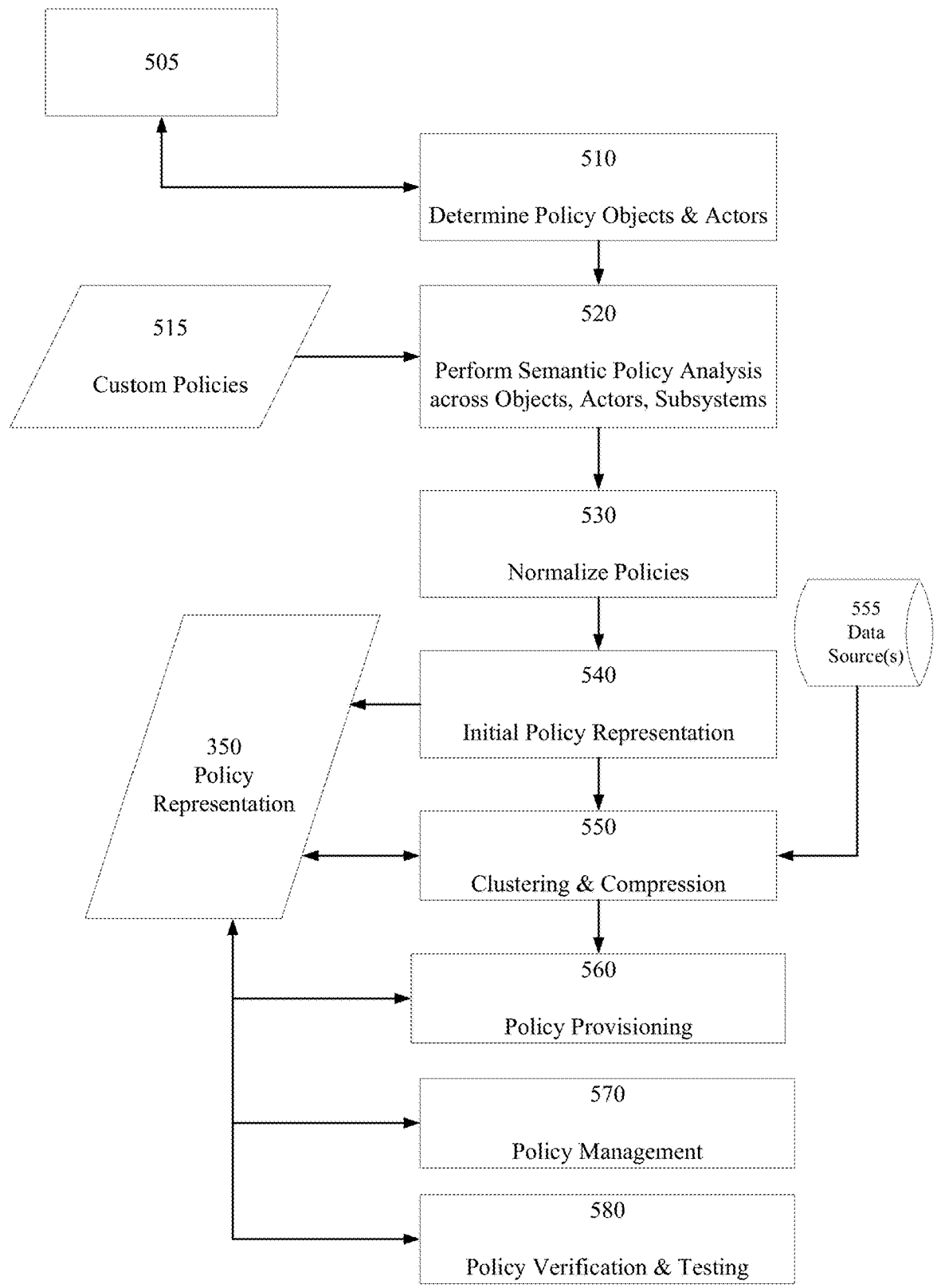
FIG. 5A shows a flow diagram for an example method for access control, management, and testing according to some disclosed embodiments.

FIG. 5A shows a flow diagram for an example method 500 for access control, management, and testing according to some disclosed embodiments. In some embodiments, method 500 may be performed on a computer or a processor coupled to an organizational IT infrastructure such as IT infrastructure 505. In some embodiments, In some embodiments, IT infrastructure 505 may include networked computers, servers, and/or datacenters, and may also include a one or more private clouds, a plurality of distinct public clouds (e.g. from distinct cloud providers such as one or more of AWS, Azure, Google Cloud, VMWare, and/or Openstack), and/or hybrid public-private clouds (which may offer a variety of IaaS, PaaS, SaaS, and/or CaaS based computing solutions). Method 500 is merely exemplary and the functionality of one or more blocks shown in FIG. 5A may be combined and/or the functionality of a block shown in FIG. 5A may be distributed across other blocks, in a manner consistent with disclosed embodiments.

In some embodiments, method 500 may be implemented dynamically and/or in real-time as the cloud-based portions of IT infrastructure 505 are instantiated, provisioned, and workloads are deployed across a plurality of distinct clouds. The term "dynamic" as used in connection with the present method refers to access control management, and/or testing of entities (e.g. actors and/or objects) in environments such as clouds where during execution of a workload a plurality of diverse entities may be instantiated rapidly and in real time. The rapid real-time instantiation of a large number of entities may occur, in part, because teams within an enterprise can bring up their own computing infrastructure and/or avail of services on a plurality of distinct clouds almost instantaneously and, during workload execution a plurality of diverse objects including services may be instantiated programmatically in response to changes in the computing environment. Both the sheer diversity of objects and the number of objects (which may include services) instantiated during workloads may run into tens of thousands thereby rendering traditional access control schemes impracticable. In some embodiments, method 500 may respond dynamically to the instantiation of entities to determine, manage, verify, and test access control policies associated with the entities.

In block 510, access control policies may be determined for actors and objects across IT infrastructure 505. For example, block 510 may determine actors and objects, their respective attributes, and access control policies related to the actors and objects. Access control policies may include one or more second entities with access to a first entity, the type of access permitted, and the conditions under which access is permitted to the one or more second entities. In some embodiments, an existing access control policy for actors and/or objects may be determined by reading and/or analyzing access control policies from some or all of the entities associated with IT infrastructure 505.

For example, in block 510, organizational access control policies may be determined for one or more of: (a) cloud services including those offered by IaaS providers such as AWS (including services such as EC2, S3, etc.) Azure, Google, etc.; (b) private cloud infrastructure hosted by the organization such as VMware, Openstack, etc.; and/or traditional IT infrastructure running at organizational data centers/offices; (c) program code, services, applications and/or components supported by and/or run on the IT infrastructures in (a) and/or (b) above (e.g. Linux instances, databases, distributed applications for big data storage and processing such as Hadoop, any other applications with associated access control policies including Human Resources Management (HRM) applications, Customer Relationship Management (CRM) applications, various domain specific applications, etc.); (d) network security and/or access control policies specified in networking components, firewalls and routers; (e) enterprise systems such as data encryption and/or Lightweight Directory Access Protocol (LDAP) systems, which facilitate access to and maintenance of distributed directory information services over networks; (f) third party services and systems including SaaS services (such as Microsoft Office 365, Salesforce, independent software vendor (ISV) software components such as Oracle, etc.); (g) any other specified entity in the IT infrastructure that has an associated access control policy.

Each of (a)-(g) above may have their own mechanisms to specify access control policies. For example, different cloud providers may use distinct access control mechanisms for resources. Accordingly, in some embodiments, block 510 may use one or more of: program code, APIs, scripts, agents, etc. determine access control policies for each entity. Block 510 may determine access control policies for entities associated with various subsystems (e.g. cloud type, network, etc.) despite the disparate mechanisms that each subsystem may use to specify the access control policies. For example, block 510 may determine access control to resources on an AWS cloud based on information in JSON files associated with the respective resource but may use functionality provided by a Cloud Resource Manager API for access control information related to resources on a Google cloud. Further, block 510 may include additional functionality to determine access control information associated with computers, servers, network routers, databases (such as a HRM database) etc. In some embodiments, block 510 may run continuously (e.g. in the background) or periodically (according to some schedule) to monitor IT infrastructure 505 for changes.

In block 520, a semantic analysis of the access control policies determined in block 510 may be performed. For example, the access control policies determined in block 510 may be used to determine actors, objects, roles, privileges available to actors relative to some object, and conditions under which those privileges are available. Because similar or equivalent policies may be expressed by various subsystems differently, block 520 may function to facilitate consistent interpretation of the policies across the subsystems. In some embodiments, block 520 may use access control policies (e.g. determined in block 510) to determine meta-objects (such as a group) that may serve as an indirection between actors and objects. In some embodiments, blocks 510 and 520 may include some or all of the functionality associated with SPD 312 and/or PE 360.

In block 530, policies may be normalized. For example, the policies for actors and objects may be expressed in a uniform platform independent manner. For example, block 530 may use access control policy information for entities (e.g. actors and/or objects) associated with one or more subsystems (e.g. as determined in block 520) and represent the policies in a normal or standardized form. In some embodiments, the normal or standardized from may be a generalized representation independent of any particular entity (e.g. the normalized representation may be entity/system/sub-system agnostic). For example, block 530 may represent security and/or access control policies in a form that is not specific to any particular subsystem or entity and in a manner that facilitates access control description across the various subsystems of IT infrastructure 505 in a consistent standardized format.

In some embodiments, a graph-based representation of access control policies such as an access policy graph may be used during normalization in block 530. For example, each node in the graph may represent an actor or an object. A connection or edge between a pair of nodes in the graph may represent permissions or privileges provided to an actor node relative to the connected object node, and/or permissions or privileges denied to an actor node relative to the connected object node, and/or permitted (or disallowed) actions by the actor node on the connected object node. Tags associated with each node may represent attributes associated with that node. Further, edges may be annotated with labels that reflect the kind of access that is allowed (e.g. read, write, execute etc.), privileges available or denied, and/or conditions under which the access is available. In some embodiments, the functionality of blocks 520 and 530 may be combined. In some embodiments, block 510 may include some or all of the functionality associated with SPN 314 and/or PE 360.

In block 540, the normalized policy may be stored as PR 350. In some embodiments, PR 350 may comprise one or more access policy graphs. In some embodiments, APR 316 may build a new PR 350, augment an existing PR 350, and/or update an existing PR 350 to reflect changes to access control policies and/or to reflect any changes (additions to, deletions of, and/or changes to system entities, including objects and/or actors) to IT infrastructure 505. In some embodiments, rules in PR 350 that are associated with entities in the IT infrastructure may be specified using logical expressions. The logical expressions above may reflect access control policies associated with one or more physical entities (actors and/or objects) in an IT infrastructure (e.g. system 100). A desired set of one or more rules for one or more entities may also be specified using logical expressions. In some embodiments, expressions based on first order logic may be used for both the implemented rules and the desired rules. In some embodiments, the set of logical expressions (which embody the desired rules and implemented rules) may be viewed as a satisfiability problem.

In some embodiments, two access policy graphs for entities (e.g. actors and objects) associated with IT infrastructure 505 may be stored as part of PR 350. For example, an inbound graph for the first entity (e.g. the subject entity), may indicate one or more second entities that may access or have access the subject entity either directly or indirectly through other entities in the infrastructure. For example, the access paths to S1 440 (shown in edges with heavier weights) from U2 410-2 (in FIG. 4C), U3 410-3 (in FIG. 4D), and EC1 424 (in FIG. 4E) may be combined to determine an inbound graph for object S1 440.

Conversely, an outbound graph for the first entity (e.g. the subject entity), may represent one or more third entities in the infrastructure that may be accessed by or are accessible to the (first) subject entity both directly (e.g. by the subject entity) or indirectly (e.g. based on access control policies that facilitate access, by the subject entity, to the third entities through other entities in the infrastructure). In some embodiments, each inbound access graph may reflect all paths that may be available for each second entity to access the subject entity; while each outbound access graph may reflect all paths that may be available at a point in time for a subject entity to access the third entities.

In some embodiments, access policy graphs (nodes, attributes, connections, etc.) in PR 350 may be represented using a database. For example, a graph database or another type of database may be used to store the access policy graphs. In some embodiments, PR 350 may comprise a graph database/database management system (DBMS). In some embodiments, access control policy statements associated with each entity in IT infrastructure 505 may be evaluated for all input parameters. The result of the evaluation may be used to determine if an edge can be placed between the nodes (e.g. an actor and object), the attributes of the edge, and any annotations such as conditions under which the access may occur. For example, in some cases, an evaluation may yield a conditional result (e.g. access is allowed, but only between 8-10 am). In such cases, an edge (e.g. a database record associated with the actor and/or object) may be annotated with the conditions related to the access. In some cases, PR 350 may include nodes for meta-objects (such as a group) that may serve as an indirection between actors and objects.

In some embodiments, PR 350 may further comprise a master access policy graph where each actor and/or object in the IT infrastructure is uniquely represented as a single node. For example, various access policy graphs (e.g. associated with individual actors/objects) may be connected to create a master access policy graph so that each actor and/or object in the IT infrastructure is uniquely represented as a single node. In some embodiments, block 540 may include some or all of the functionality associated with APR 316 and/or PE 360.

In block 550, actors and objects may be clustered and/or compressed. In some embodiments, a compressed representation of PR 350 may be obtained based, in part, on the clustering. For example, machine learning and/or other artificial intelligence techniques may be used to determine clusters of actors and/or objects. In some embodiments, the properties used to determine actor and/or object clusters in block 350 may include similarity in one or more of: tags associated with the actors/objects, attributes associated with the respective actors/objects and/or conditions under which they may access objects or be accessed by actors. For example, an actor cluster may be determined based on the availability of access to a group of objects for each actor in the cluster. In some embodiments, tags associated with each node and its associated (inbound and outbound) access policy graphs to automatically determine clusters of objects or actors relative to that node.

In some embodiments, information from one or more data sources 350 (e.g. a HRM, system, CRM system, organizational database, data stores, etc.) may be used to cluster actors and/or objects. For example, information from data sources 350 may indicate that a set of users are part of an operations group, and/or are based in the EU, and/or that a set of servers is located in North America. As another example, developers (e.g. actor: users associated with "Group: developer") may be determined to have access to objects and services in DEV (object: workloads associated with "Category: DEV"). Accordingly, the developers (actors) may be clustered in relation to the DEV workloads (objects) and, conversely, DEV workloads (objects) may be clustered in relation to developers (actors).

In some embodiments, in block 550, PR 350 may be compressed based on one or more of: discovered clusters and/or derived policies. In some embodiments, the compression may facilitate a representation that provides different granularities or levels of detail of the relationships between entities in an IT infrastructure. For example, an access policy graph associated with a first node (actor or object) may provide detailed access relationships between the first node and one or more other nodes, while a compressed representation based on clusters associated with the first node may facilitate a view or analysis of access relationships at a higher level. In some embodiments, block 550 may include some or all of the functionality associated with PRC 326 and/or PE 360.

In block 560, information from clustering (e.g. obtained in block 550) may be used to determine or derive access control policies associated with various entities or group of entities. In addition to derived policies, in block 560, explicit organizational access control policies (e.g. stated policies) may also be provisioned and added to PR 350. In some embodiments, a system may include stated access control policies (e.g. which may be normalized and stored in PR 350). For example, a stated access control policy may indicate that users with attributes {Y} (e.g. "Dev") may be denied access to entities with attribute {A} (e.g. data tagged "sensitive").

In some embodiments, derived policies associating actors and/or objects (or actor clusters and/or object clusters) may be determined, in part, by analyzing relationships (nodes, edges, and/or attributes) in access policy graphs. For example, DPD 324 may derive implicit higher level policies based on PR 350, by analyzing connections between entities in PR 350. For example, actor and/or object clusters (e.g. determined in block 550) and the relationships governing the clusters may be used to derive a higher level access control policies (which may be implicit in the implemented policies). The derived higher level access control policies may reflect a desired (but implicit) organizational intent relative to access control for one or more entities associated with the IT infrastructure. For example, based on tags associated with one or more objects from one or more data sources 350 (e.g. Office Location="San Jose" and Department="HR," which may be obtained based on some combination of LDAP and/or a HRM system), it may be determined that a set of actors (e.g. users with the attributes Office Location="San Jose" and Department="HR", above) have access to certain data objects and a higher policy may be inferred in relation to access to those data objects. As another example, in relation to a specific workload, access to a set of data objects {A} tagged as sensitive may be granted to a set of users {X}, while a set of users {Y} may not have access to {A}. In some embodiments, policy provisioning in block 560 may use one or more data sources 555 (e.g. a corporate directory or HR system) to determine roles associated with for users {X} with access to {A} and roles associated with users {Y} without access to {A}. If it is determined that users {X} are in an organizational "Ops" operations group, while users {Y} are in an organizational "Dev" developer group, then a higher level policy may be derived indicating that sensitive data (e.g. data tagged "sensitive") may not be made accessible to developers (in the "Dev" group) and that sensitive data may be accessible to users in operations (in the "Ops" group). In some embodiments, block 560 may include some or all of the functionality associated with DPD 324 and/or PE 360.

In policy management block 570, access control policies may be managed. For example, changes (updates, additions, or deletions) to access control policies for one or more entities (actors or objects) may be monitored. Block 570 may flag access control policy changes and, in some embodiments, may facilitate automatic checking of any access control policy changes for compliance with current stated and/or derived policies. In some embodiments, block 570 may provide a Graphical User Interface (GUI) and include functionality to view representations of PR 350, process user queries related to one or more system entities, view graphical representations access control policies for the system or a subsystem. In addition, block 570 may provide functionality to add subsystems, delete subsystems, specify new access control policies, and/or invoke the functionality of one or more other blocks. In some embodiments, block 570 may facilitate the saving of timestamped representations of PR 350 for audits. Audits may use queries to determine one or more of: (a) which entities have access to another entity and the locations and/or conditions under which such access is permitted; (b) which entities are accessible from a specified entity; (c) whether a specified entity is accessible from one or more other specified entities at one or more specified locations; (d) whether access to one or more entities was permitted at one or more times in the past (e.g. based on historical records such as a prior stored and timestamped PR) such as and/or the duration of such past access; and (e) whether a specific access (e.g. to an object) was used, the number of times the access was used, the type of access, and the times the access occurred.

In some embodiments, in policy management block 570, provisioned policies or implemented policies that are non-compliant or inconsistent with one or more derived or stated access control policies may be identified, flagged as exceptions, and an administrator may be alerted. For example, based on all users in an "Ops" group and 1 user in a "Dev" group having access to an S3 bucket, a derived access control policy may infer that all "Ops" users are allowed access to the S3 bucket and that the one "Dev" user with access to the S3 bucket is an exception. In some embodiments, any exceptions to derived access control policies and/or stated access control policies may be flagged and/or presented to an administrator as an exception and/or for approval.

In some embodiments, in policy management block 570, one or more access control policies may be evaluated to determine access control policy drift or variance. For example, access policy graphs for entities (e.g. objects or object clusters) may be compared. If the access policy graphs for the objects are determined to be similar (e.g. based on one or more measures of similarity being above some threshold), then deviations between the graphs may be attributed to access policy drift. Various methods may be used to determine access policy graph similarity between pairs of access policy graphs. For example, one or more of the following methods may be used: determination of node correspondences between the access policy graphs, determination of neighbor correspondences, determination of neighborhood similarity, a graph edit distance—which is the number of transformation operations (e.g. additions, deletions, and/or substitutions) to transform one graph into the other, subgraph matching, etc. In one embodiment, a similarity score between 0 and 1 may be used, where a similarity score of 1 indicates that the access policy graphs are isomorphic. Lower similarity scores may indicate increasing dissimilarity. Graphs with a similarity score above some threshold may be evaluated and deviations between the graphs may be attributed to access policy drift.

In some embodiments, access policy drift may be determined in block 570 by: (a) determining an access policy graph for each of a plurality of objects and groups; (b) determining a similarity score between access policy graph pairs in (a); (c) clustering object pairs (or groups) with similar access graphs (e.g. a similarity score above some threshold); and (d) determining differences (e.g. entities accessible by one object (group) but not the other, and/or entities with access to one object (group) but not the other). In some embodiments, the distinctions between access policy graph pairs may be analyzed and presented visually, which may facilitate access policy drift correction. In some embodiments, the method above may also be used to determine access policy drifts for users and other entities.

In some embodiments, policy management block 570 may provide functionality to: generate reports related to various system metrics, save queries and searches, and/or share the results with others. In some embodiments, in block 570, alerts (e.g. via e-mail, text message, pop-up window, or in some other specified manner) may be generated for users (e.g. security professionals and/or system administrators, and/or other designated personnel) with verification results and/or results of a query. In some embodiments, the alerts may be delivered in real-time time. In some embodiments, alerts with query results and/or determined security/access control policy violations may be sent using a web interface, and/or through integration with systems such as STEM and/or using messaging applications including team messaging applications (e.g. "Slack," information about Slack is available at http://slack.com).

In some embodiments, in policy management block 570, the types of access used over some time period for a plurality of entities may be logged. Access types for the entities over the time period may provide an access usage profile for the entities. In some embodiments, the access usage profile for an entity, as determined above, may be viewed as describing a typical usage behavior for that entity. In some embodiments, block 570 may use profiles associated with any existing entity clusters may be used to normalize and store the usage profile.

In block 580, policy verification and testing may be performed. In some embodiments, in block 580, derived access control policies may be compared with one or more stated access control policies to determine anomalies or deviations of the implemented policy for one or more entities from the stated access control policy. In some embodiments, block 580 may facilitate verification of derived policies and/or implemented policies against the stated policies, (e.g. provided by a system administrator) and/or derived policies against implemented policies. In some embodiments, policy verification and testing in block 580 may occur for users against specified policies for those users; data objects (e.g. stored in various subsystems of the IT infrastructure 505) against specified policies for the data entities; host/platform entities (e.g. across various subsystems of the IT infrastructure 505) against specified policies for the entities; and network entities (e.g. forming part of the IT infrastructure) against specified policies for the entities.

In some embodiments, in policy verification and testing block 580, implemented policies may be tested against various specified or exemplary policies. For example, actual implemented policies (e.g. based on a current PR 350) may be tested against a list of stated policies (e.g. provided by a system administrator and/or expressed in PR 350) and/or derived policies that are considered invariant (e.g. organization or IT infrastructure wide policies), and/or against policies that are considered to be best practices. In some embodiments, in block 580, implemented policies (e.g. based on PR 350) may be checked against policies that model one or more scenarios such as the impact of a hacker hijacking or otherwise gaining access to one or more entities in IT infrastructure 505. In some embodiments, in block 580, access control policy changes may be modeled prior to deployment across exemplary security infrastructure 300 to alleviate any adverse impact of the policy changes.

In some embodiments, in policy verification and testing block 580, access control policy changes may be validated in CI/CD software development pipelines against stated policies and/or derived polices (including invariant policies) and/or best practices. For example, prior to deployment of a new CI/CD software development pipeline, access control policies may be obtained from source code in a source code repository or in scripts and templates (e.g. AWS cloudformation templates). In some embodiments, if no policy violations are determined to exist, then the CI/CD software development pipeline may be validated for deployment. Otherwise, (if policy violations exist), then the CI/CD software development pipeline may be flagged, and, in some instances, deployment may be prevented.

In some embodiments, when PR 350 includes first order logical expressions, block 580 may include functionality to determine whether a solution exists for satisfiability problems, which may reflect consistency (e.g. a lack of conflict) in a set of logical expressions. In some embodiments, when a solution exists, in block 580, the set of logical expressions may be resolved to determine a solution.

For example, as outlined above, a logical expression specifying that users A and B are part of an LDAP group X may be written as: Group (X,A,B)=(and (or (=user A) (=user B)) (=group X)); a logical expression to indicate access to role Y by group X may be written as Role (Y,X)=(and (=group X) (=role Y)); and a logical expression to indicate that role Y has access to object Z may be written as Object (Z,Y)=(and (=role Y) (=object z)). In some embodiments, based on the above expressions and a specific value for object z=p, block 580 may be able to determine values of "user" u1, u2 . . . so that logical expressions above are satisfied.

In some embodiments, policy verification and testing block 580 may be invoked (e.g. by block 570) to build new access policy graphs based on an existing PR 350 (e.g. an existing access policy graph) by using a sequence of queries to determine attributes of entities and relationships, which may be used to construct new access policy graphs (e.g. using SR 316). For example, the results of one or more queries may be used to construct access policy graphs to obtain snapshots of access control policies associated with portions of an IT infrastructure.

In some embodiments, in policy verification and testing block 580, upon a determination that a desired policy is being violated, one or more specific rules that contribute to the violation may be identified and the information may be provided to a user. For example, as a result of an access policy graph traversal, an access path that is non-compliant with some specified policy may be identified, and rule(s) and/or object attributes that contribute to the violation may be flagged and reported. In some embodiments, the user may be provided with information pertaining to rule changes that may stop the non-compliant behavior. In some embodiments, the impact of any proposed rule changes (e.g. on system entities) may also be presented to the user. In some embodiments, block 580 may include functionality to automatically remediate the policy violation by modifying the access control policy such that it is consistent with specified rules.

In some embodiments, in policy verification and testing block 580, a current usage of access for an entity or a group of entities may be compared against respective stored access usage profiles or stored normalized usage profiles to identify anomalous access behavior. In some embodiments, Policy Verification & Testing block 580 may perform a least privilege analysis for every entity where, for each entity being analyzed: (a) the types of access and usage pattern over some time period may be determined, and (b) access types that have not been used over the time period may also be determined. In some embodiments, for members of an entity cluster, differences in least privilege relative to other members of the cluster may be determined. Differences in least privilege between members of a cluster may indicate potential anomalies in access privilege allocation and/or usage. In some embodiments, in block 580, access policy drifts may be identified (e.g. as shown in FIG. 4I). In some embodiments, access policy drifts may be identified for an entity relative to other entities that belong to the same cluster. In some embodiments, block 580 may include some or all of the functionality associated with SRV 330, ST 340, and/or PE 360.

Figure 5B:
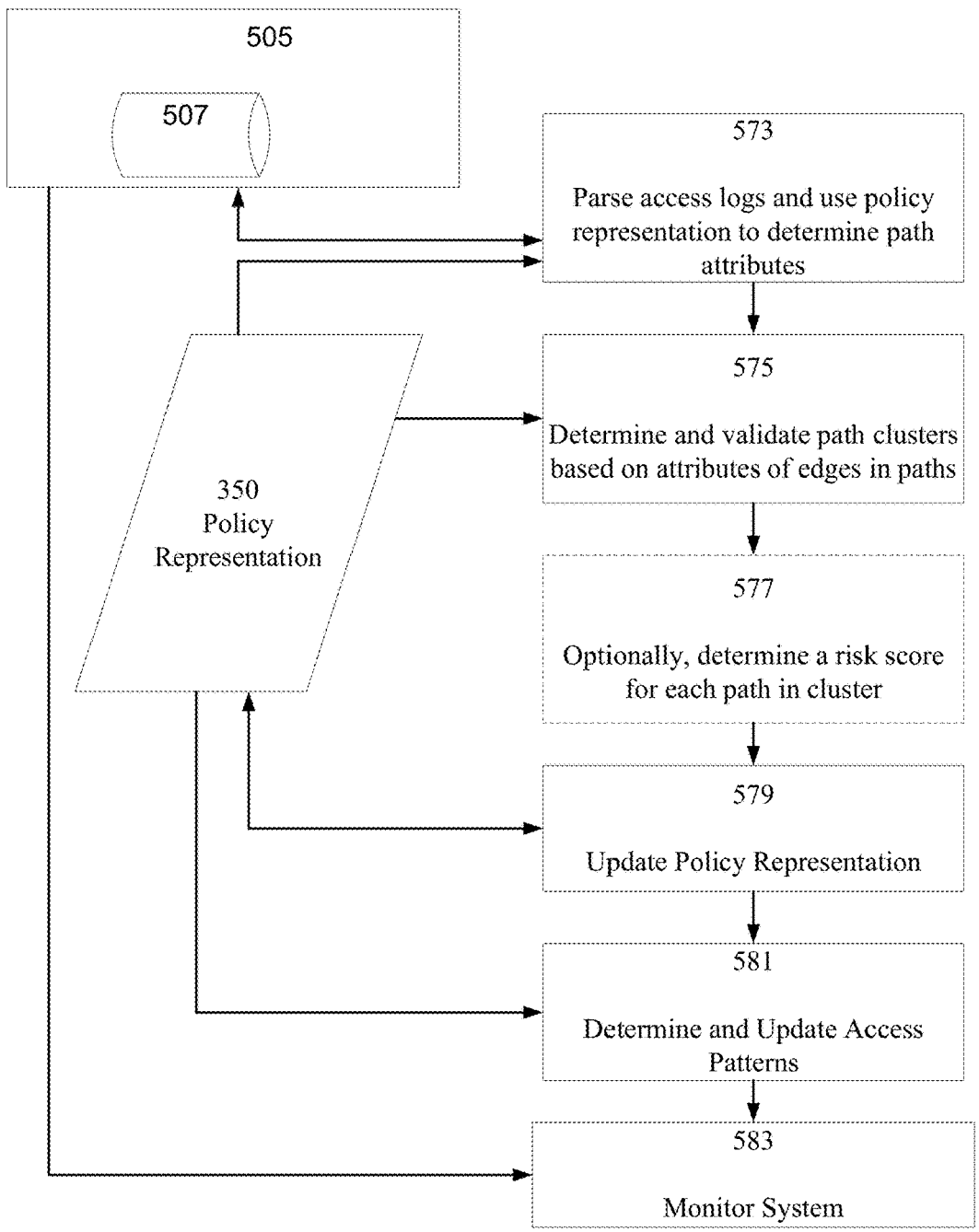
FIG. 5B shows a flowchart of an exemplary method for learning access patterns to identify suspicious or unauthorized access to one or more system entities.

FIG. 5B shows a flowchart of an exemplary method 571 for learning access patterns to identify suspicious or unauthorized access to one or more system entities. In some embodiments, method 571 may facilitate a reduction in false positive alerts. In some embodiments method 571 may be performed using functionality in blocks 570 and/or 580 (in FIG. 5A).

In block 573. Access Logs and/or Activity Logs (collectively referred to as ALs) 507 may be parsed and policy representation (PR) 350 may be used to determine path attributes. An access path may comprise one or more edges and each edge on a path may have one or more corresponding attributes associated with the edge. One or more ALs 507 may be present across IT infrastructure 505. ALs 507 may be stored in one or more databases.

Figure 5C:
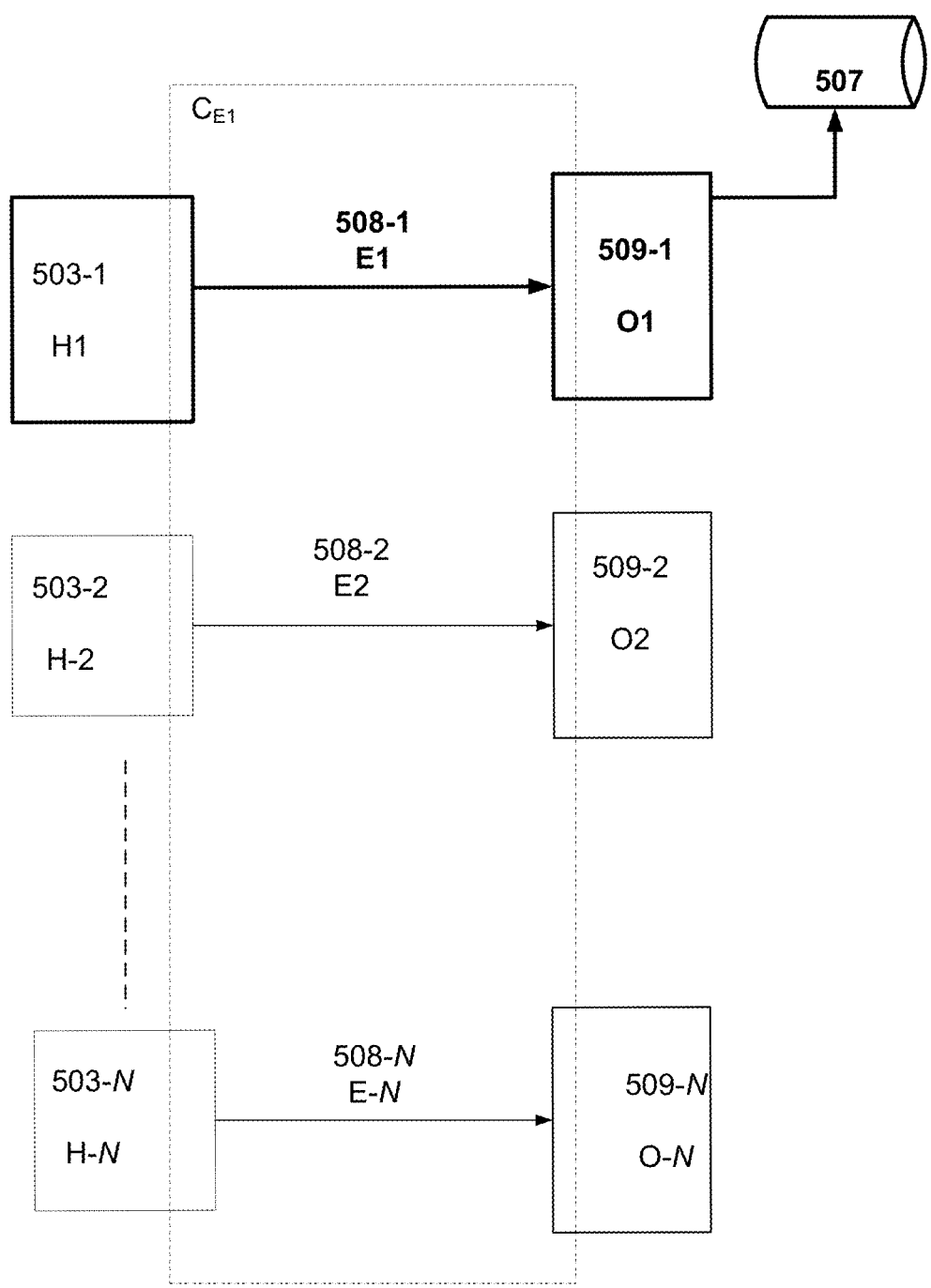
FIG. 5C shows paths enabling access by users to one or more objects.

FIG. 5C shows paths enabling access by users to one or more objects. In FIG. 5B, paths E1 508-1 and X2 508-2 through X-N 508-N may comprise one or more edges and each edge on a path may have one or more corresponding attributes associated with the edge. For simplicity and ease of description, paths E1 508-1 and E2 508-2 through X-N 508-N are shown as separate paths, although they may share one or more edges. Users H-1 503-1, H2 503-2 . . . H-N 503-N may access objects O1 509-1, O2 509-2 . . . O-N 509-N using paths E1 508-1, E2 508-2 . . . E-N 508-N, respectively.

In FIG. 5C, User H1 503-1 may access object O1 using path E1 508-1 (as shown by lines of heavier weight). The access may be recorded in AL 507. In some embodiments, access by user H1 503-1 to object O1 509-1 may have been granted based on access control policies (e.g. as represented in PR 350). In some embodiments, ALs 507 may include information pertaining to the edges (e.g. attributes) in path E1 508-1 as well as information pertaining to prior accesses by user H1 503-1.

Referring to FIG. 5B, in some embodiments, in block 571, upon parsing information in AL 507 and based on PR 350, it may be determined that access to object O1 509-1 (in FIG. 5C) was permitted and routine. For example, information in AL 507 and/or PR 350 may indicate access to O1 509-1 by user H1 503-1 using edge E1 508-1 is typical and/or occurs with some regularity.

In block 573, method 571 may determine path clusters based on attributes of edges in other paths present in an access control policy graph (e.g. as reflected in PR 350). For example, referring to FIG. 5C, in some embodiments, based on edge E1 508-1, block 573 may determine one or more other paths (e.g. E2 508-2 . . . E-N 508-N) which facilitate access by users (e.g. H2 503-2 . . . H-N 503-N) to objects (e.g. O2 509-2 . . . 509-N, respectively), where the paths (e.g. E2 508-2 . . . E-N 508-N) share attributes with path E1 508-1. Thus, a cluster of paths similar to path E1 508-1 may be determined (e.g. by policy management block 570).

Referring to FIG. 5B, in some embodiments, the path cluster (e.g. E2 508-2 . . . E-N 508-N) may be determined in block 575 based on path attributes and/or a connectivity matrix in the access graph (e.g. as stored in PR 350). For example, a path cluster for E1 (FIG. 5C) may be determined based on the extent of similarity of a path being considered for inclusion in the cluster to path E1. Connectivity matrices may form a part of PR 350 and may be indicative of and/or used to derive paths (edge or sequence of edges) between entities (e.g. user H1 503-1 and object O1 509-1), As outlined above, edges may be associated with attributes, so that a path (which may comprise a sequence of one or more edges) may also be associated with attributes (e.g. corresponding to the one or more edges in the path). Thus, for a path E1 508-1 (in FIG. 5C), block 575 (in FIG. 5B) may determine paths (e.g. E2 508-2 . . . E-N 508-N in FIG. 5C) that are similar to E1 so that the set of paths $C_{E1}$={E1 508-1, E2 508-2 . . . E-N 508-N} form a path cluster.

In some embodiments, in block 575, the path cluster may be formed even in instances where objects O2 509-2 . . . O-N 509-N (in FIG. 5C) have not been accessed by users H2 503-2 . . . H-N 503-N (in FIG. 5C) over the time period of observation. In some embodiments, machine learning techniques may be used in block 575, to determine a path cluster. In some embodiments, in block 575, one or more paths in the cluster may be tested and/or validated to determine compliance with policies (e.g. as reflected in PR 350) prior to be added to the path cluster. Paths that violate one or more policies may be flagged, not added to the cluster, or removed from the cluster if they are already part of the path cluster.

In some embodiments, the machine learning and/or clustering techniques (e.g. as implemented by policy management block 570 and/or policy verification and testing block 580) may be used to learn or infer (e.g. based on information in AL 507) that access to objects O2 509-2 . . . O-N 509-N via edges in cluster $C_{E1}$ is permissible. In some embodiments, the determination may facilitate a reduction or decrease in "false positive" alerts. The term "false positive" alerts is used to refer to alerts that may be generated for authorized access that would otherwise (e.g. without edge cluster $C_{E1}$) be flagged as suspicious and generate alerts to an administrator (such as an information security officer). In large and dynamic computer systems, such false alerts may increase both costs (focusing time and resources on non-threats) and risks (by drawing resources away from more serious threats).

In some embodiments, in block 577, a risk value or risk score may be assigned each access path in the path cluster based on the degree of similarity of the path being scored to path E1 508-1. The risk score may provide an indication of the degree of risk associated with access by a user (e.g. H2 503-2) to an object (e.g. O2 509-2) using a path (e.g. path E2 508-2) in path cluster (e.g. $C_{E1}$).

In some embodiments, in block 579, the path cluster (e.g. $C_{E1}$) determined in block 577 along with any corresponding risk scores (e.g. determined in block 577) may be used to update PR 350. In some instances, the number of access logs and/or activity logs (such as AL 507) may be: (a) relatively low and/or (b) distributed sparsely across the system. Thus, method 571 (e.g. blocks 575, 577, and/or 579) may be viewed as taking a set of ALs 507 and using information in ALs 507 to cluster a large set of paths, and classify the access paths as normal or permissible. In some embodiments, the access paths may be classified as normal or permissible even in instances where the paths have not been exercised over the period of observation.

In some embodiments, in block 581, access patterns may be learned through access/activity logs (such as AL 507) in the access graph to reduce false positive alerts and/or identify suspicious or unauthorized access. In some embodiments, following the determination of path clusters, in block 581, machine learning may be used to learn and model access patterns across the access graph. The model may be used to predict: (a) access permissions (access relationships between entities such as who can access what) and/or (b) patterns of access usage such as frequency of access (how often), access locations (where), temporal information (date and time), and other parameters associated with access to an object. The learned access patterns may update any previously stored patterns. Because machine learning is based on access information that is present in the access policy graph (e.g. as reflected in PR 350), the likelihood of false positives is further decreased.

In some embodiments, activity type anomalies may be determined by building activity profiles for each entity (such as users or VMs) based on learned action types and actions performed by corresponding entities (e.g. using AL 507). Ongoing or current activity is analyzed using the trained model/activity profiles to identify anomalies such as abnormal action types or abnormal activities performed by entities. As another example, activity volume anomalies may be determined by learning activity volumes for each entity (e.g. the number of times a specific API or action is invoked by the entity over a time period). Ongoing or current activity volume for an entity may be analyzed to identify anomalous behavior such as spikes in actions or an abnormal volume of actions over some time period. Location anomalies may be determined by learning locations typically used by entities to access resources and/or to perform activity. New and ongoing connections by entities may be analyzed to identify anomalies (e.g. suspicious or atypical locations used by entities to access resources/perform activities). Metadata anomalies may be determined by learning the metadata associated with entity connections (e.g. type of device used for connection and the user agent used for access). Anomalies in the metadata associated with the entity may be determined by the machine learning model.

In block 583, the learned information may be used to monitor the system and flag suspicious or unauthorized access. In some embodiments, the trained machine learning model may be used to look at existing path(s), or new path(s), or new/updated access activity log(s) to determine and/or predict unauthorized or suspicious access.

Figure 5D:
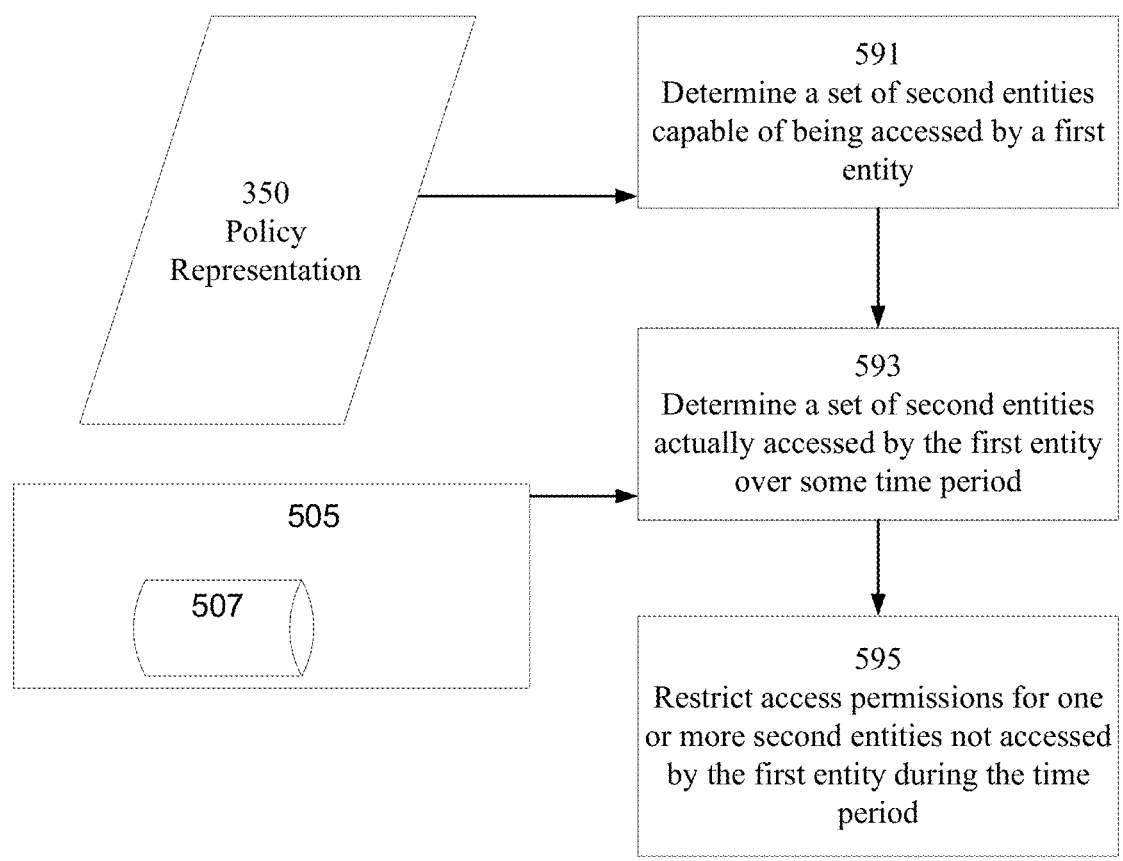
FIG. 5D shows a flowchart of a method for flagging or restricting access permissions based on access usage.

FIG. 5D shows a flowchart of a method 590 to learn based on access usage. In some embodiments, method 590 may identify and/or quarantine unused access. Unused access in system can be a security risk that may be exploited by malicious actors and/or hackers (both internal and external). Method 590 may facilitate risk mitigation by limiting unused access privileges. In some embodiments, method 590 may be run periodically or triggered based on a perceived threat level.

In block 591, a set of second entities (e.g. data objects) accessible by a first entity (users) may be determined (e.g. based on access policy graph). For example, PR 350 may be used to determine the set of second entities accessible by a first entity.

Figure 5E:
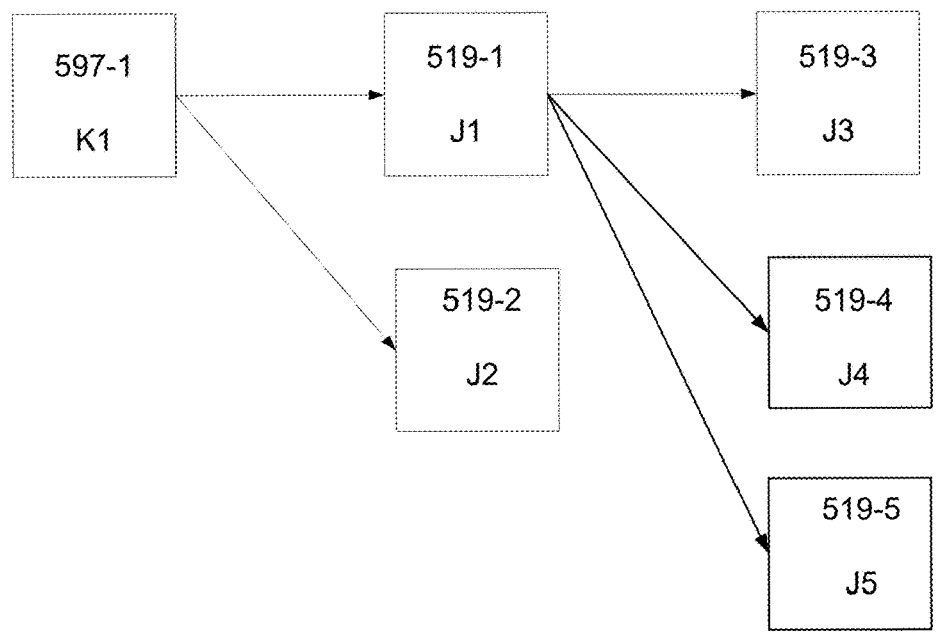
FIG. 5E shows an example access policy graph.

FIG. 5E shows an example access policy graph, which may form part of PR 350. As shown in FIG. 5E, user K1 597-1 may access objects J1 519-1, J2 519-2, J3 519-3, J4 519-4, and J5 519-5.

In block 593, a set of second entities accessed by the first entity over some time period may be determined (e.g. based on information in AL 507). The time period may be predefined, set by a system administrator, or set based on a perceived threat level (historic, current, or expected).

Figure 5F:
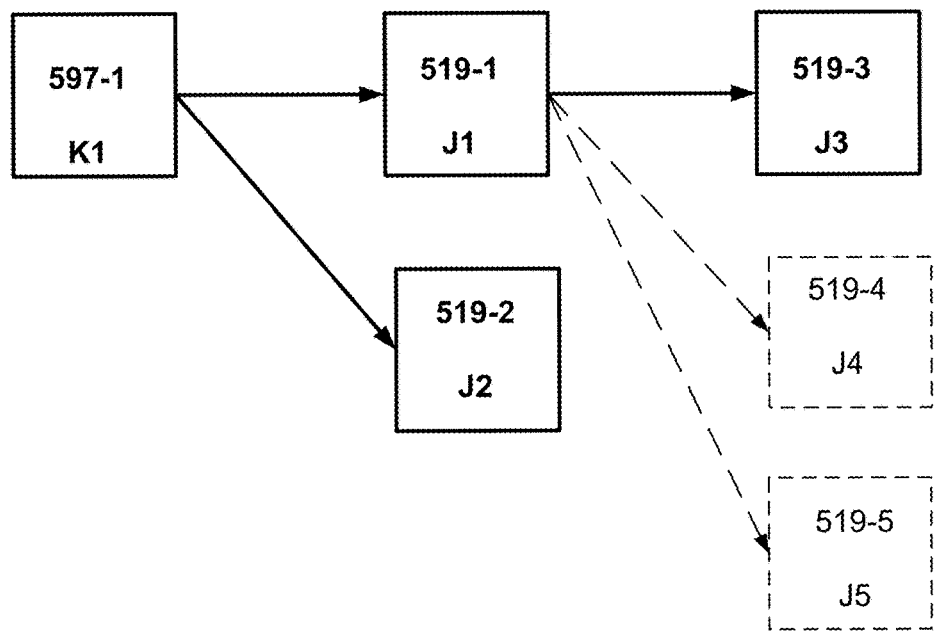
FIG. 5F shows objects actually accessed by a user over some time period.

FIG. 5F shows objects actually accessed by user K1 597-1 during some time period. As shown in FIG. 5F (by edges of heavy weight), objects J1 519-1, J2 519-2, and J3 519-3 have been accessed by user 597-1. Although user 597-1 has access to objects 519-4 and 519-5, these objects have not been accessed by user 597-1 during the time period (as shown by the dashed lines in FIG. 5F).

Referring to FIG. 5D, in block 595, access permissions for one or more second entities that were not accessed by the first entity during the time period may be restricted. For example, the access permissions may be quarantined or deleted. The term quarantine is used broadly to refer to marking entities, properties, or access paths to/from those entities so that actions may be automatically initiated when an attempt to activate the entities, and/or exercise the properties, and/or exercise the access paths is detected.

In some embodiments, in block 593, unused access for the first entity may be automatically identified by using the access policy graphs related to the first entity which may map all object to which the first entity is allowed access (e.g. in block 591) and then overlaying the actually used access (e.g. as determined in block 593). Second entities as determined in block 591 that are not present in the entities determined in block 593 constitute second entities which the first entity has not accessed (despite permission to access).

Figure 5G:
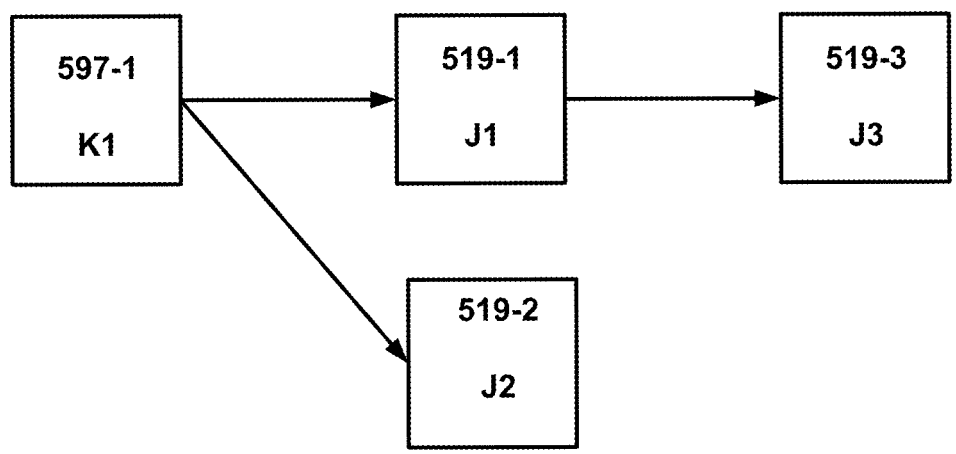
FIG. 5G shows a redacted access policy graph for a user where access to some objects has been deleted based on actual access usage.

FIG. 5G shows a redacted access policy graph for user K1 597-1 where access to objects J4 519-4 and J5 519 have been deleted based on the determination in block 593. In some embodiments, in block 595, access to one or more objects that were not accessed may be restricted. In some embodiments, unused access rights may quarantined so that if the access is exercised at some future point, an alert may be generated.

Referring to FIG. 5A, in some embodiments, blocks 510 through 540 (and/or other methods disclosed herein) may be performed using multi-processing or distributed processing. For example, block 510 may be performed by distributing the inventory creation task of determining policy objects and actors across a plurality of processors or nodes in distributed or cloud computing system. Each processor and/or node may perform a subset of inventory creation task and the results may be aggregated.

In some embodiments, access policy graph creation (e.g. blocks 520 through 540) may be performed using multi-processing or distributed processing. For example, multiple processors and/or distributed nodes may each initiate separate (sub-) graph creation processes for a subset of the entities associated with the IT infrastructure Each processing node may create its own sub-graph and the results may be aggregated to obtain initial policy representation.

In some embodiments, graph traversal (e.g. in blocks 570 and/or 580) may also be scaled and performed using multi-processing or distributed processing. For example, multiple processors and/or distributed nodes may each traverse sub-graphs and the results may be aggregated and processed.

Figure 6:
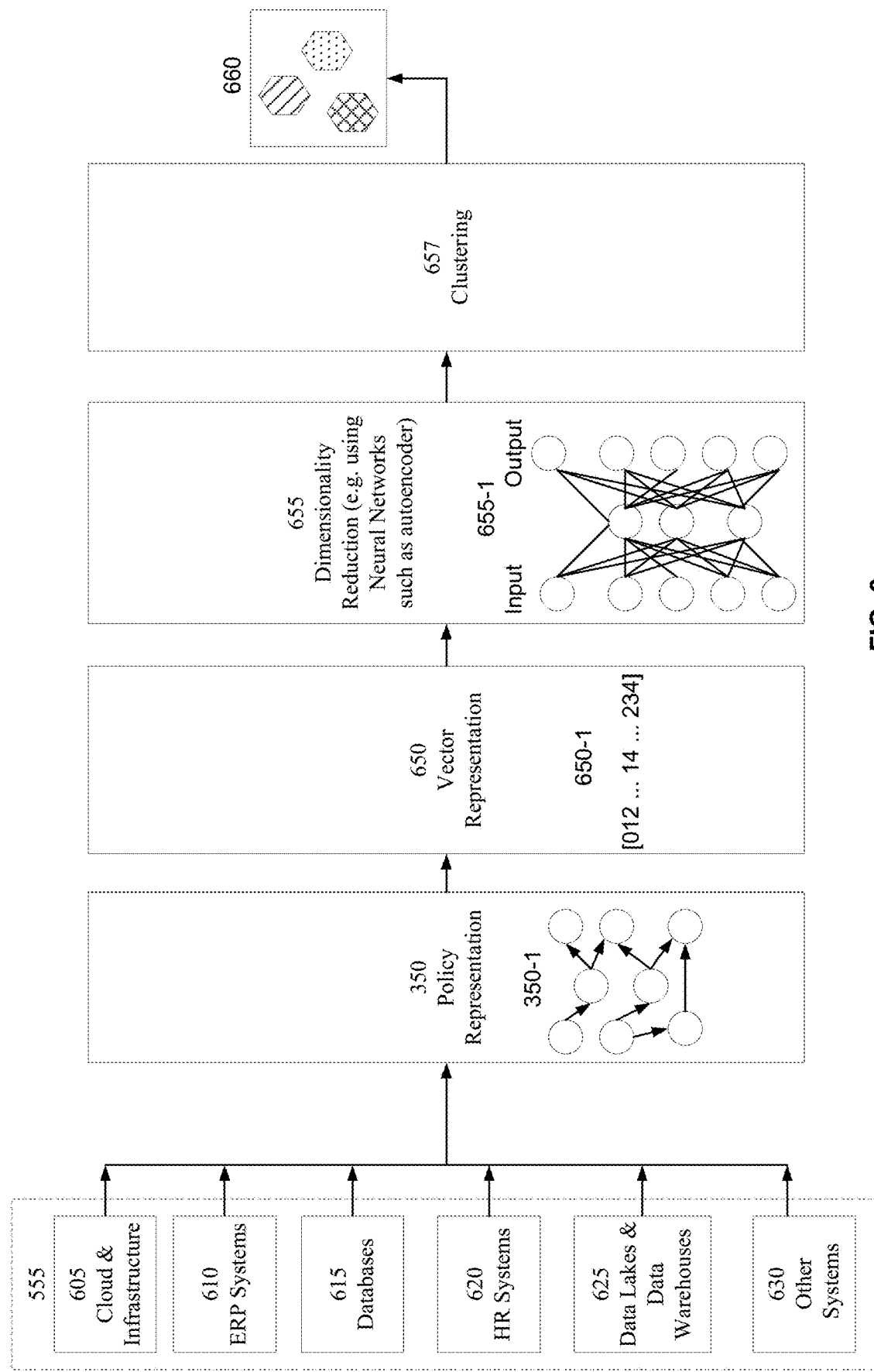
FIG. 6 shows an example process flow 600 for clustering according to some disclosed embodiments.

FIG. 6 shows an example process flow 600 for clustering according to some disclosed embodiments. In some embodiments, process flow 600 may use functionality provided by AOA 320 (FIG. 3A). In some embodiments, process flow 600 (or a portion thereof) may form part of one or more of blocks 550, 570, and/or 580 (FIG. 5A).

As shown in FIG. 6, PR 350 may be based on information on from a plurality of data sources 555. In some embodiments, data sources 555 may include entities associated with the cloud and infrastructure 605 (e.g. computers, servers, conventional datacenters, cloud-based infrastructure and services, platforms, applications, etc.), Enterprise Resource Planning (ERP) systems 610, databases 615, HR systems 620, data lakes and data warehouses 625, and various other systems 630 (e.g. that may be specific to an organization and include information related to entities associated with the organization). The term "data lake" refers to storage repositories that may hold large amounts of raw data in its native or natural format. The raw data may include structured (e.g. relational databases), partially structured (e.g. logs, XML, files, etc.), and unstructured data (e-mails, documents, binaries etc.). A "data warehouse" refers to a repository that stores structured data, so that raw data may be processed and/or formatted (e.g. based on some schema) prior to storage in the repository. In some embodiments, PR representation may include and/or take the form of access control policy graph 350-1.

In some embodiments, access control policies associated with various entities in PR 350 (e.g. access control graphs) may be processed to obtain a vector representation (VR) 650. In some embodiments, VR 350 may represent attributes of each entity in PR 350 (such as nodes and edges in an access control graph) with vectors. In some embodiments, the vectors may comprise some ordered sequence of numbers (e.g. as shown, for example, in VR 350-1), which represent the attributes associated with an entity. In some embodiments, a vector of attributes may be determined for each entity (e.g. nodes and/or edges) in the access control graph (e.g. when PR 350 takes the form of an access control graph).

In some embodiments, dimensionality reduction block (DR) 655 may obtain a reduced dimensionality representation of VR 650. Dimensionality reduction may perform a mapping of the attribute vectors to a subspace with a lesser number of dimensions (e.g. by removing irrelevant or redundant attributes). In some embodiments, DR 655 may use one or more neural networks (e.g. neural network 655-1), such as an autoencoder to perform dimensionality reduction. Neural networks may be implemented on a computer (e.g. as in FIG. 7 described below) using a combination of hardware and software. For example, a computer may comprise one or more neural network processor(s), and/or distributed processors capable of being configured as a neural network, and/or software to model and/or simulate neural networks. In autoencoding neural networks (or autoencoders), the input is compressed into a latent space representation. The latent space representation may be used to reconstruct the output, which is the same as the input. For example, a deep learning autoencoder may compress the input attribute vectors into a compressed lower-dimensional representation (which is also called a "latent-space representation"). In some embodiments, dimensionality reduction may be performed by applying dictionary learning techniques. For example, dictionary learning may be used to find a frame (also called a dictionary or lexicon) which is a lower dimensional representation of the input attribute vectors. The dictionary may be inferred from the input attribute vectors.

In some embodiments, in clustering block 657, a deep learning autoencoder may further determine clusters 660 based, in part, on the latent space representation. Clustering refers to the determination of a concise model of the data (or some subset thereof). Clustering may be viewed as data summarization. In clustering, a set of data points may be partitioned them into one or more groups, which are similar in some respects (e.g. the data points may share one or more attributes).

In some embodiments, in clustering block 657, a deep learning neural network (or autoencoder) may be used with a dimensionally reduced representation (e.g. obtained in dimensionality reduction block 655) of VR 350 (which may reflect an existing access control policy expressed as PR 350) to find one or more clusters (e.g. one or more objects, users and entities with shared attributes) 660.

In some embodiments, in clustering block 657, the autoencoder may also determine entities with atypical attributes relative to the one or more clusters 660. In some embodiments, the autoencoder (e.g. neural network 655-1) may be trained by feeding it vectors representing the attributes of each element of the access graph (object, edge, node, user, service, etc.). The autoencoder may learn structures or patterns in the access graph based on VR 360 using deep learning, represent the structures or patterns in latent space layers, reconstruct the input from the latent space representation, and compare the output to the input to determine the accuracy of the reconstruction from the latent space representation. Differences between the input and the output of the autoencoder may be used to determine entities (e.g. nodes or edges) that are atypical relative to the rest of a graph or relative to one or more clusters 660. Thus, objects that are atypical relative to a graph and/or one or more clusters 660 may be determined. In some embodiments, atypical objects may be flagged. In some embodiments, clustering may be used to test new objects, and/or users, and/or edges and/or access control policy changes for compliance with existing policies.

In some embodiments, cluster 660 may be determined (e.g. in cluster block 657) by building a vector of attributes for each object, user and edge in the graph (such as VR 650) and applying clustering methods such as one or more of: K-Means clustering, agglomerative clustering, spectral clustering, and/or subspace clustering on the attribute vectors to facilitate determination of the clusters 660. "K-Means clustering" refers to an unsupervised learning technique that may utilize VR 650 to determine a mean of data (e.g. attribute vectors) in a cluster based on a distance (e.g. graph edit distance) and a centroid (median graph). In K-means clustering, data points (e.g. attribute vectors) may be partitioned into k clusters where each data point is associated with a cluster with the nearest mean. The mean serves as a prototype of the associated cluster. Agglomerative clustering starts by considering each data point (e.g. attribute vector) as a "cluster" and then merging clusters hierarchically. In spectral clustering, the eigen structure of a similarity matrix is used to partition data points (e.g. attribute vectors) into disjoint clusters with points in the same cluster having high similarity and points in different clusters having low similarity. In subspace clustering, clusters are determined in different subspaces within a dataset (e.g. the attribute vectors). Because many dimensions in high dimensional data may be irrelevant and mask clusters, subspace clustering techniques localize the search for dimensions that are relevant and thereby determine clusters that may exist in multiple subspaces, which in some instances, may overlap. In top-down subspace clustering, initial clusters may be formed based on the full set of dimensions and the subspaces of each cluster may be iteratively evaluated to improve results. In bottom-up subspace clustering dense regions may be determined in low dimensional spaces and the dense regions may be combined to form clusters.

Some disclosed embodiments, may cluster nodes in a policy representation (such as access control graph) by: (a) creating an adjacency vector for each first node (e.g. as part of VR 650) where the adjacency vector (e.g. 650-1) lists the other second nodes that are adjacent to the first node in the access control graph; (b) adding attributes of the first node and optionally attributes of second adjacent nodes to the adjacency vector; (c) clustering the adjacency vectors using K-means or by training an autoencoder on the adjacency vectors and obtaining latent mappings for each adjacency vector using an auto-encoder (dimensionality reduction) and then clustering the latent mappings.

Optionally, in some embodiments, for each node in some subset of nodes in the access control graph, the method may create a representation of a first node being considered in the latent space, wherein, in the latent space representation other second nodes in the graph that are very similar in terms of connectivity to the first node are mapped as close to the first node. For each first node in the subset being considered, depth first traversal, breadth first traversal (or some combination of depth first and breadth first traversal) starting from the first node may be used to map the second nodes that are similar in terms of connectivity to the first node. The latent space representations above may then be used to obtain clusters (e.g. using step (c) above).

Some disclosed embodiments may facilitate node or edge prediction in an access control graph. In some embodiments, the method may comprise: (1) clustering edges and nodes in the access control graph (e.g. as described above); (2) labeling edges and nodes in the graph with respective cluster labels; (3) performing supervised learning for each node and cluster.

In some embodiments, supervised learning for each node and cluster in step (3) above may be performed by the following method: (a) inputting a vector for each node or edge where the vector contains some or all of the attributes of the node or edge along with all cluster tags and other tags to a deep learning neural network; (b) training the deep learning neural network on test data created from the set of all nodes and edges in the graph; (c) testing the trained model using a dataset created from the set of all nodes an edges such that the test set has minimal or no overlap with training set; (d) predicting clusters and other attributes of any new node or edge being added to the graph based on the model resulting from step (c). In some embodiments, the prediction may be used to identify anomalies, exceptions, and risk.

In some embodiments, supervised learning for each node and cluster in step (3) may be performed by the following method: (d) inputting a vector for each node or edge where the vector contains some or all of the attributes of the node or edge along with all cluster tags and other tags to a decision tree; (e) predicting clusters and other attributes of any new node or edge being added to the graph based on the decision tree. In some embodiments, the prediction may be used to identify anomalies, exceptions, and risk. In some embodiments, the decision tree may also be presented to the user to illustrate the rationale for the prediction of attributes for the node or edge being added to the graph.

In some embodiments, the functionality of blocks 655 and 657 may be combined into a dimensionality reduction and clustering block. /720 In some embodiments, the policy representation may comprise a stated access control policy and the method may comprise: (a) determining whether one or more access control policies in the policy representation and/or the derived access control policy comply with the stated access control policy; or (b) determining one or more access control policies in the policy representation that are non-compliant relative to the derived access control policy and/or the stated access control policy; or (c) determining one or more access control policies in the policy representation that exhibit a drift or a variance relative to the derived access control policy and/or the stated access control policy.

Figure 7:
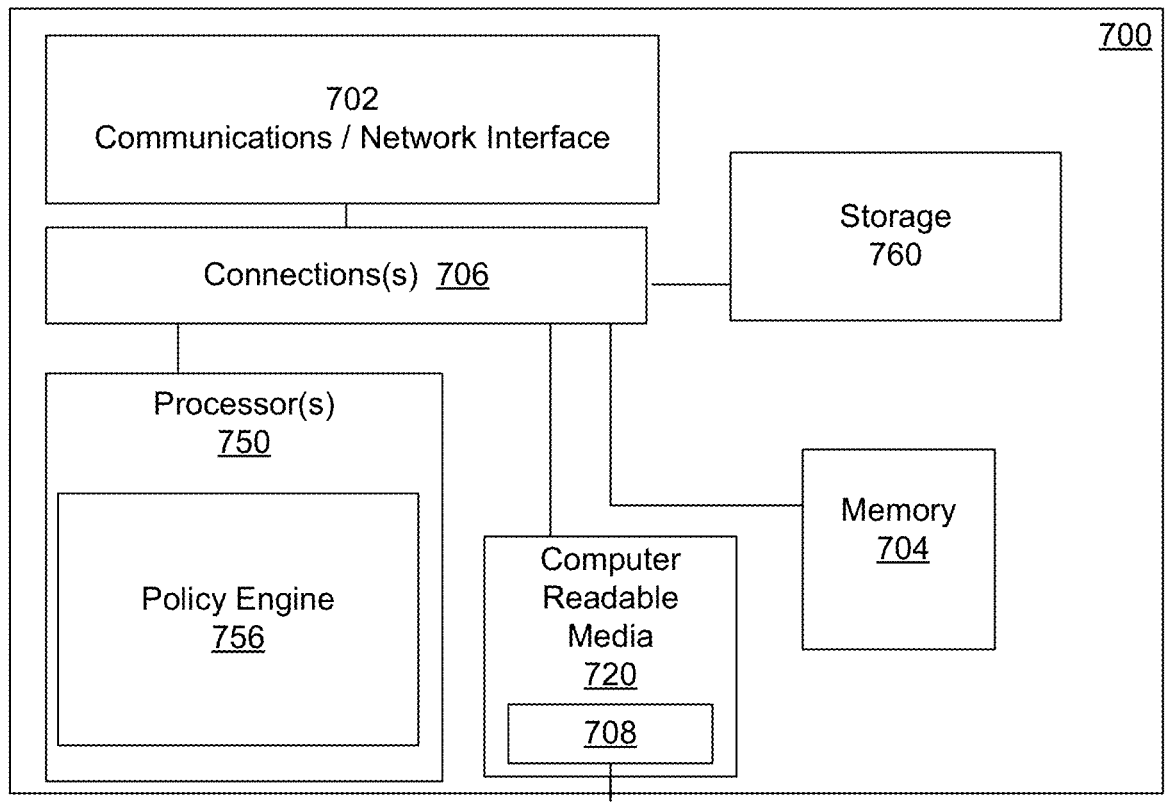
FIG. 7 shows an exemplary computer capable of implementing an access control architecture and performing access control, management, and testing in accordance with some disclosed embodiments.

FIG. 7 shows an exemplary computer 700 capable of implementing an access control architecture and performing access control, management, and testing in accordance with some disclosed embodiments. For example, computer 700/processor(s) 750 may comprise one or more neural network processor(s), and/or distributed processors capable of being configured as a neural network, and/or be capable of executing software to model and/or simulate neural networks. In some embodiments, computer 700 may be coupled to IT infrastructure 505 using communications/network interface 702, which may include wired (e.g. Ethernet including Gigabit Ethernet) and wireless interfaces. Wireless interfaces may be based on: Wireless Wide Area Network (WWAN) standards such as cellular standards including 3G, 4G, and 5G standards; IEEE 802.11x standards popularly known as Wi-Fi. In some embodiments, communications/network interface may be used for integration with SIEM systems. The terms "processor" or "processor(s)" may refer to a single processor, a processor with multiple cores, a multi-processing system, and/or distributed processors.

Computer 700 may include memory 704, which may include one or more of: Read Only Memory (ROM), Programmable Read Only Memory (PROM), Random Access Memory (RAM) of various types, Non-Volatile RAM, etc. Memory 704 may be implemented within processor(s) 750 or external to processor(s) 750. As used herein, the term "memory" refers to any type of long term, short term, volatile, nonvolatile, or other memory and is not to be limited to any particular type of memory or number of memories, or type of media upon which memory is stored.

Memory may comprise cache memory, primary memory, and secondary memory. Secondary memory may include computer-readable media 720. Computer-readable media drive 720 may include magnetic and/or optical media. Computer-readable media may include removable media 708. Removable media may comprise optical disks such as compact-discs (CDs), laser discs, digital video discs (DVDs), blu-ray discs, and other optical media and further include USB drives, flash drives, solid state drives, memory cards etc. Computer 700 may further include storage 760, which may include hard drives, solid state drives (SSDs), flash memory, and other non-volatile storage.

Communications/Network interface 702, storage 760, memory 704, and computer readable media 720 may be coupled to processor(s) 705 using connections 706, which may take the form of a buses, lines, fibers, links, etc.

The methodologies described herein (e.g. in FIGS. 3, 4, 5, and 6) may be implemented by various means depending upon the application. For example, these methodologies may be implemented in hardware, firmware, software, or any combination thereof. For a hardware implementation, the processor(s) 750 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with microcode, procedures, functions, and so on that perform the functions described herein. Any machine-readable medium tangibly embodying instructions may be used in implementing the methodologies described herein. For example, software may be stored in storage 760 and/or on removable computer-readable media 708. Program code may be resident on computer readable media 720, removable media 708, or memory 704 and may be read and executed by processor(s) 750.

If implemented in firmware and/or software, the functions may also be stored as one or more instructions or code computer-readable medium 720, removable media 708, and/or memory 704. Examples include computer-readable media encoded with data structures and computer programs. For example, computer-readable medium 720 and/or removable media 708 may include program code stored thereon may include program code to support methods for access control policy determination, management, provisioning, verification, and testing according to some disclosed embodiments. For example, computer-readable medium 720 and/or removable media 708 may include program code to support techniques disclosed in relation to FIGS. 3-6.

Processor(s) 750 may be implemented using a combination of hardware, firmware, and software. Processor(s) 750 may be capable of performing methods disclosed in relation to FIGS. 3-6, including method 500. In some embodiments, computer 700 may be coupled to a display to facilitate viewing of GUIs and interaction with administrators and other users.

Figure 8:
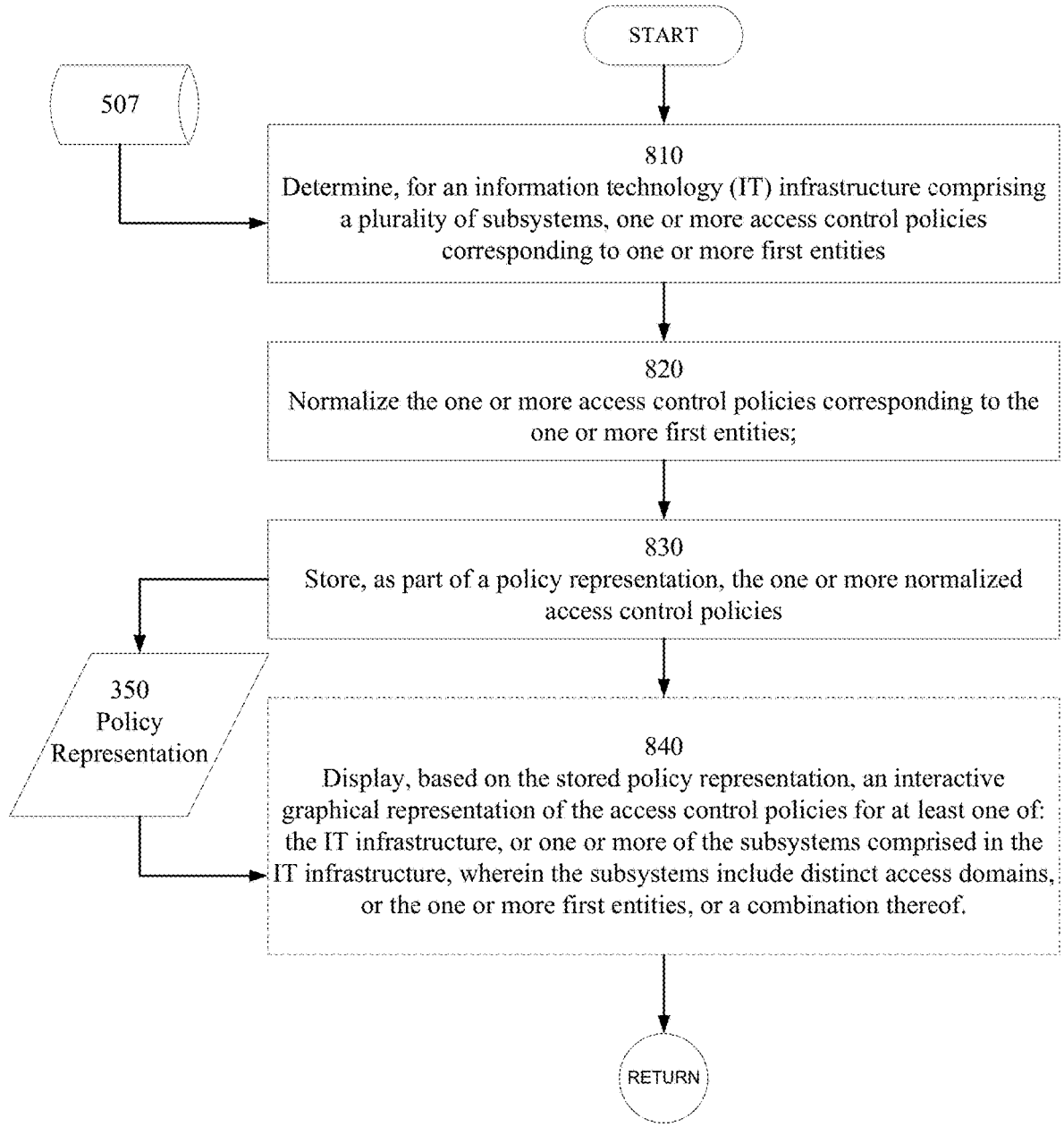
FIG. 8 shows an example flowchart for a method 800 to facilitate determination, display, monitoring, and administration of access control policies for an IT infrastructure comprising a plurality of subsystems.

FIG. 8 shows an example flowchart for a method 800 to facilitate determination, display, monitoring, and administration of access control policies for an IT infrastructure comprising a plurality of subsystems. In some embodiments, method 800 may be performed by computer 700, which may take the form of a multi-processor and/or distributed computing system. In some embodiments, method 800 may be implemented by one or more of AOPC 310 and/or AOA 320 (FIG. 3A), and/or one or more of blocks 510, 540, and/or 550 (FIG. 5A).

In block 810, one or more access control policies corresponding to one or more first entities (e.g. actors and/or objects) in an information technology (IT) infrastructure comprising a plurality of subsystems may be determined. As outlined herein, the plurality of subsystems may comprise multiple domains (e.g. AWS, LDAP, Salesforce, VMWare, etc.), where transitive cross-domain access policy relationships may exist. For example, an IT infrastructure may support connections by a first entity, such as a single identity (e.g. a user), to objects in distinct domains and transitive access control policy relationships may exist across the domains. As one example, the IT infrastructure may support connections and access by a user to LDAP, which may connect to and/or access some AWS resource. In some embodiments, in block 810, determination of the one or more access control policies corresponding to the one or more first entities may comprise determining transitive cross-domain access policy relationships for domains associated with the IT infrastructure. The term "domain" may refer to a subsystem (e.g. hardware, software, or cloud resources) associated with the IT infrastructure that may logically form a unit (e.g. AWS, LDAP, Salesforce, VMWare, etc.). In some instances, the domain may be administered as a unit based on some common rules and procedures. Domains may form part of a subsystem. In some instances, a subsystem may comprise multiple domains. In some embodiments, information in AL 507 (e.g. across the IT infrastructure) may be parsed to determine access control policies.

In block 820, the one or more access control policies corresponding to the one or more first entities may be normalized. During normalization, access control policy information determined for the one or more first entities (e.g. actors and/or objects) in step 810, may be interpreted and the access control policies associated with the one or more first entities may be represented in a normal or standardized form. In some embodiments, the normal or standardized from may be a generalized representation independent of any particular entity (e.g. the normalized representation may be entity/system/sub-system/domain agnostic). For example, the normalized access control policy representation may represent security and/or access control policies in a form that is not specific to any particular subsystem or entity and in a manner that facilitates a uniform access control policy description across the various subsystems (and domains) of an IT infrastructure (e.g. in a consistent standardized format). In some embodiments, an access policy graph may be used to represent access control policies. As outlined above, the access policy graph may include information and meta-data (e.g. as shown in Tables 380 and/or 390) pertaining to access for the one or more first entities, including access permissions, access types, access logs, access policy changes etc. In some embodiments, information from AL 507 may be used, aggregated, and included during normalization.

In block 830 the one or more normalized access control policies may be stored, as part of a policy representation (e.g. PR 350). In some embodiments, the policy representation (e.g. PR 350) may comprise at least one of: an access control policy graph, or a logical expression comprising first order logic. The policy representation (e.g. PR 350) may indicate, for at least one first entity, one or more second entities with access to the first entity (e.g. as in Table 390); or one or more third entities accessible to the first entity (e.g. as in Table 380). In some embodiments, PR 350 may further comprise a stated access control policy for the IT infrastructure (e.g. provided by an organization or administrator). The stated access control policy for an IT infrastructure may reflect the security or compliance conditions and/or goals that are to be enforced in an IT infrastructure (which may differ from the actual implemented access control polices). In some embodiments, PR 350 may be augmented (e.g. in a subsequent step) by obtaining a compressed version an existing PR 350 based on one or more of: discovered clusters and/or derived policies, and storing the compressed version as part of PR 350.

Optionally, in block 840, based on the stored policy representation (e.g. PR 350), an interactive graphical representation of the access control policies may be displayed. The displayed access control policies may pertain to at least one of: the IT infrastructure, or one or more of the subsystems comprised in the IT infrastructure, wherein the subsystems include distinct access domains, or may correspond to at least one of the one or more first entities, or a combination thereof. The displayed representation may facilitate an overall view of the security architecture, and may further interactively facilitate a drill-down by a user to view access control policies at various lower levels of granularity (e.g. at the level of a subsystem, domain, group of entities, and/or a single entity)

In some embodiments, following block 830, PR 350 may be used to monitor and/or enforce changes to access control policies. For example, proposed changes to access control polices may be reported and evaluated against a stated access control policy or a derived access control policy to determine if the proposed access control policy changes can be implemented.

Figure 9:
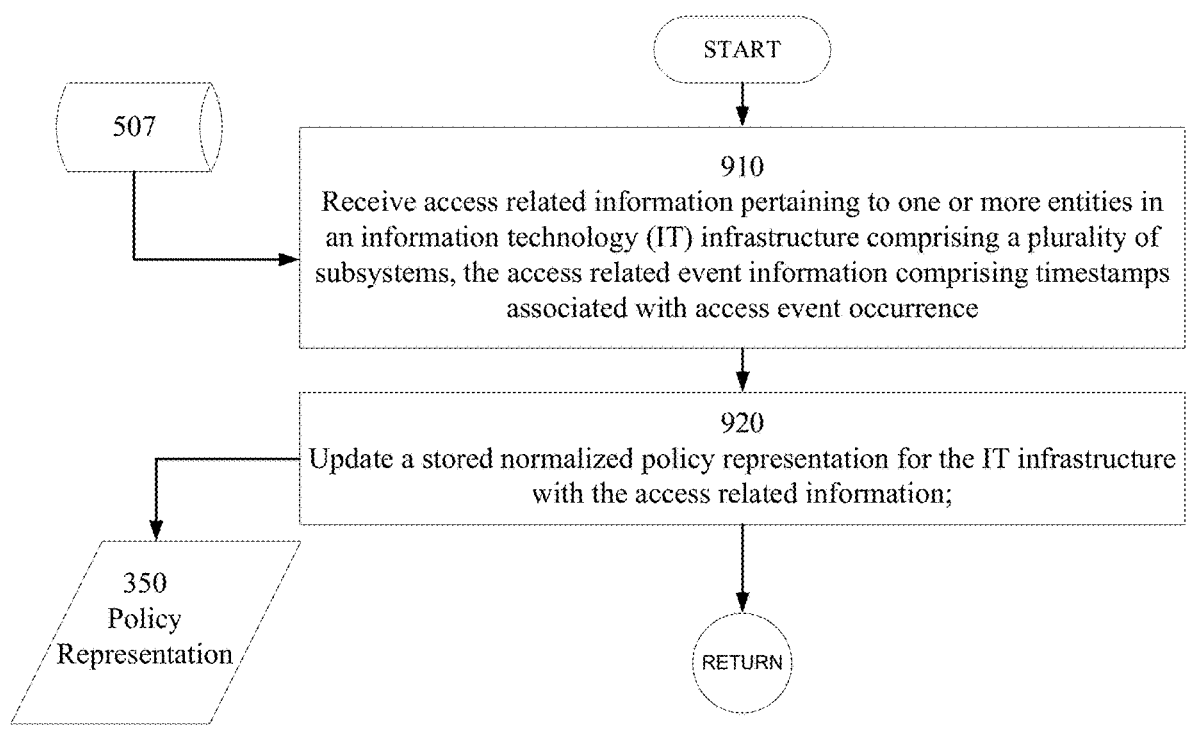
FIG. 9 shows an example flowchart for a method 900 to facilitate tracking of access control policies for an IT infrastructure comprising a plurality of subsystems over time.

FIG. 9 shows an example flowchart for a method 900 to facilitate tracking of access control policies for an IT infrastructure comprising a plurality of subsystems over time. In some embodiments, method 900 may be performed by computer 700, which may take the form of a multi-processor and/or distributed computing system. In some embodiments, method 900 may be implemented by one or more of AOPC 310 and/or AOA 320 (FIG. 3A), and/or one or more of blocks 510, 540, and/or 550 (FIG. 5A).

In block 910, access related information pertaining to one or more entities in an information technology (IT) infrastructure comprising a plurality of subsystems may be received. The access related event information may comprise timestamps associated with access related event occurrence. Access related event information may include information in AL 507. Access related event information may include information pertaining to access attempts to entities, actual accesses/actions taken, access times, access types, access permission change logs, access paths (e.g. edges in access policy graph) that were exercised, etc. and timestamps associated with occurrence of each of the access related events above. In some embodiments, the access related information may be automatically obtained by a system implementing block 910. For example, the access related information may be periodically provided by various subsystems, and/or may be provided at each access related event occurrence, and/or in response to a request, and/or may be pulled or read (e.g. by the system implementing block 910). Further, as outlined herein, the access related information pertaining to the IT infrastructure, may include access related information pertaining to multiple domains with transitive cross-domain access policy relationships.

In block 920, a stored normalized policy representation (e.g. PR 350) for the IT infrastructure may be updated with the access related information. For example, access related information pertaining to an entity and/or an edge may be aggregated and stored along with the timestamps for the access related event information. In some embodiments, block 920 may facilitate recreation and/or replay of access related events (e.g. based on the timestamps associated with the events) and/or the creation of an audit trail that may be used track changes over time.

Figure 10:
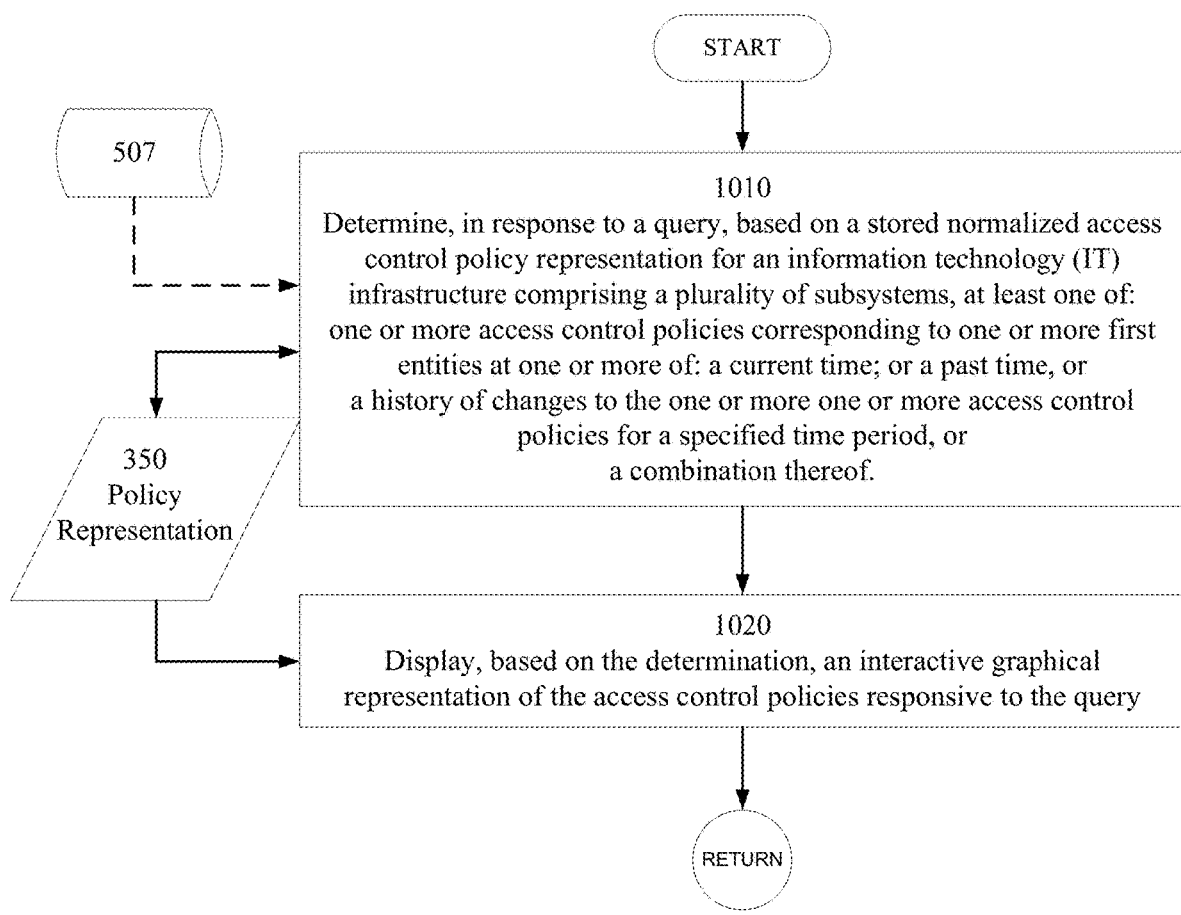
FIG. 10 shows an example flowchart for a method 1000 to facilitate querying and visualization of access control policies for an IT infrastructure comprising a plurality of subsystems.

FIG. 10 shows an example flowchart for a method 1000 to facilitate querying and visualization of access control policies for an IT infrastructure comprising a plurality of subsystems. In some embodiments, method 1000 may be performed by computer 700, which may take the form of a multi-processor and/or distributed computing system. In some embodiments, method 1000 may be implemented by one or more of SRV 330 and/or ST 340 (FIG. 3A), and/or one or more of blocks 570 and/or 580 (FIG. 5A).

In block 1010, one or more access control policies corresponding to one or more first entities at one or more of: a current time; or a past time, or a history of changes to the one or more one or more access control policies for a specified time period, or a combination thereof may be determined. In some embodiments, the determination in block 1010 may occur in response to a query and the determination may be based on a stored normalized access control policy representation for an information technology (IT) infrastructure comprising a plurality of subsystems. As outlined herein, the access control polices determined (e.g. in block 1010) may include access control policies pertaining to multiple domains with transitive cross-domain access policy relationships. In some embodiments, updated information from AL 507 may be used prior to query processing, to update PR 350.

In block 1020, based on the determination (e.g. in block 1010), an interactive graphical representation of the access control policies responsive to the query may be displayed.

Figure 11:
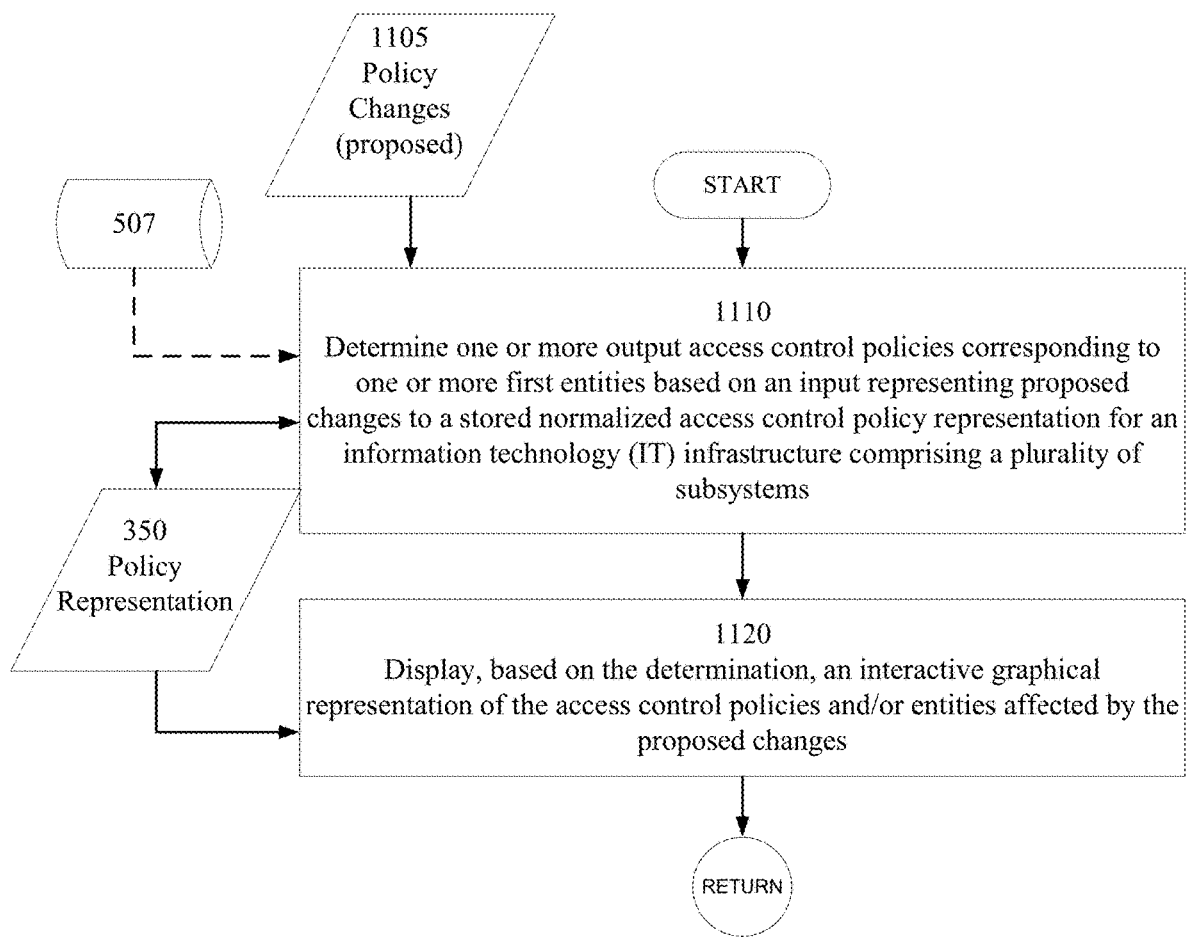
FIG. 11 shows an example flowchart for a method 1100 to facilitate modeling and visualization of access control policies for an IT infrastructure comprising a plurality of subsystems.

FIG. 11 shows an example flowchart for a method 1100 to facilitate modeling and visualization of access control policies for an IT infrastructure comprising a plurality of subsystems. In some embodiments, method 1100 may be performed by computer 700, which may take the form of a multi-processor and/or distributed computing system. In some embodiments, method 1100 may be implemented by one or more of SRV 330 and/or ST 340 (FIG. 3A), and/or one or more of blocks 570 and/or 580 (FIG. 5A).

In block 1110, one or more access control policies corresponding to one or more first entities may be determined and output. The determination in block 1110 may be based on an input representing proposed changes to a stored normalized access control policy representation for an information technology (IT) infrastructure comprising a plurality of subsystems. In some embodiments, the input representing the proposed changes may be provided in the form of a normalized access policy graph (e.g. specifying additions, deletions, or access privilege changes for one or more entities) or may be converted to a normalized access policy representation (e.g. in block 1010). In some embodiments, updated information from AL 507 may be used prior to the processing of proposed changes, to update PR 350.

In block 1120, based on the determination (e.g. in block 1110), an interactive graphical representation of the access control policies and/or the entities affected by the proposed changes may be displayed. Accordingly, in some embodiments, proposed changes to an access control policy regime may be modeled and the impact of any changes may be determined and visualized, prior to roll-out or implementation of the changes.

Figure 12:
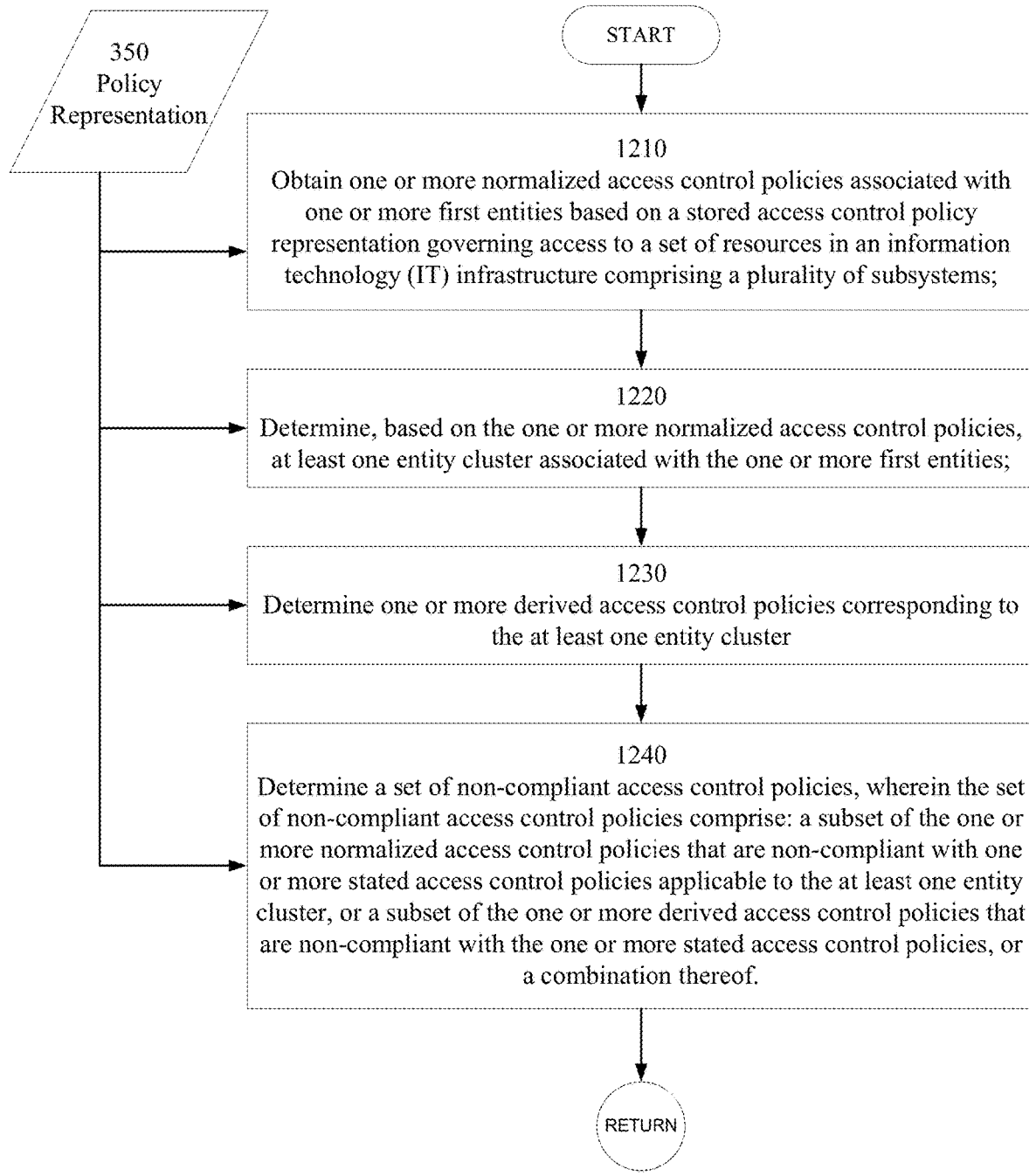
FIG. 12 shows an example flowchart for a method 1200 to facilitate determination of one or more non-compliant access control policies for an IT infrastructure comprising a plurality of subsystems.

FIG. 12 shows an example flowchart for a method 1200 to facilitate determination of one or more non-compliant access control policies for an IT infrastructure comprising a plurality of subsystems. In some embodiments, method 1200 may be performed by computer 700, which may take the form of a multi-processor and/or distributed computing system. In some embodiments, method 1200 may be performed by one or more of AOA 320 and/or SRV 330 (FIG. 3A), and/or blocks 550, 570, and/or 580 (FIG. 5A).

In block 1210, one or more normalized access control policies associated with one or more first entities may be obtained based on a stored access control policy representation (e.g. PR 350) governing access to a set of resources in an information technology (IT) infrastructure comprising a plurality of subsystems. The one or more normalized access control polices may represent access control policies as implemented. In some embodiments, the policy representation may comprise one or more second entities with access to the one or more first entities, or one or more third entities accessible to the one or more first entities, or a combination thereof. In some embodiments, the normalized access control policies may be configurable (e.g. by an administrator or automatically by the system). For example, values, ranges, and/or settings associated with one or more access control parameters for a normalized access control policy associated with the one or more first entities may be added, deleted, changed or otherwise modified. The values, ranges, and/or settings may, in some instances, be based on attributes or attribute values associated with the one or more first entities. In some embodiments, the stored access control policy representation may comprise the stated access control policies and the derived access control policies. In some embodiments, the IT infrastructure may comprise a plurality of domains with transitive cross-domain access control polices and the policy representation for the IT infrastructure may include a representation of the transitive cross-domain access control polices.

In block 1220, based on the one or more normalized access control policies, at least one entity cluster associated with the one or more first entities may be determined. In some embodiments, each entity cluster in the at least one entity cluster may be determined based on at least one attribute common to: a subset of the one or more first entities, or a subset of the one or more second entities, or a subset of the one or more third entities. The at least one attribute may comprises at least one of: (i) an access privilege (e.g. associated with the one or more first entities); or (ii) an access pattern (e.g., to resources) (iii) an activity pattern, where the activity pattern may comprising one or more of: an activity type, or an activity volume over a time period, or an activity time; or (iv) a location (e.g. associated with the first, second, or third entities); or (v) a user or user group; or (vi) a role; or (vii) a device type (e.g. used by the one or more first entities); or (viii) an access domain associated with the IT infrastructure; or (ix) a variance of one or more parameters associated with a current activity pattern in relation to corresponding parameters for a historical activity pattern, or (x) similarity of access policy subgraphs, or a combination thereof. Techniques to determine entity clusters (e.g. the at least one entity cluster) are described above.

In block 1230, one or more derived access control policies corresponding to the at least one entity cluster may be determined. In some embodiments, determining the one or more derived access control policies may comprise: determining, for the at least one entity cluster, one or more corresponding resource access patterns or one or more resource utilization patterns, or a combination thereof, for one or more resources associated with the at least one entity cluster, the one or more resources comprised in the set of resources; and determining, based on one or more of: the corresponding resource access patterns, or the resource utilization patterns, the one or more derived access control policies. In some embodiments, the one or more derived access control policies (e.g. in block 1230) may be determined using a machine learning model.

In block 1240, a set of non-compliant access control policies may be determined. The set of non-compliant access control policies may comprise: a first subset of the one or more normalized access control policies that are non-compliant with one or more stated access control policies applicable to the at least one entity cluster, or a subset of the one or more derived access control policies that are non-compliant with the one or more stated access control policies, or a combination thereof. In some embodiments, determining the first subset of the one or more normalized access control policies (e.g. in block 1240) may comprise: determining one or more non-compliant entities in the at least one entity cluster with attributes that are inconsistent with access control parameters associated with a resource accessed by the at least one entity cluster in the set of resources, the access control parameters being specified in at least one stated access control policy applicable to the resource, and adding, for each non-compliant entity, corresponding normalized policies governing access to the resource to the first subset.

In some embodiments, the method may further comprise: determining a second subset of the one or more normalized access control policies applicable to entities in the at least one entity cluster that differ from: the one or more stated access control policies, or at least one stated access control policy applicable to a resource accessed by the entity cluster in the set of resources, or a combination thereof.

In some embodiments, the method may further comprise: initiating at least one corrective action in relation to the set of non-compliant access control policies. The at least one corrective action may comprise one or more of: disabling the set of non-compliant access control policies; or initiating transmission of a message identifying the set of non-compliant access control policies, or flagging the set of non-compliant access control policies for evaluation; or increasing a risk score associated with each non-compliant access control policy in the set of non-compliant access control policies; or a combination thereof.

In some embodiments, the method may further comprise determining a third subset of the one or more normalized access control policies applicable to entities in the entity cluster that exhibit a variance relative to the one or more derived access control policies applicable to the entity cluster. In some embodiments, the second subset of the one or more normalized access control policies may be determined in block 1240. In some embodiments, access control rules may be added (predicted) or deleted or modified based on the variance.

In some embodiments, (e.g. following block 1240), the method may further comprise: determining, for the one or more first entities, a set of unexercised normalized access control policies, the set of unexercised normalized access control policies may include normalized access control policies associated with the one or more first entities that were not invoked over a time period.

In some embodiments, the method may further comprise, compressing the policy representation to obtain a compressed policy representation, based, in part, on the clustering (e.g. based on the at least one entity cluster).

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A processor-implemented method comprising:
   obtaining one or more normalized access control policies associated with one or more first entities based on a stored access control policy representation governing access to a set of resources in an information technology (IT) infrastructure comprising a plurality of subsystems;
   determining, based on the one or more normalized access control policies, at least one entity cluster associated with the one or more first entities by clustering the one or more first entities based on the stored access control policy representation and an attribute of the entities of the entity cluster;
   determining one or more derived access control policies corresponding to the at least one entity cluster by deriving the derived access control policies from an access pattern or utilization pattern associated with the entities of the entity cluster; and
   determining a set of non-compliant access control policies, wherein the set of non-compliant access control policies comprises:
      a first subset of the one or more normalized access control policies that are non-compliant with one or more stated access control policies applicable to the at least one entity cluster, or
      a subset of the one or more derived access control policies that are non-compliant with the one or more stated access control policies, or
      a combination thereof.

2. The method of claim 1, wherein the policy representation comprises one or more second entities with access to the one or more first entities, or one or more third entities accessible to the one or more first entities; or a combination thereof.

3. The method of claim 2, wherein each entity cluster in the at least one entity cluster is determined based on at least one attribute common to one or more of:
   a subset of the one or more first entities, or
   a subset of the one or more second entities, or
   a subset of the one or more third entities.

4. The method of claim 3, wherein the at least one attribute comprises at least one of:
   an access privilege, or
   an access pattern, or
   an activity pattern, the activity pattern comprising one or more of: an activity type, or an activity volume over a time period, or an activity time, or
   a variance of one or more parameters associated with a current activity pattern in relation to corresponding parameters for a historical activity pattern, or
   a location, or
   a user or user group, or
   a role, or
   a device type, or
   an access domain associated with the IT infrastructure, or
   a combination thereof.

5. The method of claim 1, wherein determining the one or more derived access control policies comprises:
   determining, for the at least one entity cluster, one or more corresponding resource access patterns or one or more resource utilization patterns, or a combination thereof, for one or more resources associated with the at least one entity cluster, the one or more resources comprised in the set of resources; and determining, based on one or more of: the corresponding resource access patterns, or the resource utilization patterns, the one or more derived access control policies.

6. The method of claim 5, wherein the one or more derived access control policies are determined using a machine learning model.

7. The method of claim 1, wherein determining the first subset of the one or more normalized access control policies comprises:

determining one or more non-compliant entities in the at least one entity cluster with attributes that are inconsistent with access control parameters associated with a resource accessed by the at least one entity cluster in the set of resources, the access control parameters being specified in at least one stated access control policy applicable to the resource, and adding, for each non-compliant entity, corresponding normalized policies governing access to the resource to the first subset.

8. The method of claim 1, further comprising:

determining a second subset of the one or more normalized access control policies applicable to entities in the at least one entity cluster that differ from: the one or more stated access control policies, or at least one stated access control policy applicable to a resource accessed by the entity cluster in the set of resources, or a combination thereof.

9. The method of claim 1, wherein the one or more normalized access control policies are automatically configurable.

10. The method of claim 1, wherein the stored access control policy representation comprises the stated access control policies and the derived access control policies.

11. The method of claim 1, further comprising:

initiating at least one corrective action in relation to the set of non-compliant access control policies.

12. The method of claim 11, wherein initiating the at least one corrective action in relation to the set of non-compliant access control policies comprises:

disabling the set of non-compliant access control policies; or initiating transmission of a message identifying the set of non-compliant access control policies, or flagging the set of non-compliant access control policies for evaluation; or increasing a risk score associated with each non-compliant access control policy in the set of non-compliant access control policies;

a combination thereof.

13. The method of claim 1, further comprising:

determining a third subset of the one or more normalized access control policies applicable to entities in the at least one entity cluster that differ from the one or more derived access control policies applicable to the at least one entity cluster.

14. The method of claim 1, further comprising:

determining, for the one or more first entities, a set of unexercised normalized access control policies, the set of unexercised normalized access control policies comprising normalized access control policies associated with the one or more first entities that were not invoked over a time period.

15. A computing system comprising: a memory, and a processor coupled to the memory, wherein the processor is configured to:

obtain one or more normalized access control policies associated with one or more first entities based on a stored access control policy representation governing access to a set of resources in an information technology (IT) infrastructure comprising a plurality of subsystems;

determine, based on the one or more normalized access control policies, at least one entity cluster associated with the one or more first entities by clustering the one or more first entities based on the stored access control policy representation and an attribute of the entities of the entity cluster;

determine one or more derived access control policies corresponding to the at least one entity cluster by deriving the derived access control policies from an access pattern or utilization pattern associated with the entities of the entity cluster; and determine a set of non-compliant access control policies, wherein the set of non-compliant access control policies comprises:

a first subset of the one or more normalized access control policies that are non-compliant with one or more stated access control policies applicable to the at least one entity cluster, or a subset of the one or more derived access control policies that are non-compliant with the one or more stated access control policies, or a combination thereof.

16. The computing system of claim 15, wherein the policy representation comprises one or more second entities with access to the one or more first entities, or one or more third entities accessible to the one or more first entities; or a combination thereof.

17. The computing system of claim 16, wherein each entity cluster in the at least one entity cluster is determined based on at least one attribute common to one or more of:

a subset of the one or more first entities, or a subset of the one or more second entities, or a subset of the one or more third entities.

18. The computing system of claim 17, wherein the at least one attribute comprises at least one of:

an access privilege, or an access pattern, or an activity pattern, the activity pattern comprising one or more of: an activity type, or an activity volume over a time period, or an activity time, or a variance of one or more parameters associated with a current activity pattern in relation to corresponding parameters for a historical activity pattern, or a location, or a user or user group, or a role, or a device type, or an access domain associated with the IT infrastructure, or a combination thereof.

19. The computing system of claim 15, wherein to determine the one or more derived access control policies, the processor is configured to:

determine, for the at least one entity cluster, one or more corresponding resource access patterns or one or more resource utilization patterns, or a combination thereof, for one or more resources associated with the at least one entity cluster, the one or more resources comprised in the set of resources; and determine, based on one or more of: the corresponding resource access patterns, or the resource utilization patterns, the one or more derived access control policies.

20. The computing system of claim 19, wherein the one or more derived access control policies are determined using a machine learning model.

21. The computing system of claim 15, wherein to determine the first subset of the one or more normalized access control policies, the processor is configured to:
   determine one or more non-compliant entities in the at least one entity cluster with attributes that are inconsistent with access control parameters associated with a resource accessed by the at least one entity cluster in the set of resources, the access control parameters being specified in at least one stated access control policy applicable to the resource, and
   add, for each non-compliant entity, corresponding normalized policies governing access to the resource to the first subset.

22. The computing system of claim 15, wherein the processor is further configured to:
   determine a second subset of the one or more normalized access control policies applicable to entities in the at least one entity cluster that differ from: the one or more stated access control policies, or at least one stated access control policy applicable to a resource accessed by the at least one entity cluster in the set of resources, or a combination thereof.

23. The computing system of claim 15, wherein the one or more normalized access control policies are automatically configurable.

24. The computing system of claim 15, wherein the stored access control policy representation comprises the stated access control policies and the derived access control policies.

25. The computing system of claim 15, further comprising:
   initiating at least one corrective action in relation to the set of non-compliant access control policies.

26. The computing system of claim 15, wherein the processor is further configured to:
   determine a third subset of the one or more normalized access control policies applicable to entities in the at least one entity cluster that differ from the one or more derived access control policies applicable to the at least one entity cluster.

27. A non-transitory computer readable medium comprising instructions to configure a processor to:
   obtain one or more normalized access control policies associated with one or more first entities based on a stored access control policy representation governing access to a set of resources in an information technology (IT) infrastructure comprising a plurality of subsystems;
   determine, based on the one or more normalized access control policies, at least one entity cluster associated with the one or more first entities by clustering the one or more first entities based on the stored access control policy representation and an attribute of the entities of the entity cluster;
   determine one or more derived access control policies corresponding to the at least one entity cluster by deriving the derived access control policies from an access pattern or utilization pattern associated with the entities of the entity cluster; and
   determine a set of non-compliant access control policies, wherein the set of non-compliant access control policies comprises:
      a first subset of the one or more normalized access control policies that are non-compliant with one or more stated access control policies applicable to the at least one entity cluster, or
      a subset of the one or more derived access control policies that are non-compliant with the one or more stated access control policies, or
      a combination thereof.

* * * * *